(12) United States Patent
Xu et al.

(10) Patent No.: US 10,476,730 B2
(45) Date of Patent: Nov. 12, 2019

(54) METHODS, APPARATUS, SERVERS, AND SYSTEMS FOR HUMAN IDENTIFICATION BASED ON HUMAN RADIO BIOMETRIC INFORMATION

(71) Applicant: ORIGIN WIRELESS, INC., Greenbelt, MD (US)

(72) Inventors: Qinyi Xu, College Park, MD (US); Yan Chen, Chengdu (CN); Beibei Wang, Clarksville, MD (US); K. J. Ray Liu, Potomac, MD (US)

(73) Assignee: ORIGIN WIRELESS, INC., Greenbelt, MD (US)

( * ) Notice: Subject to any disclaimer, the term of this patent is extended or adjusted under 35 U.S.C. 154(b) by 0 days.

(21) Appl. No.: 16/127,092

(22) Filed: Sep. 10, 2018

(65) Prior Publication Data

US 2019/0028320 A1    Jan. 24, 2019

Related U.S. Application Data

(63) Continuation-in-part of application No. 15/326,112, filed as application No. PCT/US2015/041037 on Jul.
(Continued)

(51) Int. Cl.
*H04L 27/36* (2006.01)
*H04W 72/04* (2009.01)
(Continued)

(52) U.S. Cl.
CPC ............. *H04L 27/362* (2013.01); *H04B 1/38* (2013.01); *H04L 5/0057* (2013.01); *H04W 72/0413* (2013.01)

(58) Field of Classification Search
CPC ... H04L 27/362; H04L 5/0057; H04B 17/309; H04B 1/38; H04W 72/0413
See application file for complete search history.

(56) References Cited

U.S. PATENT DOCUMENTS

| 2004/0240712 A1* | 12/2004 | Rowe | ................... | A61B 5/1171 |
| | | | | 382/124 |
| 2008/0101658 A1* | 5/2008 | Ahern | ..................... | G06F 21/32 |
| | | | | 382/115 |

(Continued)

OTHER PUBLICATIONS

International Search Report of PCT/US2017/021957 dated Jun. 6, 2017 [PCT/ISA/210].
(Continued)

*Primary Examiner* — Christopher M Brandt
(74) *Attorney, Agent, or Firm* — Yingxin Xiao

(57) ABSTRACT

The present teaching relates to human identification based on human radio biometric information in an environment without line-of-sight. In one example, an apparatus for human identification is disclosed. The apparatus comprises a receiver, a processor and a memory communicatively coupled with the processor. The receiver is configured for receiving at least one wireless signal from a multipath channel that is impacted by a person to be identified. The processor is configured for: extracting channel state information (CSI) from the at least one wireless signal, obtaining radio biometric information based on the CSI, wherein the radio biometric information represents how the at least one wireless signal was impacted by at least part of a body of the person, and determining an identity of the person based on the radio biometric information.

20 Claims, 33 Drawing Sheets

Related U.S. Application Data 17, 2015, and a continuation-in-part of application No. 14/605,611, filed on Jan. 26, 2015, now Pat. No. 10,168,414, application No. 16/127,092, which is a continuation-in-part of application No. 15/584,052, filed on May 2, 2017, application No. 16/127,092, which is a continuation-in-part of application No. 15/434,813, filed on Feb. 16, 2017, now Pat. No. 10,129,862, application No. 16/127,092, which is a continuation-in-part of application No. PCT/US2017/021963, filed on Mar. 10, 2017, application No. 16/127,092, which is a continuation-in-part of application No. PCT/US2017/021957, filed on Mar. 10, 2017, application No. 16/127,092, which is a continuation-in-part of application No. PCT/US2017/027131, filed on Apr. 12, 2017, application No. 16/127,092, which is a continuation-in-part of application No. 15/384,217, filed on Dec. 19, 2016, which is a continuation-in-part of application No. 13/706,342, filed on Dec. 5, 2012, now Pat. No. 9,883,511, and a continuation-in-part of application No. 13/969,271, filed on Aug. 16, 2013, now Pat. No. 9,882,675, and a continuation-in-part of application No. 13/969,320, filed on Aug. 16, 2013, now Pat. No. 9,559,874, and a continuation-in-part of application No. 15/041,677, filed on Feb. 11, 2016, now Pat. No. 9,794,156, and a continuation-in-part of application No. 15/200,430, filed on Jul. 1, 2016, now Pat. No. 9,736,002, which is a continuation of application No. 14/262,153, filed on Apr. 25, 2014, now Pat. No. 9,407,306, said application No. 15/384,217 is a continuation-in-part of application No. 15/200,429, filed on Jul. 1, 2016, now Pat. No. 9,781,700, which is a continuation of application No. 14/943,648, filed on Nov. 17, 2015, now Pat. No. 9,402,245, which is a continuation of application No. 14/202,651, filed on Mar. 10, 2014, now Pat. No. 9,226,304, said application No. 15/384,217 is a continuation-in-part of application No. 14/605,611, filed on Jan. 26, 2015, now Pat. No. 10,168,414, said application No. 15/384,217 is a continuation-in-part of application No. 14/615,984, filed on Feb. 6, 2015, now Pat. No. 9,686,054, said application No. 15/384,217 is a continuation-in-part of application No. 15/004,314, filed on Jan. 22, 2016, now Pat. No. 10,014,982, said application No. 15/384,217 is a continuation-in-part of application No. 15/061,059, filed on Mar. 4, 2016, said application No. 15/384,217 is a continuation-in-part of application No. PCT/US2015/041037, filed on Jul. 17, 2015, which is a continuation-in-part of application No. 14/605,611, filed on Jan. 26, 2015, now Pat. No. 10,168,414, said application No. 15/384,217 is a continuation-in-part of application No. 15/268,477, filed on Sep. 16, 2016, now Pat. No. 9,887,864, which is a continuation-in-part of application No. 15/200,429, filed on Jul. 1, 2016, now Pat. No. 9,781,700, which is a continuation of application No. 14/943,648, filed on Nov. 17, 2015, now Pat. No. 9,402,245, which is a continuation of application No. 14/202,651, filed on Mar. 10, 2014, now Pat. No. 9,226,304, said application No. 15/384,217 is a continuation-in-part of application No. 15/284,496, filed on Oct. 3, 2016, now Pat. No. 10,327,213, and a continuation-in-part of application No. PCT/US2016/066015, filed on Dec. 9, 2016, application No. 16/127,092, which is a continuation-in-part of application No. PCT/US2017/015909, filed on Jan. 31, 2017, which is a continuation-in-part of application No. PCT/US2016/066015, filed on Dec. 9, 2016, application No. 16/127,092, which is a continuation-in-part of application No. 15/861,422, filed on Jan. 3, 2018, and a continuation-in-part of application No. 15/873,806, filed on Jan. 17, 2018, now Pat. No. 10,270,642, and a continuation-in-part of application No. 16/101,444, filed on Aug. 11, 2018, now Pat. No. 10,291,460.

(60) Provisional application No. 62/148,019, filed on Apr. 15, 2015, provisional application No. 62/025,795, filed on Jul. 17, 2014, provisional application No. 62/069,090, filed on Oct. 27, 2014, provisional application No. 62/331,278, filed on May 3, 2016, provisional application No. 62/295,970, filed on Feb. 16, 2016, provisional application No. 62/320,965, filed on Apr. 11, 2016, provisional application No. 62/307,081, filed on Mar. 11, 2016, provisional application No. 62/316,850, filed on Apr. 1, 2016, provisional application No. 62/307,172, filed on Mar. 11, 2016, provisional application No. 62/334,110, filed on May 10, 2016, provisional application No. 62/322,575, filed on Apr. 14, 2016, provisional application No. 62/409,796, filed on Oct. 18, 2016, provisional application No. 62/557,117, filed on Sep. 11, 2017, provisional application No. 62/593,826, filed on Dec. 1, 2017, provisional application No. 62/106,395, filed on Jan. 22, 2015, provisional application No. 62/128,574, filed on Mar. 5, 2015, provisional application No. 62/219,315, filed on Sep. 16, 2015, provisional application No. 62/265,155, filed on Dec. 9, 2015, provisional application No. 62/411,504, filed on Oct. 21, 2016, provisional application No. 62/383,235, filed on Sep. 2, 2016, provisional application No. 62/384,060, filed on Sep. 6, 2016, provisional application No. 62/678,207, filed on May 30, 2018, provisional application No. 62/235,958, filed on Oct. 1, 2015.

(51) Int. Cl.
*H04B 1/38* (2015.01)
*H04L 5/00* (2006.01)

(56) References Cited

U.S. PATENT DOCUMENTS

| | | | |
|---|---|---|---|
| 2008/0252412 A1* | 10/2008 | Larsson | B60R 25/25 340/5.2 |
| 2010/0001832 A1 | 1/2010 | Langille | |
| 2010/0052600 A1 | 6/2010 | Droitcour et al. | |
| 2010/0152600 A1* | 6/2010 | Droitcour | A61B 5/05 600/534 |
| 2011/0043515 A1 | 2/2011 | Stathis | |
| 2011/0221567 A1 | 9/2011 | Lehnert et al. | |
| 2015/0123766 A1 | 5/2015 | St. John | |
| 2016/0048669 A1* | 2/2016 | Kim | G06K 9/00073 726/19 |

OTHER PUBLICATIONS

Written Opinion of PCT/US2017/021957 dated Jun. 6, 2017 [PCT/ISA/237].

\* cited by examiner

| Test Subject | #1 | #2 | #3 | #4 | #5 | #6 | #7 | #8 | #9 | #10 | #11 |
|---|---|---|---|---|---|---|---|---|---|---|---|
| Height (cm) | 172 | 164 | 173 | 168 | 176 | 170 | 170 | 172 | 180 | 166 | 155 |
| Weight (kg) | 74 | 53 | 70 | 90 | 90 | 90 | 70 | 69 | 75 | 68 | 45 |
| Gender (M/F) | M | F | M | M | M | M | F | M | M | M | F |
| Glasses (Y/N) | Y | N | Y | Y | Y | Y | N | Y | Y | Y | N |

FIG. 20

|  | Testing Data | | | | | |
| --- | --- | --- | --- | --- | --- | --- |
|  | Empty room | Human #1 | Human #2 | Human #3 | Human #4 | Human #5 |
| Empty room | 1 | 0 | 0 | 0 | 0.4944 | 0.9613 |
| Human #1 | 0 | 1 | 0 | 0.5754 | 0.4138 | 0 |
| Human #2 | 0 | 0 | 1 | 1 | 0.9974 | 1 |
| Human #3 | 0 | 0.3159 | 1 | 1 | 0.1912 | 0.8869 |
| Human #4 | 0.8722 | 0.4951 | 0.9917 | 0.5672 | 1 | 1 |
| Human #5 | 0.9781 | 0 | 1 | 0.9999 | 1 | 1 |

Training Data

FIG. 21A

| Testing Data | Empty room | Human #1 | Human #2 | Human #3 | Human #4 | Human #5 |
|---|---|---|---|---|---|---|
| Empty room | 1 | 0 | 0 | 0 | 0 | 0 |
| Human #1 | 0 | 0.9812 | 0 | 0 | 0 | 0 |
| Human #2 | 0 | 0 | 0.9972 | 0 | 0 | 0.0011 |
| Human #3 | 0 | 0 | 0.0024 | 0.9635 | 0 | 0 |
| Human #4 | 0 | 0 | 0 | 0 | 0.9696 | 0 |
| Human #5 | 0 | 0 | 0 | 0 | 0 | 0.9842 |

Training Data

FIG. 21B

|  | Testing Data | | | | | |
|---|---|---|---|---|---|---|
| Training Data | Day1-AM | Day1-PM | Day2-AM | Day2-PM | Day3-AM | Day3-PM |
| DAY1-AM | 1 | 1 | 1 | 0.8522 | 0.7400 | 1 |
| DAY1-PM | 1 | 1 | 1 | 0.9998 | 0.9856 | 1 |
| DAY2-AM | 1 | 0.9989 | 1 | 0.9990 | 0.9997 | 1 |
| DAY2-PM | 1 | 0.9926 | 1 | 1 | 0.9999 | 0.9997 |
| DAY3-AM | 0.8885 | 0.8005 | 0.9997 | 0.9833 | 1 | 0.9996 |
| DAY3-PM | 1 | 0.9746 | 0.9998 | 0.9420 | 0.9996 | 1 |

FIG. 22

| class | coat | backpack | laptop in the backpack |
|---|---|---|---|
| #1 | No | No | No |
| #2 | Yes | No | No |
| #3 | Yes | Yes | No |
| #4 | Yes | Yes | Yes |
| #5 | No | Yes | No |
| #6 | No | Yes | Yes |

FIG. 23

|          | Threshold 0.92 | Threshold 0.9 | Threshold 0.85 | Threshold 0.84 |
|----------|----------------|---------------|----------------|----------------|
| Class #1 | 0.9873         | 0.9994        | 1              | 1              |
| Class #2 | 0.9688         | 0.9992        | 1              | 1              |
| Class #3 | 0              | 0.3275        | 0.9985         | 1              |
| Class #4 | 0.4668         | 0.9756        | 1              | 1              |
| Class #5 | 0.2734         | 0.9659        | 1              | 1              |
| Class #6 | 0.9720         | 0.9996        | 1              | 1              |

FIG. 24

|  | Class #1 | Class #2 | Class #3 | Class #4 | Class #5 | Class #6 |
|---|---|---|---|---|---|---|
| Class #1 | 0.3140 | 0.3680 | 0.0840 | 0.0840 | 0.1980 | 0.2260 |
| Class #2 | 0.0220 | 0.0280 | 0.0020 | 0 | 0.0420 | 0.0040 |
| Class #3 | 0.0640 | 0.0840 | 0.2920 | 0.1360 | 0.0660 | 0.0980 |
| Class #4 | 0.2340 | 0.0220 | 0.4600 | 0.4360 | 0.2940 | 0.2600 |
| Class #5 | 0.1040 | 0.1160 | 0.0100 | 0.1020 | 0.1260 | 0.0740 |
| Class #6 | 0.2620 | 0.3820 | 0.1520 | 0.2420 | 0.2740 | 0.3380 |

Testing Data / Training Data

FIG. 25

METHODS, APPARATUS, SERVERS, AND SYSTEMS FOR HUMAN IDENTIFICATION BASED ON HUMAN RADIO BIOMETRIC INFORMATION

CROSS-REFERENCE TO RELATED APPLICATIONS

The present application hereby claims priority to, and incorporates by reference the entirety of the disclosures of, each of the following applications:

(a) U.S. patent application Ser. No. 15/326,112, entitled "WIRELESS POSITIONING SYSTEMS", filed on Jan. 13, 2017,
  (1) which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
    a. which claims priority to U.S. Provisional patent application 62/148,019, entitled "WIRELESS POSITIONING SYSTEMS", filed on Apr. 15, 2015,
    b. which is a continuation-in-part of U.S. patent application Ser. No. 14/605,611, entitled "WIRELESS POSITIONING SYSTEMS", filed on Jan. 26, 2015, published as US2016/0018508A1 on Jan. 21, 2016,
      1. which claims priority to U.S. Provisional patent application 62/025,795, entitled "TIME-REVERSAL POSITIONING SYSTEMS", filed on Jul. 17, 2014, and
      2. which claims priority to U.S. Provisional patent application 62/069,090, entitled "TIME-REVERSAL POSITIONING SYSTEMS", filed on Oct. 27, 2014,
(b) U.S. patent application Ser. No. 15/584,052, entitled "METHOD, SYSTEM, AND APPARATUS FOR WIRELESS POWER TRANSMISSION BASED ON POWER WAVEFORMING", filed on May 2, 2017,
  (1) which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,
(c) U.S. patent application Ser. No. 15/434,813, entitled "METHODS, DEVICES, APPARATUS, AND SYSTEMS FOR MEDIUM ACCESS CONTROL IN WIRELESS COMMUNICATION SYSTEMS UTILIZING SPATIAL FOCUSING EFFECT", filed on Feb. 16, 2017,
  (1) which claims priority to U.S. Provisional patent application 62/295,970, entitled "THE IMPACT OF SPATIAL FOCUSING EFFECTS ON MEDIUM ACCESS CONTROL DESIGN FOR 5G", filed on Feb. 16, 2016,
  (2) which claims priority to U.S. Provisional patent application 62/320,965, entitled "OPTIMAL RATE ADAPTATION FOR THROUGHPUT MAXIMIZATION IN TIME REVERSAL DIVISION MULTIPLE ACCESS", filed on Apr. 11, 2016,
(d) PCT patent application PCT/US2017/021963, entitled "METHODS, APPARATUS, SERVERS, AND SYSTEMS FOR VITAL SIGNS DETECTION AND MONITORING", filed on Mar. 10, 2017, published as WO2017/156492A1 on Sep. 14, 2017,
  (1) which claims priority to U.S. Provisional patent application 62/307,081, entitled "TR-BREATH: TIME-REVERSAL BREATHING RATE ESTIMATION AND DETECTION", filed on Mar. 11, 2016,
  (2) which claims priority to U.S. Provisional patent application 62/316,850, entitled "TR-BREATH: TIME-REVERSAL BREATHING RATE ESTIMATION AND DETECTION", filed on Apr. 1, 2016,
(e) PCT patent application PCT/US2017/021957, entitled "METHODS, APPARATUS, SERVERS, AND SYSTEMS FOR HUMAN IDENTIFICATION BASED ON HUMAN RADIO BIOMETRIC INFORMATION", filed on Mar. 10, 2017, published as WO2017/156487A1 on Sep. 14, 2017,
  (1) which claims priority to U.S. Provisional patent application 62/307,172, entitled "RADIO SHOT: THROUGH-THE-WALL HUMAN IDENTIFICATION", filed on Mar. 11, 2016,
  (2) which claims priority to U.S. Provisional patent application 62/334,110, entitled "TIME-REVERSAL TRACKING WITHOUT MAPPING", filed on May 10, 2016,
(f) PCT patent application PCT/US2017/027131, entitled "METHODS, APPARATUS, SERVERS, AND SYSTEMS FOR OBJECT TRACKING", filed on Apr. 12, 2017, published as WO2017/180698A1 on Oct. 19, 2017,
  (1) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,
  (2) which claims priority to U.S. Provisional patent application 62/334,110, entitled "TIME-REVERSAL TRACKING WITHOUT MAPPING", filed on May 10, 2016, and
  (3) which claims priority to U.S. Provisional patent application 62/409,796, entitled "METHODS, DEVICES, SERVERS, AND SYSTEMS OF TIME REVERSAL BASED TRACKING", filed on Oct. 18, 2016,
(g) U.S. Provisional patent application 62/557,117, entitled "METHODS, DEVICES, SERVERS, APPARATUS, AND SYSTEMS FOR WIRELESS INTERNET OF THINGS APPLICATIONS", filed on Sep. 11, 2017,
(h) U.S. Provisional patent application 62/593,826, entitled "METHOD, APPARATUS, AND SYSTEM FOR OBJECT TRACKING AND NAVIGATION", filed on Dec. 1, 2017,
(i) U.S. patent application Ser. No. 15/384,217, entitled "METHOD, APPARATUS, SERVER, AND SYSTEMS OF TIME-REVERSAL TECHNOLOGY", filed on Dec. 19, 2016, published as US2017/0188359A1 on Jun. 29, 2017,
  (1) which is a Continuation-in-Part of U.S. patent application Ser. No. 13/706,342, entitled "WAVEFORM DESIGN FOR TIME-REVERSAL SYSTEMS," filed on Dec. 5, 2012, issued as U.S. Pat. No. 9,883,511 on Jan. 30, 2018,
  (2) which is a Continuation-in-Part of U.S. patent application Ser. No. 13/969,271, entitled "TIME-REVERSAL WIRELESS SYSTEMS HAVING ASYMMETRIC ARCHITECTURE", filed on Aug. 16, 2013, published as US2015/0049745A1 on Feb. 19, 2015, issued as U.S. Pat. No. 9,882,675 on Jan. 30, 2018,
  (3) which is a Continuation-in-Part of U.S. patent application Ser. No. 13/969,320, entitled "MULTIUSER TIME-REVERSAL DIVISION MULTIPLE ACCESS UPLINK SYSTEM WITH PARALLEL INTERFERENCE CANCELLATION", filed on Aug. 16, 2013, issued as U.S. Pat. No. 9,559,874 on Jan. 31, 2017,
  (4) which is a Continuation-in-Part of U.S. patent application Ser. No. 15/041,677, entitled "HANDSHAKING PROTOCOL FOR TIME-REVERSAL SYSTEM", filed on Feb. 11, 2016, published as US2016/

0164669A1 on Jun. 9, 2016, issued as U.S. Pat. No. 9,794,156 on Oct. 17, 2017, (5) which is a Continuation-in-Part of U.S. patent application Ser. No. 15/200,430, entitled "QUADRATURE AMPLITUDE MODULATION FOR TIME-REVERSAL SYSTEMS", filed on Jul. 1, 2016, published as US2016/0315797A1 on Oct. 27, 2016, issued as U.S. Pat. No. 9,736,002 on Aug. 15, 2017,
   a. which is a Continuation of U.S. patent application Ser. No. 14/262,153, entitled "QUADRATURE AMPLITUDE MODULATION FOR TIME-REVERSAL SYSTEMS", filed on Apr. 25, 2014, issued as U.S. Pat. No. 9,407,306 on Aug. 2, 2016, (6) which is a Continuation-in-Part of U.S. patent application Ser. No. 15/200,429, entitled "TIME-REVERSAL WIRELESS PARADIGM FOR INTERNET OF THINGS", filed on Jul. 1, 2016, issued as U.S. Pat. No. 9,781,700 on Oct. 3, 2017,
   a. which is a Continuation of U.S. patent application Ser. No. 14/943,648, entitled "TIME-REVERSAL WIRELESS PARADIGM FOR INTERNET OF THINGS", filed on Nov. 17, 2015, issued as U.S. Pat. No. 9,402,245 on Jul. 26, 2016,
      1. which is a Continuation of U.S. patent application Ser. No. 14/202,651, entitled "TIME-REVERSAL WIRELESS PARADIGM FOR INTERNET OF THINGS", filed on Mar. 10, 2014, issued as U.S. Pat. No. 9,226,304 on Dec. 29, 2015, (7) which is a Continuation-in-Part of U.S. patent application Ser. No. 14/605,611, entitled "WIRELESS POSITIONING SYSTEM", filed on Jan. 26, 2015, published as US2016/0018508A1 on Jan. 21, 2016,
   a. which claims priority to U.S. Provisional patent application 62/069,090, entitled "TIME-REVERSAL POSITIONING SYSTEMS", filed on Oct. 27, 2014,
   b. which claims priority to U.S. Provisional patent application 62/025,795, entitled "TIME-REVERSAL POSITIONING SYSTEMS", filed on Jul. 17, 2014, (8) which is a Continuation-in-Part of U.S. patent application Ser. No. 14/615,984, entitled "JOINT WAVEFORM DESIGN AND INTERFERENCE PRE-CANCELLATION FOR TIME-REVERSAL SYSTEMS", filed on Feb. 6, 2015, issued as U.S. Pat. No. 9,686,054 on Jun. 20, 2017,
   a. which claims priority to U.S. Provisional patent application 62/025,795, entitled "TIME-REVERSAL POSITIONING SYSTEMS", filed on Jul. 17, 2014, (9) which is a Continuation-in-Part of U.S. patent application Ser. No. 15/004,314, entitled "TIME-REVERSAL TECHNOLOGIES FOR HYBRID WIRELESS NETWORKS", filed on Jan. 22, 2016, issued as U.S. Pat. No. 10,014,982 on Jul. 3, 2018,
   a. which claims priority to U.S. Provisional patent application 62/106,395, entitled "TIME-REVERSAL TECHNOLOGIES FOR HYBRID WIRELESS NETWORKS", filed on Jan. 22, 2015,

(10) which is a Continuation-in-Part of U.S. patent application Ser. No. 15/061,059, entitled "TIME-REVERSAL SCALABILITY FOR HIGH NETWORK DENSIFICATION", filed on Mar. 4, 2016,
   a. which claims priority to U.S. Provisional patent application 62/128,574, entitled "TIME-REVERSAL SCALABILITY FOR HIGH NETWORK DENSIFICATION", filed on Mar. 5, 2015,

(11) which is a Continuation-in-Part of PCT patent application PCT/US2015/041037, entitled "WIRELESS POSITIONING SYSTEMS", filed on Jul. 17, 2015, published as WO2016/011433A2 on Jan. 21, 2016,
   a. which claims priority to U.S. Provisional patent application 62/148,019, entitled "WIRELESS POSITIONING SYSTEMS", filed on Apr. 15, 2015,
   b. which is a continuation-in-part of U.S. patent application Ser. No. 14/605,611, entitled "WIRELESS POSITIONING SYSTEMS", filed on Jan. 26, 2015, published as US2016/0018508A1 on Jan. 21, 2016,
      1. which claims priority to U.S. Provisional patent application 62/025,795 entitled "TIME-REVERSAL POSITIONING SYSTEMS", filed on Jul. 17, 2014, and
      2. which claims priority to U.S. Provisional patent application 62/069,090 entitled "TIME-REVERSAL POSITIONING SYSTEMS", filed on Oct. 27, 2014,

(12) which is a Continuation-in-Part of U.S. patent application Ser. No. 15/268,477, entitled "METHODS, DEVICES AND SYSTEMS OF HETEROGENEOUS TIME-REVERSAL PARADIGM ENABLING DIRECT CONNECTIVITY IN INTERNET OF THINGS", filed on Sep. 16, 2016, issued as U.S. Pat. No. 9,887,864 on Feb. 6, 2018,
   a. which claims priority to U.S. Provisional patent application 62/219,315, entitled "ENABLING DIRECT CONNECTIVITY IN INTERNET OF THINGS: A HETEROGENEOUS TIME-REVERSAL PARADIGM", filed on Sep. 16, 2015,
   b. which is a Continuation-in-part of U.S. patent application Ser. No. 15/200,429, entitled "TIME-REVERSAL WIRELESS PARADIGM FOR INTERNET OF THINGS", filed on Jul. 1, 2016, issued as U.S. Pat. No. 9,781,700 on Oct. 3, 2017,
      1. which is a Continuation of U.S. patent application Ser. No. 14/943,648, entitled "TIME-REVERSAL WIRELESS PARADIGM FOR INTERNET OF THINGS", filed on Nov. 17, 2015, issued as U.S. Pat. No. 9,402,245 on Jul. 26, 2016,
         i. which is a Continuation of U.S. patent application Ser. No. 14/202,651, entitled "TIME-REVERSAL WIRELESS PARADIGM FOR INTERNET OF THINGS", filed on Mar. 10, 2014, issued as U.S. Pat. No. 9,226,304 on Dec. 29, 2015,

(13) which is a Continuation-in-Part of U.S. patent application Ser. No. 15/284,496, entitled "TIME-REVERSAL COMMUNICATION SYSTEMS", filed on Oct. 3, 2016,
   a. which claims priority to U.S. Provisional patent application 62/235,958, entitled "SYMBOL TIMING FOR TIME-REVERSAL SYSTEMS WITH SIGNATURE DESIGN", filed on Oct. 1, 2015,

(14) which is a Continuation-in-Part of PCT patent application PCT/US2016/066015, entitled "METHOD, APPARATUS, AND SYSTEMS FOR WIRELESS EVENT DETECTION AND MONITORING", filed on Dec. 9, 2016, published as WO2017/100706A1 on Jun. 15, 2017, whose US national stage entry is Ser. No. 16/060,710, filed on Jun. 8, 2018,
   a. which claims priority to U.S. Provisional patent application 62/265,155, entitled "INDOOR EVENTS DETECTION SYSTEM", filed on Dec. 9, 2015, b. which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016,
c. which claims priority to U.S. Provisional patent application 62/383,235, entitled "TIME REVERSAL MONITORING SYSTEM", filed on Sep. 2, 2016,
d. which claims priority to U.S. Provisional patent application 62/307,081, entitled "TR-BREATH: TIME-REVERSAL BREATHING RATE ESTIMATION AND DETECTION", filed on Mar. 11, 2016,
e. which claims priority to U.S. Provisional patent application 62/316,850, entitled "TR-BREATH: TIME-REVERSAL BREATHING RATE ESTIMATION AND DETECTION", filed on Apr. 1, 2016,
(15) which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,
(16) which claims priority to U.S. Provisional patent application 62/295,970, entitled "THE IMPACT OF SPATIAL FOCUSING EFFECTS ON THE MEDIUM ACCESS CONTROL DESIGN FOR 5G", filed on Feb. 16, 2016,
(17) which claims priority to U.S. Provisional patent application 62/320,965, entitled "OPTIMAL RATE ADAPTATION FOR THROUGHPUT MAXIMIZATION IN TIME REVERSAL DIVISION MULTIPLE ACCESS", filed on Apr. 11, 2016,
(18) which claims priority to U.S. Provisional patent application 62/307,081, entitled "TR-BREATH: TIME-REVERSAL BREATHING RATE ESTIMATION AND DETECTION", filed on Mar. 11, 2016,
(19) which claims priority to U.S. Provisional patent application 62/316,850, entitled "TR-BREATH: TIME-REVERSAL BREATHING RATE ESTIMATION AND DETECTION", filed on Apr. 1, 2016,
(20) which claims priority to U.S. Provisional patent application 62/307,172, entitled "RADIO SHOT: THROUGH-THE-WALL HUMAN IDENTIFICATION", filed on Mar. 11, 2016,
(21) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,
(22) which claims priority to U.S. Provisional patent application 62/334,110, entitled "TIME-REVERSAL TRACKING WITHOUT MAPPING", filed on May 10, 2016,
(23) which claims priority to U.S. Provisional patent application 62/409,796, entitled "METHODS, DEVICES, SERVERS, AND SYSTEMS OF TIME REVERSAL BASED TRACKING", filed on Oct. 18, 2016,
(24) which claims priority to U.S. Provisional patent application 62/383,235, entitled "TIME REVERSAL MONITORING SYSTEM", filed on Sep. 2, 2016,
(25) which claims priority to U.S. Provisional patent application 62/384,060, entitled "METHODS, DEVICES, SERVERS, SYSTEMS OF TIME REVERSAL MACHINE PLATFORM FOR BROADBAND WIRELESS APPLICATIONS", filed on Sep. 6, 2016,
(26) which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016,
(j) PCT patent application PCT/US2017/015909, entitled "METHODS, DEVICES, SERVERS, APPARATUS, AND SYSTEMS FOR WIRELESS INTERNET OF THINGS APPLICATIONS", filed on Jan. 31, 2017, published as WO2017/155634A1 on Sep. 14, 2017,
  (1) which claims priority to U.S. Provisional patent application 62/384,060, entitled "METHODS, DEVICES, SERVERS, SYSTEMS OF TIME REVERSAL MACHINE PLATFORM FOR BROADBAND WIRELESS APPLICATIONS", filed on Sep. 6, 2016,
  (2) which claims priority to U.S. Provisional patent application 62/331,278, entitled "USING VERTUAL ANTENNAS FOR POWER WAVEFORMING IN WIRELESS POWER TRANSMISSION SYSTEMS", filed on May 3, 2016,
  (3) which claims priority to U.S. Provisional patent application 62/307,081, entitled "TR-BREATH: TIME-REVERSAL BREATHING RATE ESTIMATION AND DETECTION", filed on Mar. 11, 2016,
  (4) which claims priority to U.S. Provisional patent application 62/316,850, entitled "TR-BREATH: TIME-REVERSAL BREATHING RATE ESTIMATION AND DETECTION", filed on Apr. 1, 2016,
  (5) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,
  (6) which claims priority to U.S. Provisional patent application 62/334,110, entitled "TIME-REVERSAL TRACKING WITHOUT MAPPING", filed on May 10, 2016,
  (7) which claims priority to U.S. Provisional patent application 62/409,796, entitled "METHODS, DEVICES, SERVERS, AND SYSTEMS OF TIME REVERSAL BASED TRACKING", filed on Oct. 18, 2016,
  (8) which claims priority to U.S. Provisional patent application 62/383,235, entitled "TIME REVERSAL MONITORING SYSTEM", filed on Sep. 2, 2016,
  (9) which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016,
  (10) which claims priority to U.S. Provisional patent application 62/307,172, entitled "RADIO SHOT: THROUGH-THE-WALL HUMAN IDENTIFICATION", filed on Mar. 11, 2016,
  (11) which is a Continuation-in-Part of PCT patent application PCT/US2016/066015, entitled "METHOD, APPARATUS, AND SYSTEMS FOR WIRELESS EVENT DETECTION AND MONITORING", filed on Dec. 9, 2016, published as WO2017/100706A1 on Jun. 15, 2017, whose US national stage entry is Ser. No. 16/060,710, filed on Jun. 8, 2018,
(k) U.S. Provisional patent application 62/678,207, entitled "METHOD, APPARATUS, AND SYSTEM FOR OBJECT TRACKING AND MOTION MONITORING", filed on May 30, 2018,
(l) U.S. patent application Ser. No. 15/861,422, entitled "METHOD, APPARATUS, SERVER, AND SYSTEMS OF TIME-REVERSAL TECHNOLOGY", filed on Jan. 3, 2018.

(m) U.S. patent application Ser. No. 15/873,806, entitled "METHOD, APPARATUS, AND SYSTEM FOR OBJECT TRACKING AND NAVIGATION", filed on Jan. 17, 2018.
(n) U.S. patent application Ser. No. 16/101,444, entitled "METHOD, APPARATUS, AND SYSTEM FOR WIRELESS MOTION MONITORING", filed on Aug. 11, 2018.

TECHNICAL FIELD

The present teaching generally relates to human identification. More specifically, the present teaching relates to human identification based on human radio biometric information in an environment without line-of-sight.

BACKGROUND

Nowadays, capability of performing reliable human identification and recognition has become a crucial requirement in many applications, such as forensics, airport custom check, and bank securities. Current state-of-the-art techniques for human identification rely on discriminative physiological and behavioral characteristics of human, known as biometrics.

Biometric recognition refers to an automated recognition of individuals based on their human biological and behavioral characteristics. Some well-known biometrics for human recognition may include fingerprint, face, iris, and voice. Since biometric information is inherent and distinctive to an individual, biometric traits are widely used in surveillance systems for human identification. Moreover, due to difficulty for biometrics counterfeit, techniques based on biometrics have clear-cut advantages over traditional security methods such as passwords and signatures in countering the growing security threats and in facilitating personalization and convenience. Even though current biometrics systems can be applied in some environments, all of them require special devices that capture human biometric traits in an extremely line-of-sight (LOS) environment. A LOS environment means there is a direct LOS path between the device and the human (or other test subjects). For example, to collect a fingerprint, a person usually puts a finger on top of the fingerprint scanner, where there is a direct straight path of light between the scanner (capturing device) and the finger (test subject). In contrast, in a non-line-of-sight (NLOS) environment, there are some blockages, e.g. walls, between the device and the test subject, such that no light can directly pass through the straight path between the device and the test subject.

Some researchers studied a relationship between the electromagnetic (EM) absorption of human bodies and the human physical characteristics in the carrier frequency range of 1 to 15 GHz, in which the body's surface area is found to have a dominant effect on absorption. Moreover, the interaction of EM waves with biological tissue has been studied and the dielectric properties of biological tissues have been measured. The wireless propagation around the human body highly depends on the physical characteristic (e.g., height and mass), the total body water volume, the skin condition and other biological tissues. The human-affected wireless signal under attenuations and alterations, containing the identity information, may be defined as human radio biometrics or human radio biometric information. Considering the combination of all the physical characteristics and other biological features that affect the propagation of EM waves around the human body and how variable those features can be among different individuals, the chance for two human individuals to have an identical combination is significantly small, no matter how similar those features are. Even if two persons have the same height, weight, clothing and gender, other inherent biological characteristics may be different, resulting in different wireless propagation patterns round the human body. Taking the Deoxyribonucleic acid (DNA) sequence as an example, even though all humans are 99.5% similar to any other humans, no two human individuals are genetically identical, which is the key to techniques such as genetic fingerprinting. Since the probability for two individuals to have exactly the same physical and biological characteristics is extremely small, multipath profiles after human interferences are therefore different among different persons. Consequently, human radio biometrics, which record how the wireless signal interacts with a human body, are altered according to individuals' biological and physical characteristics and can be viewed as unique among different individuals. One example is that face recognition has been implemented for many years to distinguish from and recognize different people, thanks to the fact that different individuals have different facial features. Human radio biometrics, which record how radio frequency (RF) signals respond to the entire body of a human including the face, should contain more information than a face, and thus become more distinct among humans.

In the recent past, a number of attempts have been made to detect and recognize indoor human activities through wireless indoor sensing. Systems have been built to detect indoor human motions based on the variations of channel state information (CSI). They made use of: first two largest eigenvalues of the CSI correlation matrix; standard deviation of the CSI samples from a 3×3 MIMO system to detect human activities such as falling; the received signal strength (RSS) as an indicator for the fluctuation of the wireless channel quality; wireless signal for tracking and recording vital signals. Some system has been disclosed to track human breathing and heartbeat rate using off-the-shelf Wi-Fi signals. A Vital-Radio system was disclosed to monitor vital signs using radar technique to separate different reflections. On the other hand, the recognition of gestures and small hand motions has been implemented using wireless signals. By sending a specially designed frequency modulated carrier wave (FMCW) which sweeps over different carrier frequencies, a new radar-based system was disclosed to keep track of the different time-of-flights (ToFs) of the reflected signals. However, as focusing on differentiating between different human movements, e.g., standing, walking, falling down and small gestures, none of the existing works have addressed the problem of distinguishing one individual from others, who hold the same posture and stand at the same location, by only using Wi-Fi signals in a through-the-wall setting. Recently, a RF-Capture system was presented to image human body contour through the wall. Owing to the distinctiveness of silhouettes, it can differentiate between different individuals by applying image processing and machine learning techniques to the captured human figures. However, to get a high-resolution ToF profile, it requires special devices that can scan over 1 GHz spectrum. Moreover, the computational complexity introduced by the necessary image processing and machine learning algorithms is high.

Therefore, there is a need to build a human identification system to solve the above-mentioned problems and to avoid the above-mentioned drawbacks.

SUMMARY

The present teaching generally relates to human identification. More specifically, the present teaching relates to human identification based on human radio biometric information in an environment without line-of-sight.

In one example, an apparatus for human identification is disclosed. The apparatus comprises a receiver, a processor and a memory communicatively coupled with the processor. The receiver is configured for receiving at least one wireless signal from a multipath channel that is impacted by a person to be identified. The processor is configured for: extracting channel state information (CSI) from the at least one wireless signal, obtaining radio biometric information based on the CSI, wherein the radio biometric information represents how the at least one wireless signal was impacted by at least part of a body of the person, and determining an identity of the person based on the radio biometric information.

In another example, an apparatus for human identification is disclosed. The apparatus comprises a plurality of receivers, a processor and a memory communicatively coupled with the processor. Each of the plurality of receivers is configured for receiving at least one wireless signal from a multipath channel that is impacted by a person to be identified. The processor is configured for: extracting, regarding each of the plurality of receivers, CSI from the at least one wireless signal, obtaining, from each of the plurality of receivers, radio biometric information based on the CSI, wherein the radio biometric information represents how the at least one wireless signal was impacted by at least part of a body of the person, combining the radio biometric information obtained from the plurality of receivers to generate combined radio biometric information, and determining an identity of the person based on the combined radio biometric information.

In yet another example, a method for human identification is disclosed. The method may be implemented on a machine including at least a receiver, a processor and a memory communicatively coupled with the processor for human identification. The method may comprise: receiving at least one wireless signal from a multipath channel that is impacted by a person to be identified; extracting CSI from the at least one wireless signal; obtaining radio biometric information based on the CSI, wherein the radio biometric information represents how the at least one wireless signal was impacted by at least part of a body of the person; and determining an identity of the person based on the radio biometric information.

Other examples in the present teaching include systems, methods, medium, devices, servers, and other implementations directed to object identification based on object's radio biometric information, e.g. human identification based on human radio biometric information, in an environment without line-of-sight. For example, a system or server may include the above mentioned apparatus, or have a similar structure as the above mentioned apparatus for human identification.

Other concepts relate to software for implementing the present teaching on exploring computation, storage, application, and processing of human identification based on human radio biometric information. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

DESCRIPTION OF DRAWINGS

FIG. 20 shows a table listing physical characteristics of test subjects in human identification experiment, according to an embodiment of the present teaching;

FIG. 21A shows a performance matrix of individual identification without background subtraction, according to an embodiment of the present teaching;

FIG. 21B shows a performance matrix of individual identification after background subtraction with $\alpha=0.5$, according to an embodiment of the present teaching;

FIG. 22 shows a performance matrix for a study of stationarity, according to an embodiment of the present teaching;

FIG. 23 shows a table listing six classes of variation, according to an embodiment of the present teaching;

FIG. 24 shows a table listing identification rates under variations, according to an embodiment of the present teaching; and FIG. 25 shows an exemplary confusion matrix under an RSSI-based approach, according to an embodiment of the present teaching.

DETAILED DESCRIPTION

Figure 1:
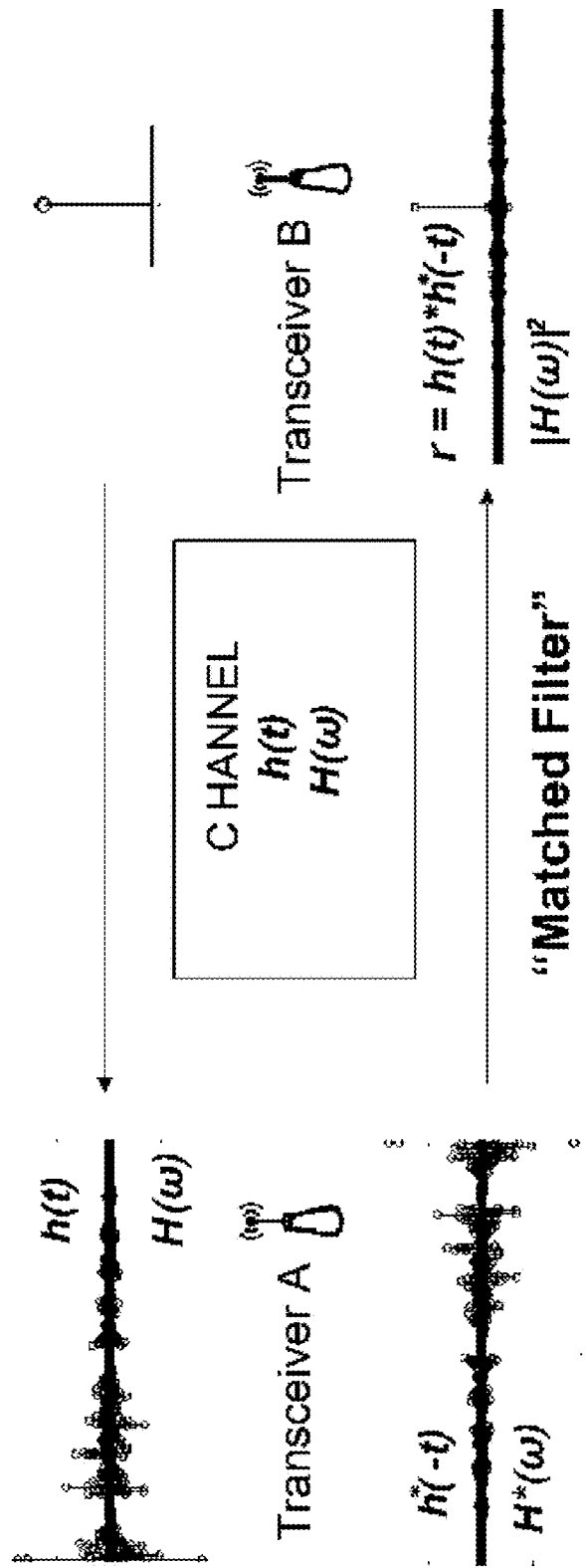
FIG. 1 shows an exemplary system for TR-based wireless transmission, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure generally relates to systems, methods, medium, devices, servers, and other implementations directed to object identification based on object's radio biometric information, e.g. human identification based on human radio biometric information, in an environment without line-of-sight. The present teaching discloses human radio biometrics and presents a human identification system that can discriminate individuals even through walls in a non-line-of-sight environment. Using commodity Wi-Fi devices, the disclosed system can capture the channel state information (CSI) and extract human radio biometric information from Wi-Fi signals using time-reversal (TR) technique. By leveraging a fact that broadband wireless CSI has a significant number of multipaths, which can be altered by human body interferences, the disclosed system can recognize individuals in the TR domain without line-of-sight radio. A prototype has been built for a TR human identification system using standard Wi-Fi chipsets with 3×3 MIMO transmission. The performance of the built system is evaluated and validated through multiple experiments. In general, the TR human identification system can achieve an accuracy of 98.78% for identifying about a dozen of individuals using a single pair of transmitter and receiver. Thanks to the ubiquitousness of Wi-Fi, the disclosed system can provide low-cost low-complexity reliable human identification applications based on radio biometrics.

In the present teaching, a novel concept of radio biometrics is disclosed, and accurate human identifications and verifications can be implemented with commercial Wi-Fi devices in a through-the-wall setting. The disclosed human identification system in the present teaching can distinguish and identify different individuals accurately with commercial MIMO Wi-Fi devices of a 40 MHz transmission bandwidth. The disclosed system can support simple and efficient algorithms to achieve a high-accuracy performance.

To achieve the goal of human identification, one can utilize the TR technique to capture the differences between human radio biometrics and to reduce the dimension of features. In an indoor environment, there exists a large amount of reflectors and scatterers. When a wireless signal emitted from the transmitter encounters them, it will travel along different propagation paths with different distances and suffer different fading effects. Consequently, the received signal at the receiver is a combination of copies of the same transmitted signal through different paths and delays. This phenomenon is called multipath propagation. TR technique takes advantage of the multipath propagation to produce a spatial-temporal resonance effect.

The present teaching discloses a TR human identification system that can distinguish and identify individuals by human radio biometrics extracted from the Wi-Fi CSI through the TR technique. By leveraging the TR technique to extract radio biometrics, a low-complexity human identification system can be widely implemented without restrictions on the device deployment thanks to the ubiquitousness of Wi-Fi. This new system can motivate a novel human identification technique relying on wireless sensing with Wi-Fi signals.

In one example, an apparatus for human identification is disclosed. The apparatus comprises a receiver and a processor. The receiver is configured for receiving at least one wireless signal from a multipath channel that is impacted by a person to be identified. The processor is configured for: extracting channel state information (CSI) from the at least one wireless signal, obtaining radio biometric information based on the CSI, wherein the radio biometric information represents how the at least one wireless signal was impacted by at least part of a body of the person, and determining an identity of the person based on the radio biometric information.

Determining the identity of the person may comprise retrieving each stored radio biometric information together with its associated identity from the database; calculating a degree of similarity between the radio biometric information and each stored radio biometric information; determining a highest degree of similarity among the degrees of similarity between the radio biometric information and all of the stored radio biometric information; determining a corresponding identity associated with the stored radio biometric information that gives the highest degree of similarity; and determining the identity of the person based on the highest degree of similarity and the corresponding identity. In another example, determining the identity of the person may comprise comparing the highest degree of similarity with a confidence threshold; determining the identity of the person to be the corresponding identity when the highest degree of similarity is greater than the confidence threshold; and determining that the identity of the person is unknown when the highest degree of similarity is not greater than the confidence threshold. The degree of similarity is calculated based on at least one of: a time-reversal resonance strength (TRRS), a cross-correlation, an inner product of two vectors, a similarity score, a distance score, a phase correction, a timing correction, a timing compensation, and a phase offset compensation, of the radio biometric information and each stored radio biometric information.

In one embodiment, obtaining radio biometric information based on each CSI comprises: compensating a phase distortion in the CSI; obtaining common human radio biometric information and static environment information; and subtracting the common human radio biometric information and the static environment information from the compensated CSI to obtain the radio biometric information. In one embodiment, the person to be identified is not within a line-of-sight of the receiver, such that no light can directly pass through a straight path between the person and the receiver. In one embodiment, the at least one wireless signal is received through a network that is at least one of: Internet, an Internet-protocol network, and another multiple access network; and the receiver is associated with a physical layer of at least one of: a wireless PAN, IEEE 802.15.1 (Bluetooth), a wireless LAN, IEEE 802.11 (Wi-Fi), a wireless MAN, IEEE 802.16 (WiMax), WiBro, HiperMAN, mobile WAN, GSM, GPRS, EDGE, HSCSD, iDEN, D-AMPS, IS-95, PDC, CSD, PHS, WiDEN, CDMA2000, UMTS, 3GSM, CDMA, TDMA, FDMA, W-CDMA, HSDPA, W-CDMA, FOMA, 1×EV-DO, IS-856, TD-SCDMA, GAN, UMA, HSUPA, LTE, 2.5G, 3G, 3.5G, 3.9G, 4G, 5G, 6G, 7G and beyond, another wireless system and another mobile system.

In another embodiment, obtaining radio biometric information based on each CSI comprises: estimating a multipath profile based on the CSI extracted from each of the plurality of wireless signals; and mapping different multipath profiles into a space based on a design of waveforms in a manner such that a similarity between different multipath profiles is minimized and a distance between different multipath profiles in the space is maximized. In yet another embodiment, obtaining radio biometric information based on each CSI further comprises: designing waveforms for CSI obtained in at least one of time domain and frequency domain; converting a problem of similarity minimization between different multipath profiles into a dual problem with a simple solution; and obtaining radio biometric information based on the different multipath profiles after the similarity of the different multipath profiles is minimized.

FIG. 1 shows an exemplary system for TR-based wireless communication, according to an embodiment of the present teaching. Suppose transceiver A gets an estimated multipath CSI, h(t), for the channel between A and B, the corresponding TR signature is obtained as $g(t)=h^*(-t)$. As transceiver A transmits back g(t) over the air, a spatial-temporal resonance is produced at transceiver B. The TR spatial-temporal resonance is generated by fully collecting the energy of the multipath channel and concentrating into a particular location. In physics, spatial-temporal resonance, known as focusing effect, is a result of a resonance of electromagnetic (EM) field, in response to the environment. This resonance is sensitive to environment changes, which can be used for capturing differences in multipath CSI. The disclosed TR human identification system may utilize not only human's face, but also an entire physical characteristic profile of each individual.

The concept of TR spatial-temporal resonance has been established as theory and validated through experiments. The TR technique relies on two verified assumptions of channel reciprocity and channel stationarity. Channel reciprocity demonstrates a phenomenon that the CSI of both forward and backward links is highly correlated, whereas channel stationarity establishes that the CSI remains highly correlated during a certain period. A TR-based indoor localization approach implemented under a 125 MHz bandwidth can achieve a centimeter accuracy even with a single access point (AP) working in non-line-of-sight (NLOS) environments. A TR indoor locationing system on a Wi-Fi platform can utilize the location-specific fingerprints generated by concatenating the CSI with a total equivalent bandwidth of 1 GHz.

The present teaching presents a TR human identification system for identifying individuals through the walls, in absence of any LOS path, based on the human radio biometrics in Wi-Fi signals. This can verify an existence of human radio biometrics, which can be found embedding in the wireless CSI. Moreover, the present teaching discloses a human recognition system that extracts unique radio biometrics as features from the CSI for differentiating between people through the wall. As in this disclosure, "radio shot" may refer to a procedure to take and record human radio biometrics via Wi-Fi signals. The disclosed method for human identification may comprise two main parts: a refinement of human radio biometrics and the TR-based identification. The refinement is designed to remove the common CSI components coming from static objects in the environment and the similarity in the radio biometrics of all participants, and to extract the CSI components that contain distinctive human radio biometrics. In the TR-based identification part, the extracted human radio biometric information is mapped into the TR space and the similarity between different biometrics is quantified and evaluated using the time-reversal resonance strength (TRRS). The performance of the disclosed identification system can achieve a 98.78% identification rate when distinguishing between 11 individuals.

The present teaching introduces a concept of human radio biometrics, which accounts for the wireless signal attenuation and alteration brought by human. Through experiments, its existence has been verified and its ability for human identification has been illustrated. In general, object radio biometrics may refer to the wireless signal attenuation and alteration brought by an object, and can be used for object identification. The procedure to collect human radio biometrics is named as radio shot. Because the dominant component in the CSI comes from the static environment rather than human body, the human radio biometrics are embedded and buried in the multipath CSI. To boost the identification performance, the present teaching discloses novel algorithms for extracting individual human radio biometrics from the wireless channel information. Radio biometrics extracted from the raw CSI are complex-valued and high-dimensional. To address this problem, one can apply the TR technique to fuse and compress the human radio biometrics and to differentiate between radio biometrics of different people, by using the strength of the spatial-temporal resonances. For performance evaluation, a prototype has been built to implement the TR human identification system using off-the-shelf Wi-Fi chipsets, and test in an indoor office environment during normal working hours with an identification rate as 98.78% in identifying about a dozen of individuals.

The present teaching demonstrates a potential of using commercial Wi-Fi signals to capture human radio biometrics for individual identifications. The disclosed TR human identification system is capable of capturing human biometrics and identifying different individuals through the walls. The human radio biometrics that are embedded in the CSI contain the Wi-Fi reflections and scattering by human body in the indoor environment. As a result, the human radio biometrics, due to the differences in human biological metrics, are different among different individuals. In addition, by leveraging the TR technique, the disclosed system can easily extract the human radio biometrics from the CSI for distinguishing between individuals. This procedure is called radio shot.

Figure 2:
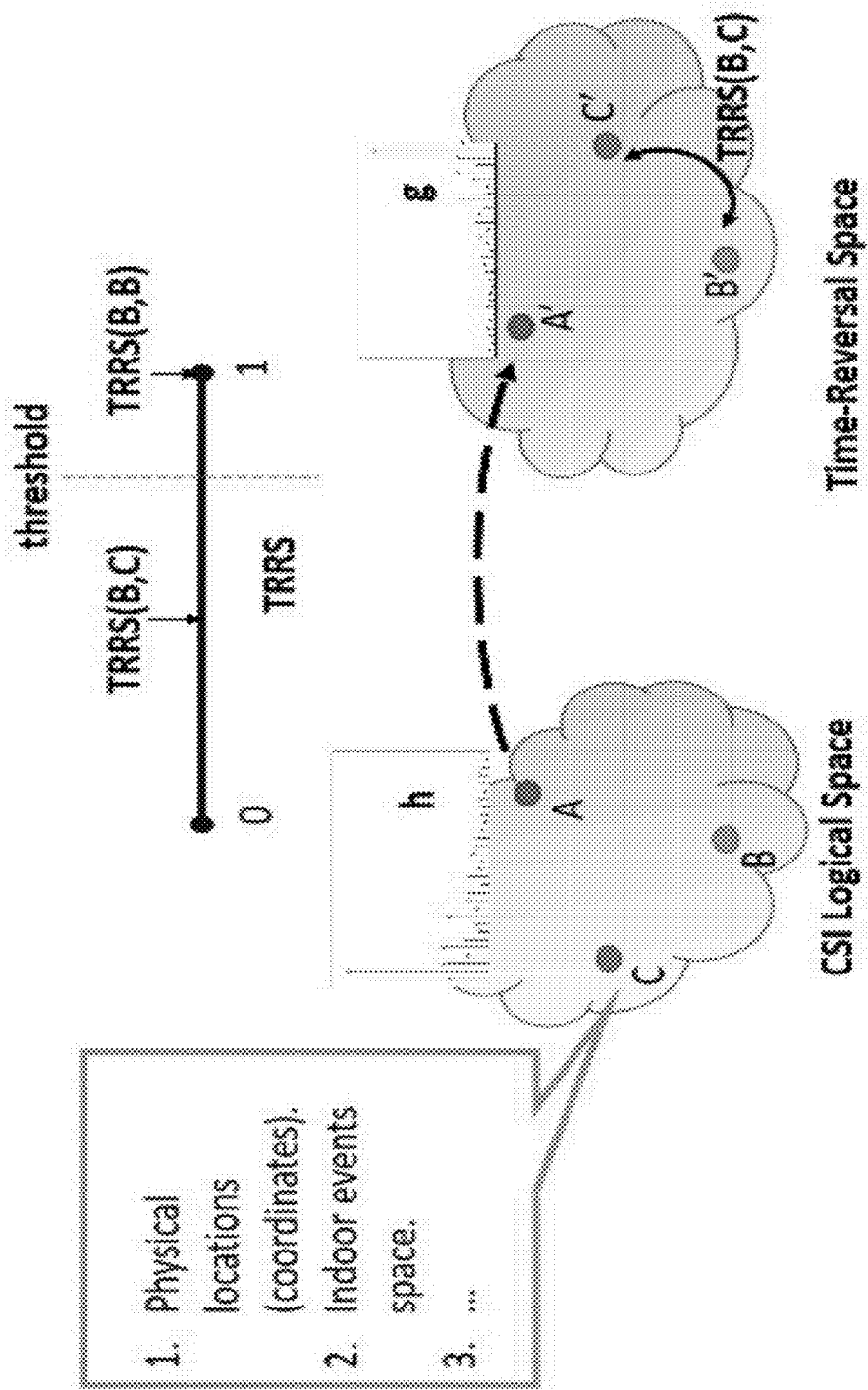
FIG. 2 shows an example for mapping between a CSI logical space and a time-reversal (TR) space, according to an embodiment of the present teaching.

FIG. 2 shows an example for mapping between a CSI logical space and a TR space, according to an embodiment of the present teaching. During the wireless transmission, signals encounter different objects in the environment, and the corresponding propagation path and characteristics change accordingly before arriving at the receiver. As demonstrated in FIG. 2, each dot in the CSI logical space may represent a snapshot of an indoor environment, e.g., an indoor location and an indoor event, which can be uniquely determined by the multipath profile h. By taking a time-reverse and conjugate operation over the multipath profile, the corresponding TR signature g is generated. Consequently, each of the points in the CSI logical space as marked by "A", "B", and "C" can be mapped into the TR space as points "A", "B", and "C", respectively. In the TR space, a similarity between two profiles can be quantified by TRRS. A TRRS, as strength of the TR resonance, is a measurement of a similarity between two CSI samples. TRRS can be used as a matching score between any two vectors, where each vector represent CSI or any profile in a TR space. The higher the TRRS is, the more similar two profiles in the TR space are. Similar profiles constrained by a threshold on TRRS can be assigned into a single class.

Taking advantage of the TR technique and the TR space, an indoor locationing system can achieve centimeter-level accuracy, where each of the indoor physical locations is mapped into a logical location in the TR space and can be easily separated and identified using TRRS. The TR based centimeter-level indoor locationing system can be implemented using commercial Wi-Fi chipsets. When leveraging the TR technique to capture the characteristics of multipath profile at different locations, two locations, even only with a distance of 1 to 2 centimeters, are far away in the TR space and can be easily distinguished by the disclosed system.

The wireless propagation around the human body may highly depend on the physical characteristic (e.g., height and mass), the total body water volume, the skin condition and other biological tissues. The human radio biometrics, recording the features in interactions between EM waves and human bodies, are unique among different individuals and can be mapped into separate points in the TR space. Hence, the disclosed system, by leveraging the TR technique, is capable of capturing the differences in the multipath profiles introduced by different individuals, even when they stand at the same location with the same posture under a through-the-wall setting.

A system prototype is built with one 3-antenna transmitter (TX) and one 3-antenna receiver (RX). The CSI samples are obtained from commodity Wi-Fi chips. The system is operated at carrier frequency 5.845 GHz with 40 MHz bandwidth. Due to the 3×3 MIMO transmission, each measurement comprises 9 pieces of the CSI for each transmitting-receiving antenna pair. Each CSI contains 114 complex values representing 114 accessible subcarriers in a 40 MHz band.

Figure 3:
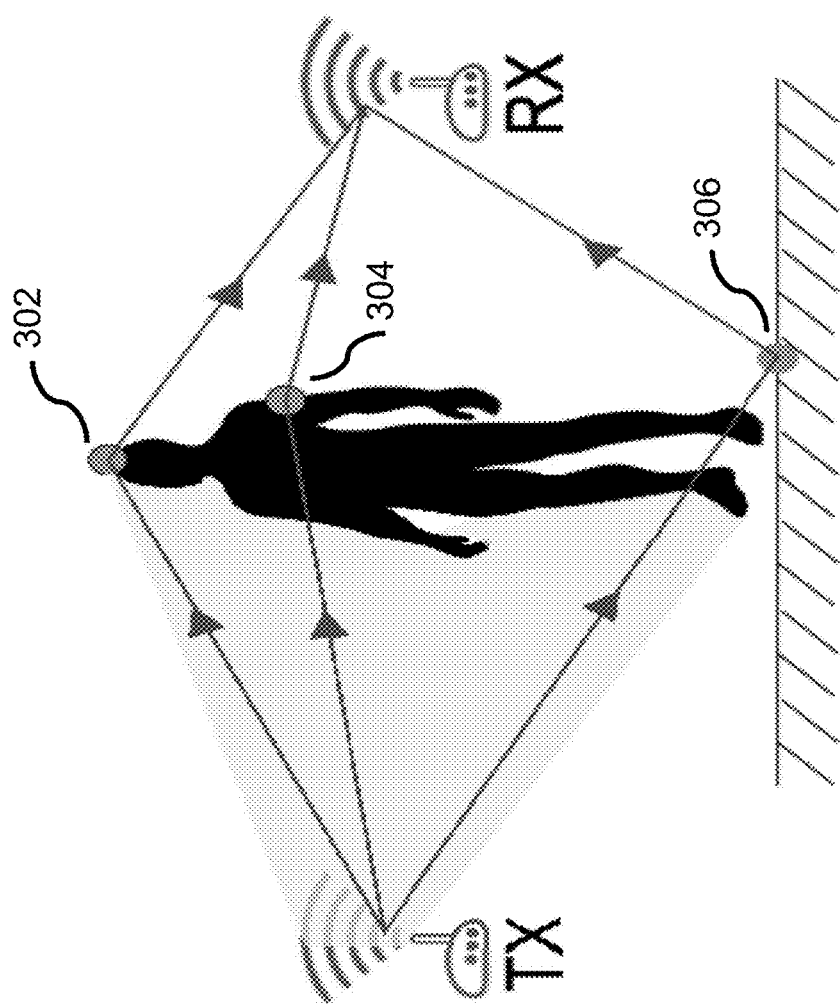
FIG. 3 shows exemplary RF reflections and scattering around human, according to an embodiment of the present teaching.
Figure 4:
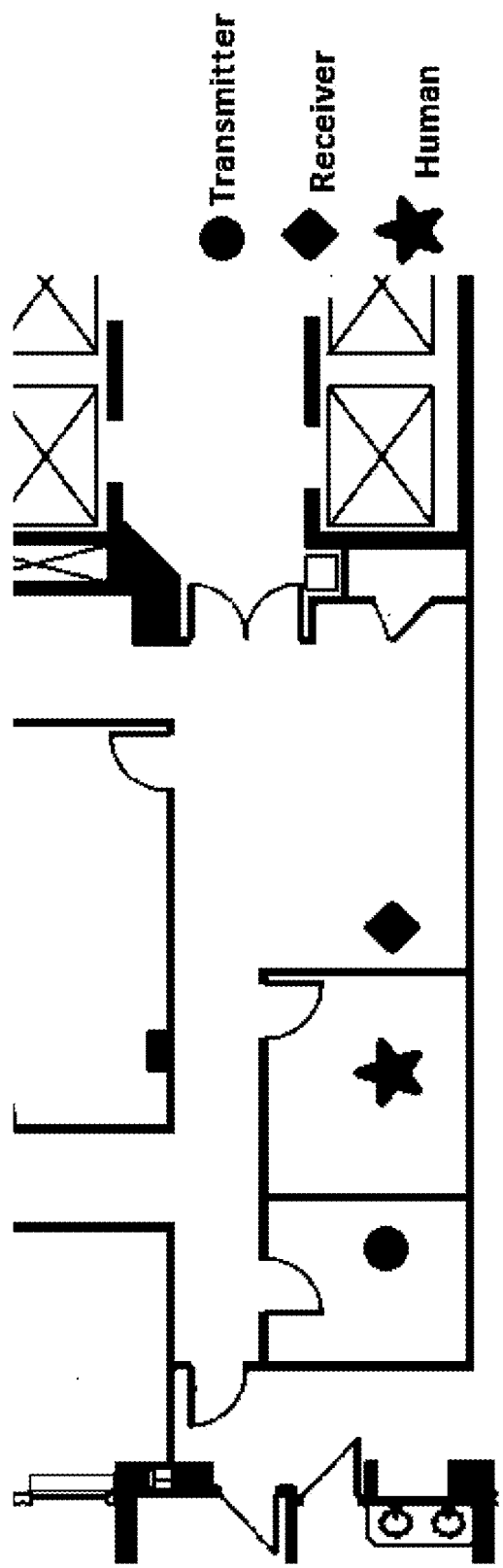
FIG. 4 shows an exemplary experiment setting for human identification with frequency domain CSI, according to an embodiment of the present teaching.

FIG. 3 shows exemplary RF reflections and scattering around human, according to an embodiment of the present teaching. As shown in FIG. 3, in an indoor wireless signal propagation environment, the human body acts as a reflector and the dots 302, 304, 306 represent the reflecting and scattering points due to the human body and other objects. Since the wireless signal reaches the receiving antenna from more than one path, the human radio biometrics are implicitly embedded in the multipath CSI profile. However, the human body may only introduce a few paths to the multipath CSI, and the energy of those paths is small due to low reflectivity and permittivity of human body compared with other static objects such as walls and furniture. As a result, the human radio biometrics, captured through radio shot, may be buried by other components in the CSI.

Furthermore, because the raw CSI obtained from Wi-Fi chips is a 9×114 complex-valued matrix, the resulting raw radio biometrics are high-dimensional and complex valued, which further complicates the identification and classification problem and increases the computation complexity.

To address the above problems, the disclosed system can exploit the TR techniques and utilize several post-processing algorithms to extract the human radio biometrics and magnify the difference among individuals. Specifically, the system can use a background subtraction algorithm such that the common information in the CSI can be removed and the distinctive human radio biometrics are preserved. By leveraging the TR technique, the human radio biometrics in the form of complex-valued matrices can be related to the corresponding individual through a real-valued scalar, the TRRS.

The disclosed time reversal human identification system exploits the above idea and may comprise two main components: human radio biometrics refinement and TR-based identification.

The module of human radio biometrics refinement can extract the human biometric information from the raw CSI measurement which is a 9×114 complex-valued matrix. Due to the independency of each link, the background for each link may be calculated and compensated individually. An important consideration is that, for each CSI measurement, it may be corrupted by the sampling frequency offset (SFO) and the symbol timing offset (STO). Hence, before background calculation and compensation, the phase of each CSI measurement should be aligned first, for example, using methods disclosed in applications PCT/US2017/015909 and PCT/US2016/066015, which are incorporated herein by reference in their entireties. After alignment, based on the assumption that the human radio biometrics only contribute small changes in the multipath, the background can be obtained by taking an average of several CSI measurements.

Once the 9×114 complex-valued human radio biometric information is refined, the module of TR-based identification can simplify the identification problem by reducing the high-dimension complex-valued feature into a real-valued scalar. By leveraging the TR technique, the module can map human radio biometrics into the TR space and utilize the TRRS to quantify the differences between different radio biometrics.

The disclosed system can work when the wireless multipath comes from the environment where the EM signals undergo different reflecting and scattering paths and delays. The wireless propagation around the human body may highly depend on individual physical characteristics and conditions of biological tissues. Since it is rare for two individuals to have exactly the same biological physical characteristics, the multipath profiles after human interferences are therefore different among different persons. The human radio biometrics, which record how the wireless signal interacts with a human body, is altered accordingly to individuals' biological physical characteristics and can be viewed as unique among different individuals. Through Wi-Fi sounding, the wireless CSI is collected, as well as the human radio biometrics.

Mathematically, an indoor CSI (a.k.a. Channel frequency response, CFR) for the $m^{th}$ link with the presence of human body can be modeled as a sum of the common CSI component and the human affected component:

$$h_i^{(m)} = h_0^{(m)} + \delta h_i^{(m)}, i=1,2,\ldots,N, \quad (1)$$

where N is the number of individuals to be identified. $h_i^{(m)}$ is a L×1 complex-valued vector, which denotes the CSI when the $i^{th}$ individual is inside; L is the number of subcarriers, i.e., the length of the CSI; $h_0^{(m)}$, defined as the static CSI component, is generated from the static environment in the absence of human; and $\delta h_i^{(m)}$ denotes the perturbation in the CSI introduced by the $i^{th}$ individual. Here, the $\delta h_i^{(m)}$ is the raw human radio biometric information of the $i^{th}$ individual embedding in the CSI of the $m^{th}$ link.

At the receiver side, after each channel state sounding, one can collect a L×M raw CSI matrix for each individual as:

$$H_i = [h_i^{(1)}, h_i^{(2)}, \ldots, h_i^{(M)}], \forall i, \quad (2)$$

with the corresponding human radio biometric information matrix being:

$$\delta H_i = [\delta h_i^{(1)}, \delta h_i^{(2)}, \ldots, \delta h_i^{(M)}], \forall i, \quad (3)$$

where M is the number of links between the transmitter and the receiver.

For human identification and recognition, there are two major problems: first, both $\delta H_i$ and $H_i$ are L×M complex-valued matrices, such that without appropriate data processing, the classification problem based on the raw data is complex-valued and of high computation complexity; second, since $h_0^{(m)}$ is unknown, it is hard to extract the buried biometric information $\delta H_i$ directly from the CSI measurement $H_i$.

To tackle the first problem, one can incorporate the TR technique to reduce the data dimension by transforming the feature space into TR spatial-temporal resonance. For the second problem, data post-processing algorithms are disclosed to refine the human radio biometrics from the raw CSI information.

As discussed before, when transmitting back the TR signature through the corresponding multipath channel, a spatial-temporal resonance may be generated by fully collecting energy of the multipath channel into a particular location in a rich-scattering indoor environment. The spatial-temporal resonance can capture even minor changes in the multipath channel, and can be utilized to characterize the similarity between two multipath CSI realizations.

The strength of TR spatial-temporal resonance, i.e., the TRRS, in frequency domain can be defined as below.

Definition: The strength of TR spatial-temporal resonance $\mathcal{TR}(h_1, h_2)$ in frequency domain between two CFRs $h_1$ and $h_2$ is defined as:

$$\mathcal{TR}(h_1, h_2) = \frac{\max_\phi |\Sigma_k h_1[k]g_2[k]e^{jk\phi}|^2}{(\Sigma_{l=0}^{L-1}|h_1[l]|^2)(\Sigma_{l=0}^{L-1}|h_2[l]|^2)}. \quad (4)$$

Here, L is the length of CFR and $g_2$ is the TR signature of $h_2$ obtained as $$g_2[k] = h^*_2[k], k=0,1,\ldots,L-1. \quad (5)$$

Hence, the higher the value of $TR(h_1, h_2)$ is, the more similar $h_1$ and $h_2$ are.

For two CSI measurements $H_i$ and $H_j$ in a MIMO transmission, one can obtain a 1×M TRRS vector as $$[\mathcal{TR}(h_i^{(1)}, h_j^{(1)}), \mathcal{TR}(h_i^{(2)}, h_j^{(2)}), \ldots, \mathcal{TR}(h_i^{(M)}, h_j^{(M)})].$$

Then, the TRRS between two CSI matrices $H_i$ and $H_j$ is defined as an average of the TRRSs on each of the links:

$$\mathcal{TR}(H_i, H_j) = \frac{1}{M}\sum_{m=1}^{M} \mathcal{TR}(h_i^{(m)}, h_j^{(m)}). \quad (6)$$

After taking the radio shot, by means of the TR signal processing, the high-dimension complex-valued human radio biometrics embedded in the CSI measurements can be mapped into the TR space, and the feature dimension is reduced from L×M to 1. The human recognition problem can be implemented as a simple multi-class classification problem as below.

For any CSI measurement H, given a training database including the CSI samples of each individual $H_i$, $\forall i$, the predicted individual identity (ID) is obtained based on the TRRS as:

$$\hat{i} = \begin{cases} \arg\max_i \mathcal{TR}(H, H_i), & \text{if } \max_i \mathcal{TR}(H, H_i) \geq \mu, \\ 0, & \text{otherwise,} \end{cases} \quad (7)$$

where μ is a predefined threshold for triggering the identification, and $\hat{i}=0$ denotes an unidentified individual.

However, as discussed above, the embedded human radio biometric information δH is small compared with other CSI components in measurement H. The resulting TRRS $\mathcal{TR}(H, H_i)$ may become quite similar among different samples to degrade the accuracy of identification. In order to improve the identification performance, one can remove the common components from each CSI measurement, and to extract and refine the embedded human biometrics features after taking the radio shot.

As the presence of human body can change the multipath propagation environment of Wi-Fi signals, the human radio biometrics are implicitly embedded in the CSI measurements. But because only a few paths are affected by the human body, the human biometrics CSI component for the $i^{th}$ individual in the $m^{th}$ link, $\delta h_i^{(m)}$, is small in energy, compared with the common CSI component $h_0^{(m)}$ in equation (1). Without a refinement of the radio biometric information, the common feature $h_0^{(m)}$ in the CSI dominates in the TRRS in equations (4) and (6). Moreover, since there exists similarity between different human bodies, it is inevitable to have resemblances in the human radio biometric information $\delta h_i^{(m)}$. As a result, even though the spatial-temporal resonance captures $\delta h_i^{(m)}$, the difference between the TRRSs for different individuals may become too small to differentiate between people. Accordingly, the present teaching discloses post-processing algorithms to extract the useful human radio biometric information from the CSI, after taking the radio shot. This process is called human radio biometrics refinement, which can include the following two main steps.

The first step is phase compensation. In reality, the estimated CSI can be corrupted by different initial phases of each measurement and different linear phases on each subcarrier due to the time synchronization error. Therefore, in order for the disclosed system to extract and subtract out correct background CSI components, it is indispensable to compensate for phase errors in all the raw CSI measurements.

The second step is background information subtraction. The CSI is modeled as the sum of static background CSI components and human biometrics CSI components. As such, the radio biometric information can be extracted by the system through subtracting out the common information in the CSI.

While there are various methods, e.g. methods disclosed in applications PCT/US2017/015909 and PCT/US2016/066015, to compensate the phase corruption, the following shows an exemplary algorithm called Phase Alignment Algorithm, for compensating the phase corruption.

Considering the phase errors, each CSI h(m) can be mathematically modeled as:

$$h^{(m)}[k] = |h^{(m)}[k]| \exp\{-j(k\phi_{linear} + \phi_{ini})\}, \quad (8)$$
$$k = 0, 1, \cdots, L-1,$$

where $\phi_{linear}$ denotes the slope of the linear phase. $\phi_{ini}$ is the initial phase, and both of them are different for each CSI.

Unfortunately, there is no way to explicitly estimate either $\phi_{linear}$ or $\phi_{ini}$. To address the phase misalignment among the CSI measurements, for each identification task, one can pick one CSI measurement in the training database as the reference and align all the other CSI measurements based on this reference.

For example, one can use the linear phase difference $\delta\phi_{linear}$ between the reference and the other CSI samples. For any given CSI $h_2$ and reference $h_1$ from the same link, one can have $$\delta\phi_{linear} = \underset{\phi}{\mathrm{argmax}} |\Sigma_k h_1[k] h_2^*[k] \exp\{jk\phi\}|. \quad (9)$$

To align the linear phase of the CSI $h_2$ according to the reference, one may simply compensate for this difference on each subcarrier through $$\hat{h}_2[k] = h_2[k] \exp\{-jk\delta\phi_{linear}\}, k=0,1,\ldots,L-1. \quad (10)$$

Once upon all the linear phase differences of the CSI measurements have been compensated based on the reference, the next step is to cancel the initial phase of the CSI for each link, including the reference. The initial phase is obtained as the phase on the first subcarrier for each CSI $\angle\hat{h}[0]$, and can be compensated as $$h_{align} = \hat{h} \exp\{-j\angle\hat{h}[0]\}. \quad (11)$$

Both the background and the refined human biometric information may be extracted from the aligned CSI measurements $h_{align}$. To simplify notation, h instead of $h_{align}$ will be used to denote the aligned CSI in the rest of the present teaching.

A Background Subtraction Algorithm can be used in the second step for background information subtraction. In general, there are typically two types of background subtraction: 1) direct subtraction, and 2) deconvolution.

1) Direct Subtraction: In this type of background subtraction, the first step is to estimate the background, a.k.a., common information in the collected CSI samples. Once the common information is obtained, the background subtraction is carried out through subtracting a scaled version of the common information from (phase-aligned) CSI samples. The scale factor is within the range of [0, 1]. Typically, we will choose a factor smaller than 1 to avoid emphasizing noise in the samples.

2) Deconvolution: In real-world radio wave propagation, every object in the environment may alter the radio wave propagation path, which is often modeled as a convolution process where the channel without the object is functioning as a filter (h). Hence, the incident channel affected by the object is the output of the filter (h*g) while the input of the filter (g) is the characteristics of the object with respect to the radio wave. Hence, in order to extract the characteristic information of the object (g), with the knowledge of (g*h), one could find a filter corresponding to the static environment channel. In the deconvolution method, the first step may be to estimate the filter parameters and features of h. Once the channel filter is built, the deconvolution filter can be built through inverting the channel filter inv(h). Then, by passing the object-affected CSI (h*g) through the deconvolution filter inv(h), the characteristics g can be extracted.

In the disclosed CSI model in equation (1), the radio biometrics $\delta h_i^{(m)}$ also involves two parts: the common radio biometric information and the distinct radio biometric information. Thus, $h_i^{(m)}$ can be further decomposed as following:

$$h_i^{(m)} = h_0^{(m)} + \delta h_{i,c}^{(m)} + \delta h_{i,ic}^{(m)}, \forall i, m, \quad (12)$$

where $\delta h_i^{(m)} = \delta h_{i,c}^{(m)} + \delta h_{i,ic}^{(m)}$. $\delta h_{i,c}^{(m)}$ denotes the common radio biometric information, which is determined by all the participants in the identification system. Meanwhile, $\delta h_{i,ic}^{(m)}$ is the corresponding distinct radio biometric information, remaining in the extracted radio biometrics after taking out the common biometric information.

The background CSI components for several CSI measurements of N individuals can be estimated by taking the average over the aligned CSI as:

$$h_{bg}^{(m)} = \frac{1}{N} \sum_{i=1}^{N} \frac{h_i^{(m)}}{\|h_i^{(m)}\|^2}. \quad (13)$$

Then the human radio biometrics for each individual can be extracted through subtracting a scaled version of the background in equation (13) from the original CSI.

$$\tilde{h}_i^{(m)} = h_i^{(m)} - \alpha h_{bg}^{(m)}, \quad (14)$$

where $\alpha$ is the the background subtraction factor, $0 \leq \alpha \leq 1$. It cannot be too close to 1 as the remaining CSI will be noise-like.

After obtaining the refined radio biometrics $\tilde{h}_i^{(m)}$ for each link, the classification problem based on the TRRS in equation (7) becomes:

$$\hat{i} = \begin{cases} \underset{i}{\operatorname{argmax}} \mathcal{TR}(\tilde{H}, \tilde{H}_i), & \text{if } \max_i \mathcal{TR}(\tilde{H}, \tilde{H}_i) \geq \mu, \\ 0, & \text{otherwise,} \end{cases} \quad (15)$$

where $\tilde{H}_i$ is the refined radio biometric information matrix for individual i and $$\tilde{H}_i = [\tilde{h}_i^{(1)}, \tilde{h}_i^{(2)}, \ldots, \tilde{h}_i^{(M)}], \forall i. \quad (16)$$

$\tilde{H}_i$ is an approximation of the distinctive component in the human radio biometric information matrix $\delta H_i$ defined in equation (3).

Figure 6A:
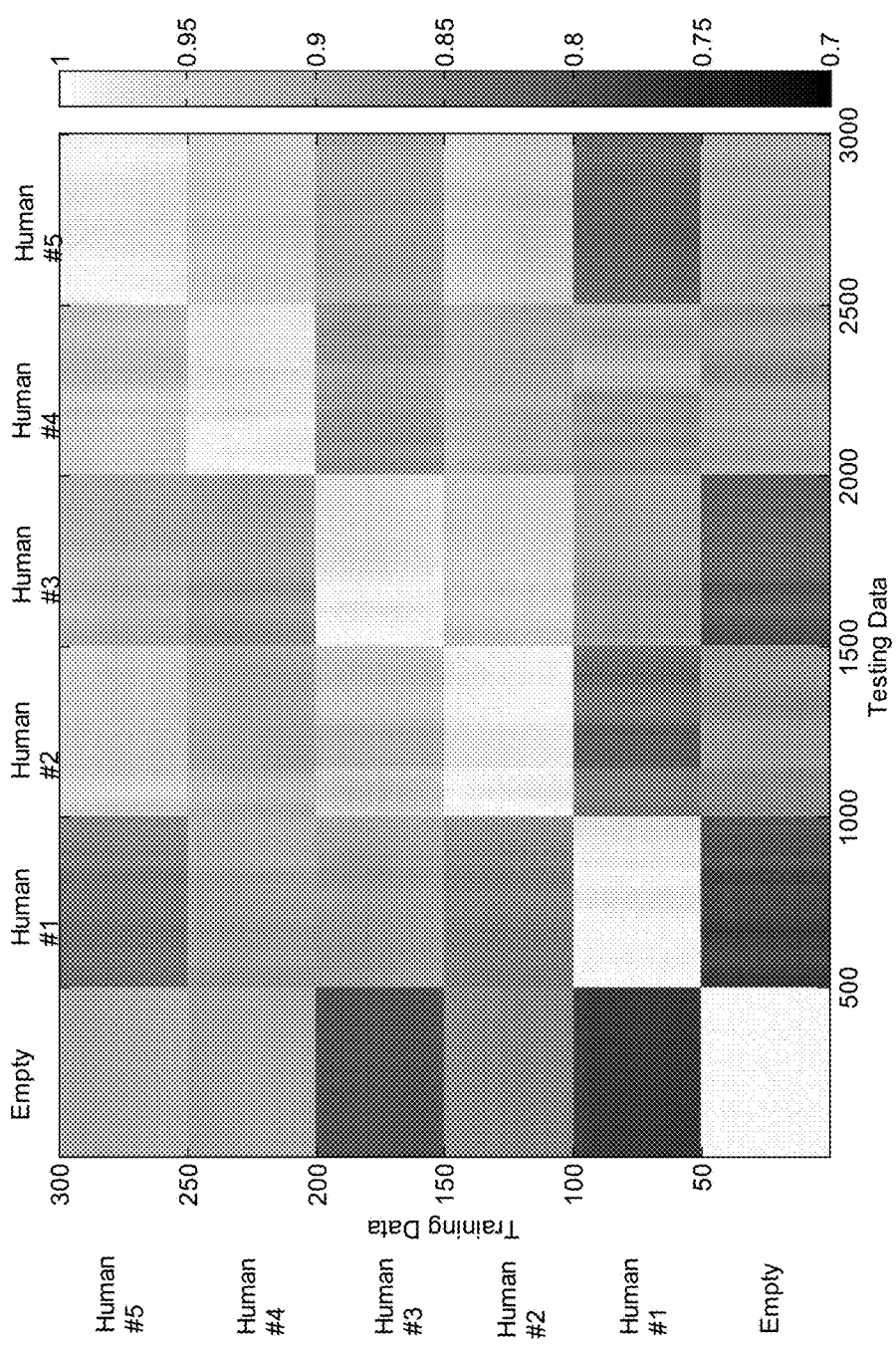
FIG. 6A shows an exemplary time-reversal resonance strength (TRRS) map without background subtraction, according to an embodiment of the present teaching.
Figure 6B:
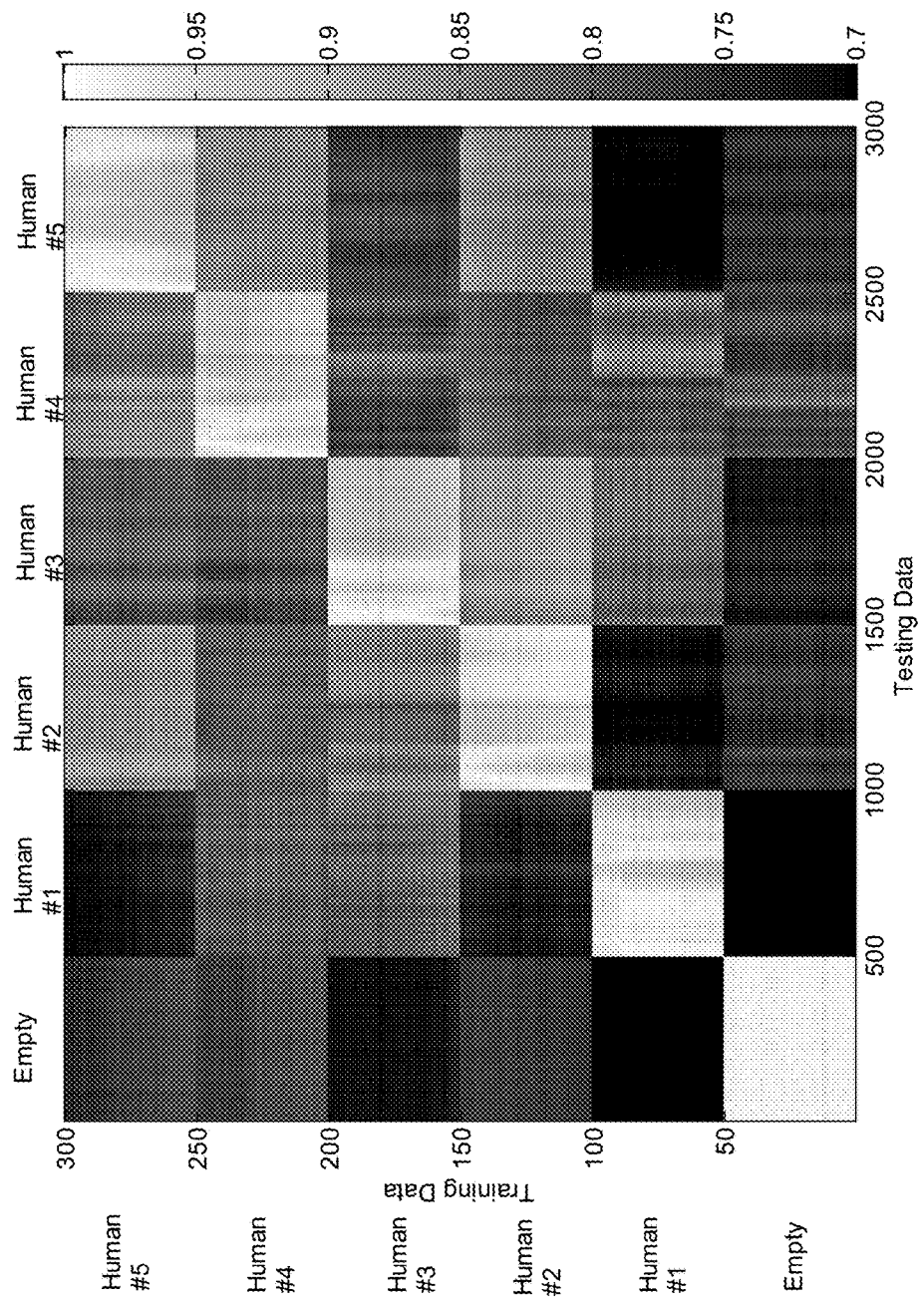
FIG. 6B shows an exemplary TRRS map after background subtraction with $\alpha=0.5$, according to an embodiment of the present teaching.

An example is shown in FIG. 6A and FIG. 6B, where the TRRS $\mathcal{TR}$ (H, H$_i$) before background subtraction is plotted in FIG. 6A while that of $\mathcal{TR}$ ($\tilde{H}$,$\tilde{H}_i$), is shown in FIG. 6B, with the background as the average of all CSI measurements in training database. The comparison between FIG. 6A and FIG. 6B demonstrates that the refinement of human radio biometrics helps to improve the sensitivity of TRRS for differentiating between individuals. The disclosed background subtraction algorithm suppresses the spatial-temporal resonance of the CSI between different classes while maintaining strong resonance within the same class.

For the disclosed system, if there are K subjects to be identified, the computational complexities for building the training database and testing are both O(M×(K+1)×N log$_2$N), where M is the number of either the training CSI samples or the testing CSI samples for each subject. N is the search resolution for $\phi$ in equations (4) and (9), where typical values for N are 512 and 1024.

By leveraging the TR technique to capture human radio biometrics embedded in the CSI of Wi-Fi signals, the disclosed system is capable of identifying different individuals in real office environments with high accuracy. The performance of human identification has been evaluated. For the disclosed system, the training, i.e., taking the radio shot, may be simple and can be done in seconds.

Some exemplary evaluation experiments have been conducted in the office at a 10$^{th}$ floor of a commercial office building with a total of 16 floors. All the experiments were conducted during the normal working hours in weekdays, so that outside the experiment office there are many activities, such as human walking and elevator running, happening at the same time as the experiments run.

Figure 5:
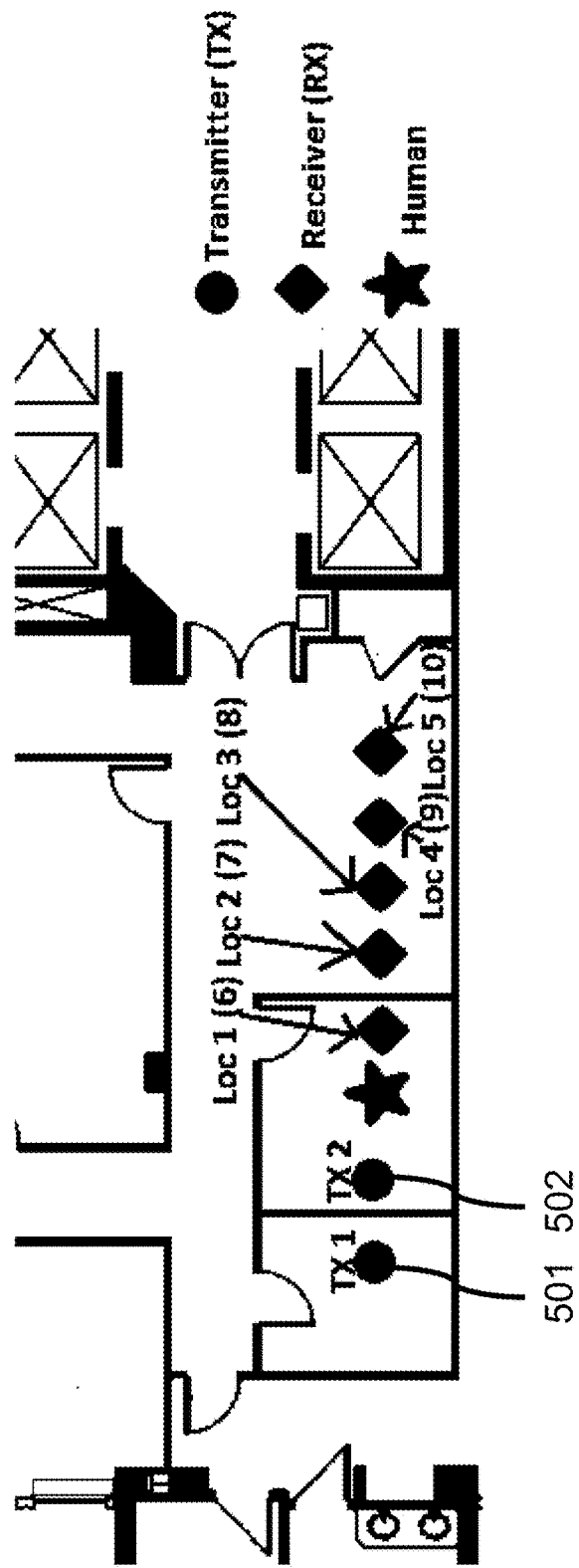
FIG. 5 shows exemplary locations of test subjects and devices for an experiment of human identification, according to an embodiment of the present teaching.

FIG. 5 shows exemplary locations of test subjects and devices for an experiment of human identification, according to an embodiment of the present teaching. In FIG. 5, the experiment configurations of the transmitter, receiver and individuals are demonstrated. Both Wi-Fi devices are placed on the cart or table with height from the ground being 2.8 ft. When the transmitter (bot) was at location denoted as "TX 2" 502, the receiver (RX) was placed at the five locations denoted from "Loc 1" to "Loc 5". When the bot was placed at location "TX 1" 501, the receiver was placed at five locations denoted from "Loc 6" to "Loc 10" respectively. These 10 TX-RX locations can represent Line-of-sight (LOS) scenario ("Loc 1"), non LOS (NLOS) scenarios ("Loc 2" to "Loc 6"), and through-the-wall scenarios ("Loc 7" to "Loc 10"). When taking the radio shot, each individual, to be recognized, stands in the room on the point marked by the star when the door of that room was closed.

In the experiments, a training database was built with 50 CSI measurements for each class, while the size of the testing database for identification is 500 CSI measurements per class. In one embodiment, the 50 CSI measurements for each class can be averaged to get one representative CSI for the particular class and that representative can be stored in the database. For testing, one can measure CSI once and use that CSI to compare with the CSIs in the training database. One can also collect multiple CSIs during the testing phase, calculate multiple TRRSs between the multiple CSIs during the testing phase and a CSI representative of a particular class in the training database, and choose the highest TRRS as the TRRS of the particular class, then choose the highest one among the TRRS values of all classes.

The physical characteristics of test subjects are listed in FIG. 20. The first five test subjects in FIG. 20 participated in experiments in Section A and Section B below, while all the 11 test subjects participated in the identification experiment in Section C below. The test subject #2 was the individual subject in the verification experiments in Section D below.

A. Impact of Background Subtraction

The experiments in this section aimed to quantitatively study the impact of the disclosed background subtraction and biometrics refinement algorithms on human recognition. FIG. 6A shows an exemplary time-reversal resonance strength (TRRS) map without background subtraction, according to an embodiment of the present teaching, while FIG. 6B shows an exemplary TRRS map after background subtraction with $\alpha$=0.5, according to an embodiment of the present teaching. As shown in FIG. 6A and FIG. 6B, after refinement the spatial-temporal resonance between the training and the testing CSI from different classes is suppressed a lot while maintaining a high TRRS for the CSI from the same class.

In Tables shown in FIG. 21A and FIG. 21B, the performance matrices for human identification are listed to show the performance improvement after refining the radio biometrics. FIG. 21A shows a performance matrix of individual identification without background subtraction, according to an embodiment of the present teaching. FIG. 21B shows a performance matrix of individual identification after background subtraction with $\alpha$=0.5, according to an embodiment of the present teaching. Each element of the performance matrix is the probability for that the TRRS between the training and the testing classes is higher than the threshold $\mu$. A higher value in the diagonal means a larger chance of correct identifications. However, larger off-diagonal elements indicate higher false alarm rates because it implies that the testing sample may be misclassified to the wrong training class with a higher probability if the testing class has never been included in the training set.

Both of the matrices in FIG. 21A and FIG. 21B have the same threshold $\mu$=0.9 as defined in equations (7) and (15). Without background subtraction, although the diagonal value can reach 100%, the off-diagonal ones can be as high as 99.99% as shown in FIG. 21A. A high off-diagonal value implies a larger chance to have a false alarm between these particular training and testing classes. Nevertheless, after background subtraction, when using the refined radio biometrics for identification, the largest off-diagonal value drops to 0.24% while maintaining the diagonal elements higher than 96.35%.

How to choose the background CSI components is essential for a good radio biometrics refinement. The performance of identification has been studied under three schemes: no background subtraction, subtraction with the static environment background (e.g., the CSI collected in a room with no human), and subtraction with the background consisting of static environment and common radio biometrics.

Figure 7A:
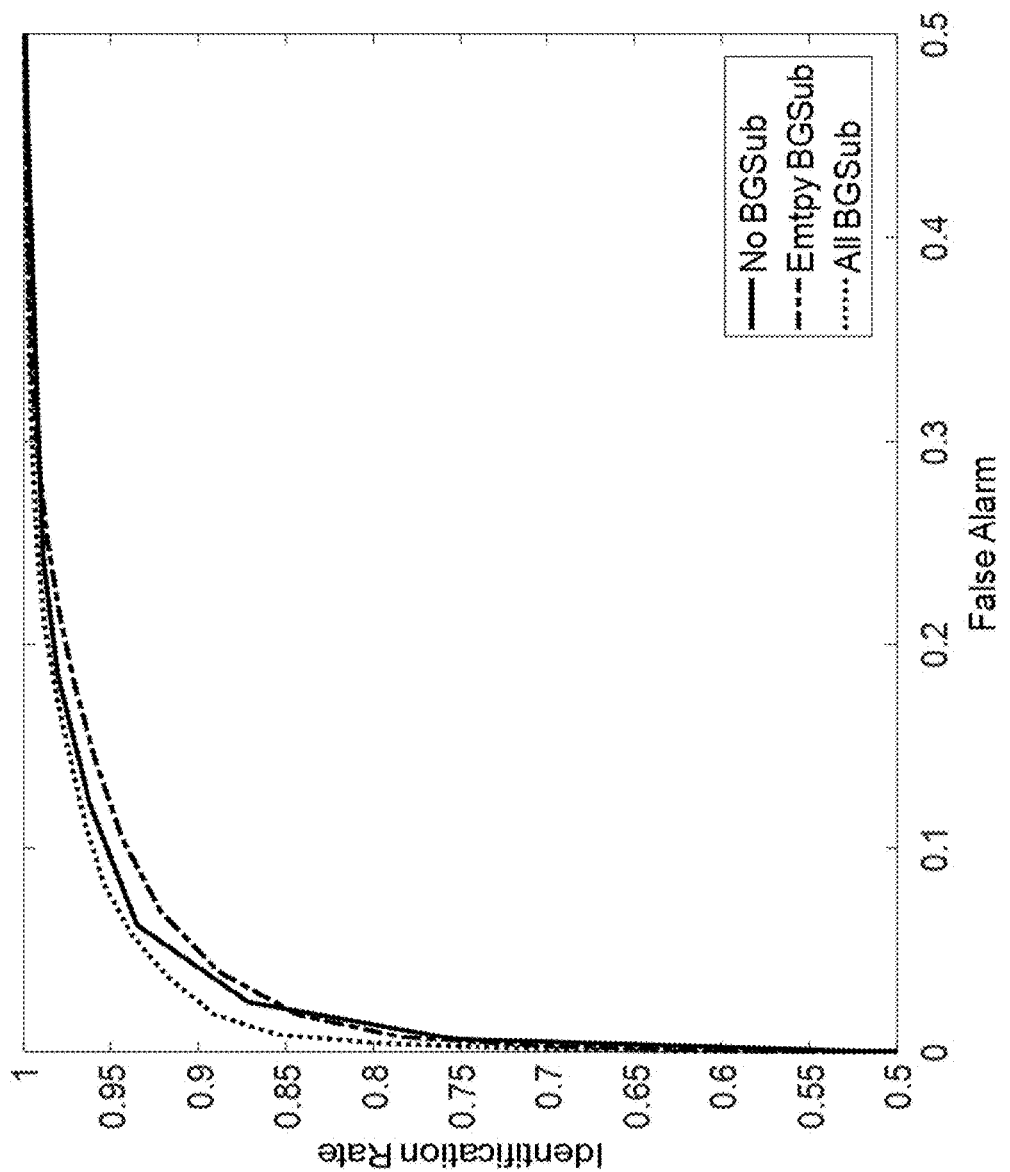
FIG. 7A shows an evaluation on receiver operating characteristic (ROC) curves for background subtraction and transmitter-receiver (TX-RX) locations, with different selected backgrounds, according to an embodiment of the present teaching.

FIG. 7A shows an evaluation on receiver operating characteristic (ROC) curves for background subtraction and transmitter-receiver (TX-RX) locations, with different selected backgrounds, according to an embodiment of the present teaching. The ROC curves, which are obtained by averaging the ROC performance measured at all 10 TX-RX locations, show how the identification rate and false alarm rate vary as the decision threshold $\mu$ changes. The dashed line denotes the performance when using all the CSI measurements in training data set as the background (i.e., the background including static environment and common radio biometrics), while the solid line and dotted line represent the case of no background subtraction and subtraction with the static environment background, respectively. Here, the background subtraction factor is $\alpha=0.5$. The performance of the system using all the training CSI measurements outperforms the others. The reason is that, by taking the average of the CSI samples from all the classes as the background, the system can effectively eliminate the high correlated and similar component, that is the estimation of $h_0^{(m)}+\delta h_{i,c}^{(m)}$ as defined in equation (12), in radio biometrics for different individuals, and thus enlarge the difference between the radio biometrics of different people.

Figure 7B:
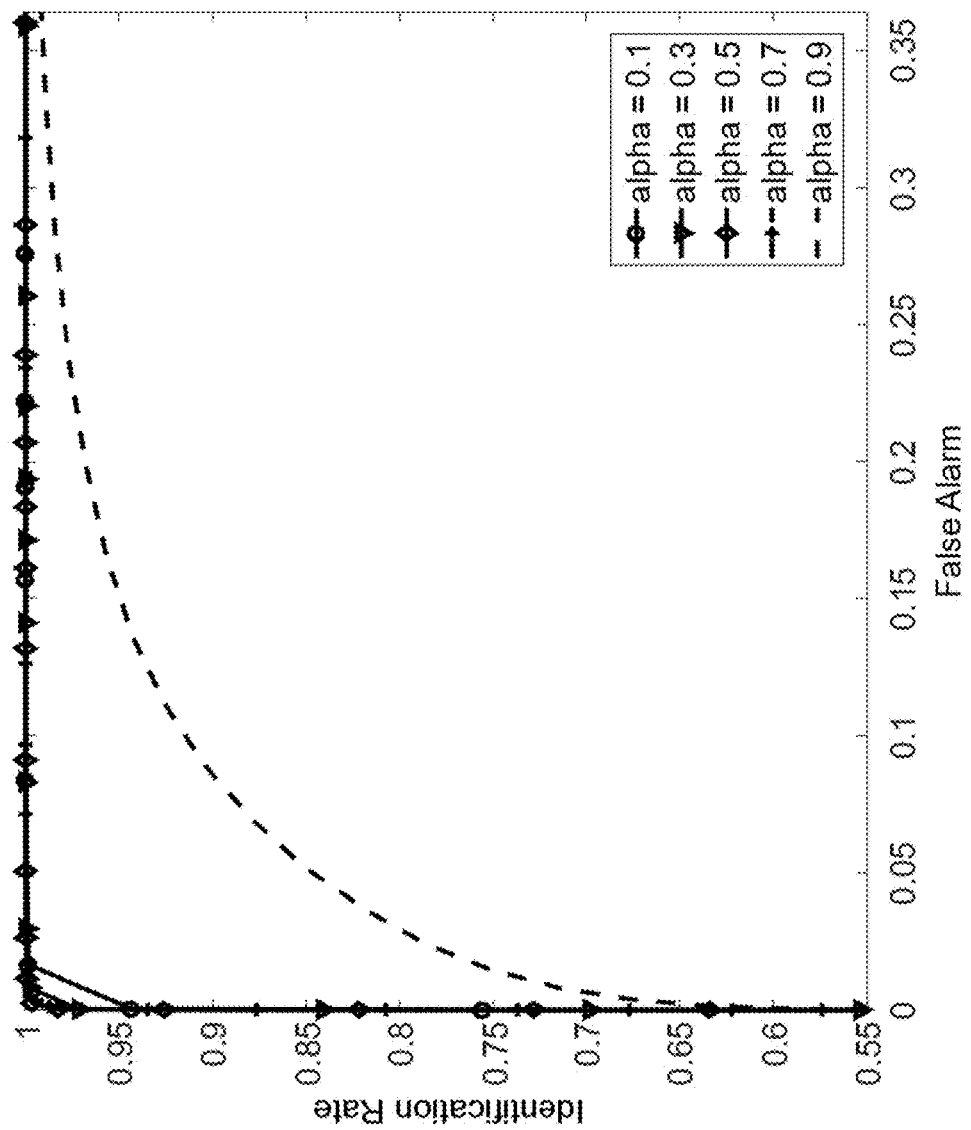
FIG. 7B shows an evaluation on ROC curves for background subtraction and TX-RX locations, with different values of a for Location (Loc) 7, according to an embodiment of the present teaching.

After determining the optimal background, the next step is to find the optimal background subtraction factor $\alpha$. FIG. 7B shows an evaluation on ROC curves for background subtraction and TX-RX locations, with different values of $\alpha$ for Loc 7, according to an embodiment of the present teaching. In FIG. 7B, the ROC performance is plotted to evaluate the impact of different $\alpha$. When $\alpha=0.9$, the identification performance is the worst because the remaining CSI components after background subtraction is noisy and has few information for human biometrics. The experiment shows that $\alpha=0.5$ is optimal for individual identification. The rest experiments discussed in the present teaching will adopt $\alpha=0.5$ and the all-CSI background scheme.

B. Impact of TX-RX Locations

The impacts of TX-RX configurations on the performance of human identification are evaluated. "Loc 1" represents LOS scenario where the transmitter, receiver and an experiment individual are in the same room. "Loc 2" to "Loc 6" represent the NLOS case where either one of the transmitter or the receiver is in the same room with the individual, while the other device is placed outside. Moreover, in the through-the-wall scenarios, represented by "Loc 7" to "Loc 10", the individual to be identified is in the room while both the transmitter and the receiver are outside the room and in different locations.

Figure 7C:
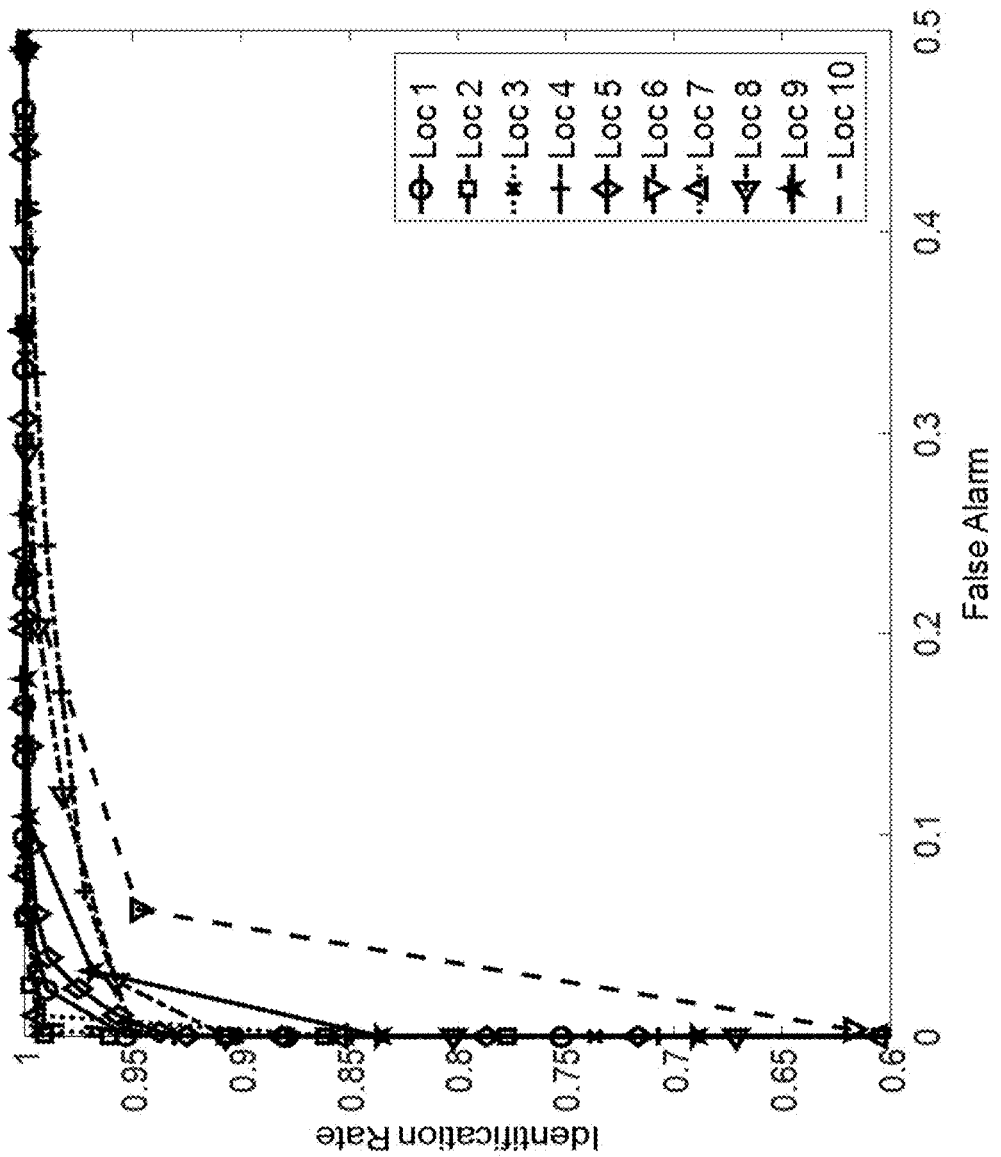
FIG. 7C shows an evaluation on ROC curves for background subtraction and TX-RX locations, with different TX-RX locations, according to an embodiment of the present teaching.

FIG. 7C shows an evaluation on ROC curves for background subtraction and TX-RX locations, with different TX-RX locations, according to an embodiment of the present teaching. The identification performance of different scenarios is plotted in FIG. 7C. The performance comparison can be summarized from the best to the worst as: Loc 7>Loc 2>Loc 3>Loc 10>Loc 1>Loc 5>Loc 9>Loc 4>Loc 8>Loc 6. There is no direct relation between identification performance and the distance between the transmitter and the receiver. Moreover, the LOS scenario is not the best configuration for human identification. As discussed before, the human radio biometrics are embedded in the multipath CSI. Due to the independency of each path in the multipath CSI, the more paths the CSI contains, the larger number of degrees of freedom it can provide in the embedded human radio biometrics. Consequently, because there are fewer multipath components in the CSI of the LOS scenario, less informative radio biometrics are extracted, which degrades the performance of identification. The results in FIG. 7C also demonstrate the capability of the disclosed system for through-the-wall human identification, in that no matter which configuration is selected the disclosed system has a high accuracy.

C. Human Identification

Figure 8:
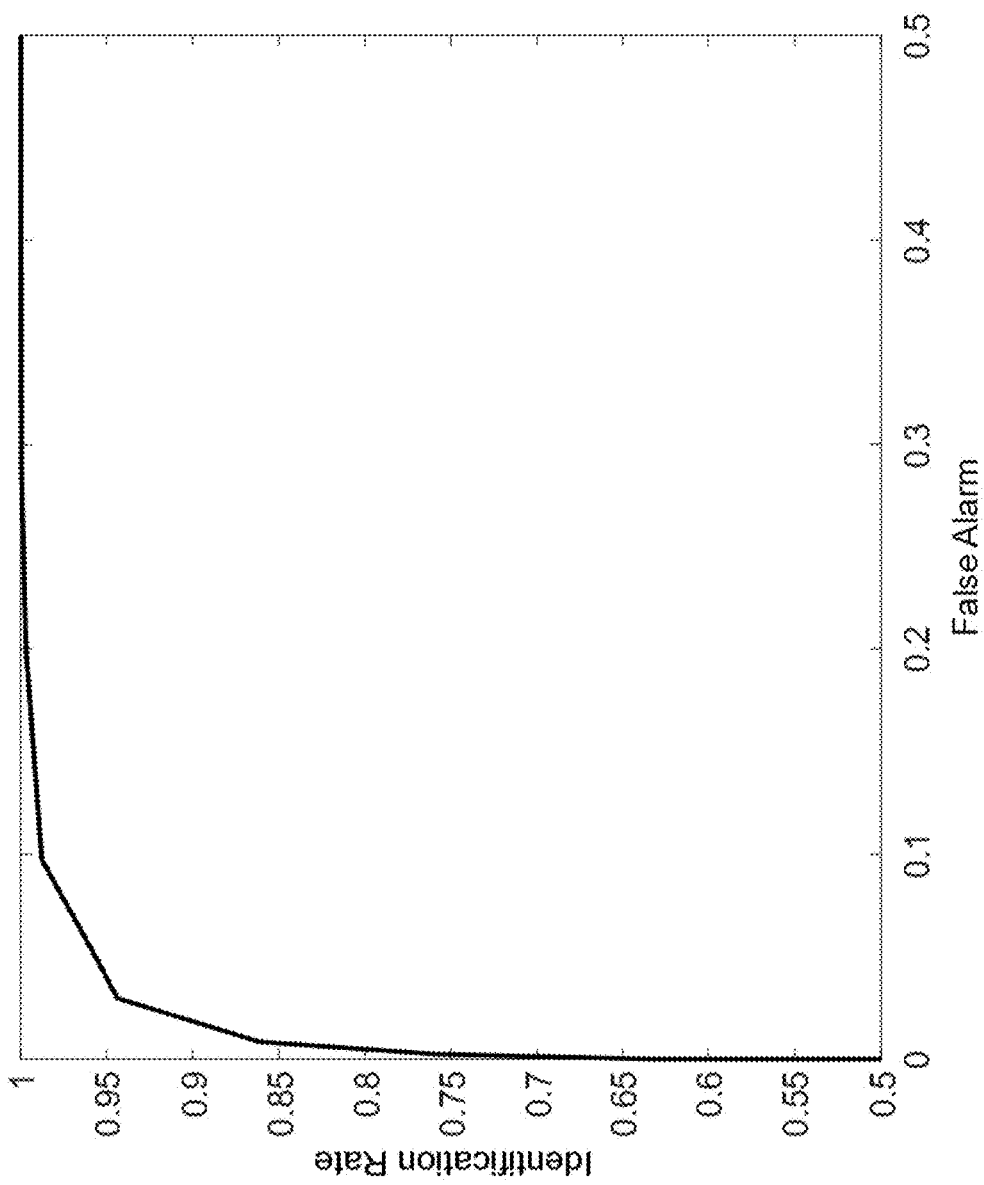
FIG. 8 shows an exemplary ROC curve for identifying 11 individuals, according to an embodiment of the present teaching.

From the above analysis, one can observe that the performance of the disclosed human identification system is influenced by both the background subtraction and the TX-RX configurations. In this section, the performance is evaluated in a TX-RX configuration with large data set of 11 individuals, with optimal background subtraction applied and at an exemplary location, e.g. "Loc 7". The corresponding ROC curve is plotted in FIG. 8. With a threshold $\mu$ being 0.91, the average identification rate is 98.78% and the average false alarm rate is 9.75%. This is because when two individuals have similar body contour, the possibility of misclassifying between them increases. However, since not only the contour but also the permittivity and conductivity of body tissue, which is more distinct for different individuals, will affect the Wi-Fi signal propagation that encounters the human body, the accuracy of identification is still high.

D. Individual Verification

In this set of experiments, the performance of individual verification is studied using disclosed system. Instead of finding the correct identity among several possible ones, the individual verification is to recognize a specific individual with variations in both the human body and the environment.

Figure 9A:
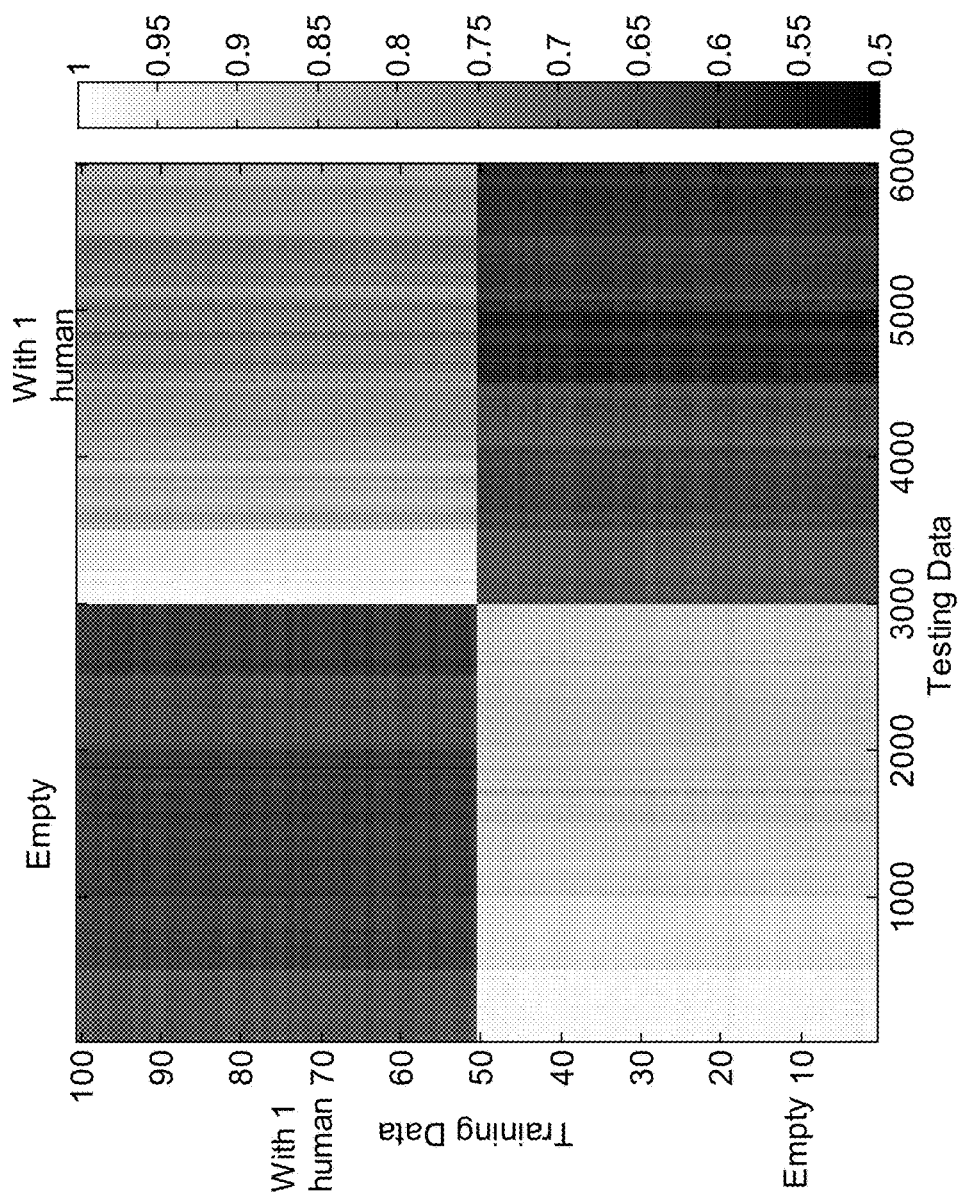
FIG. 9A shows an exemplary TRRS map on stationarity with no training database updating, according to an embodiment of the present teaching.
Figure 9B:
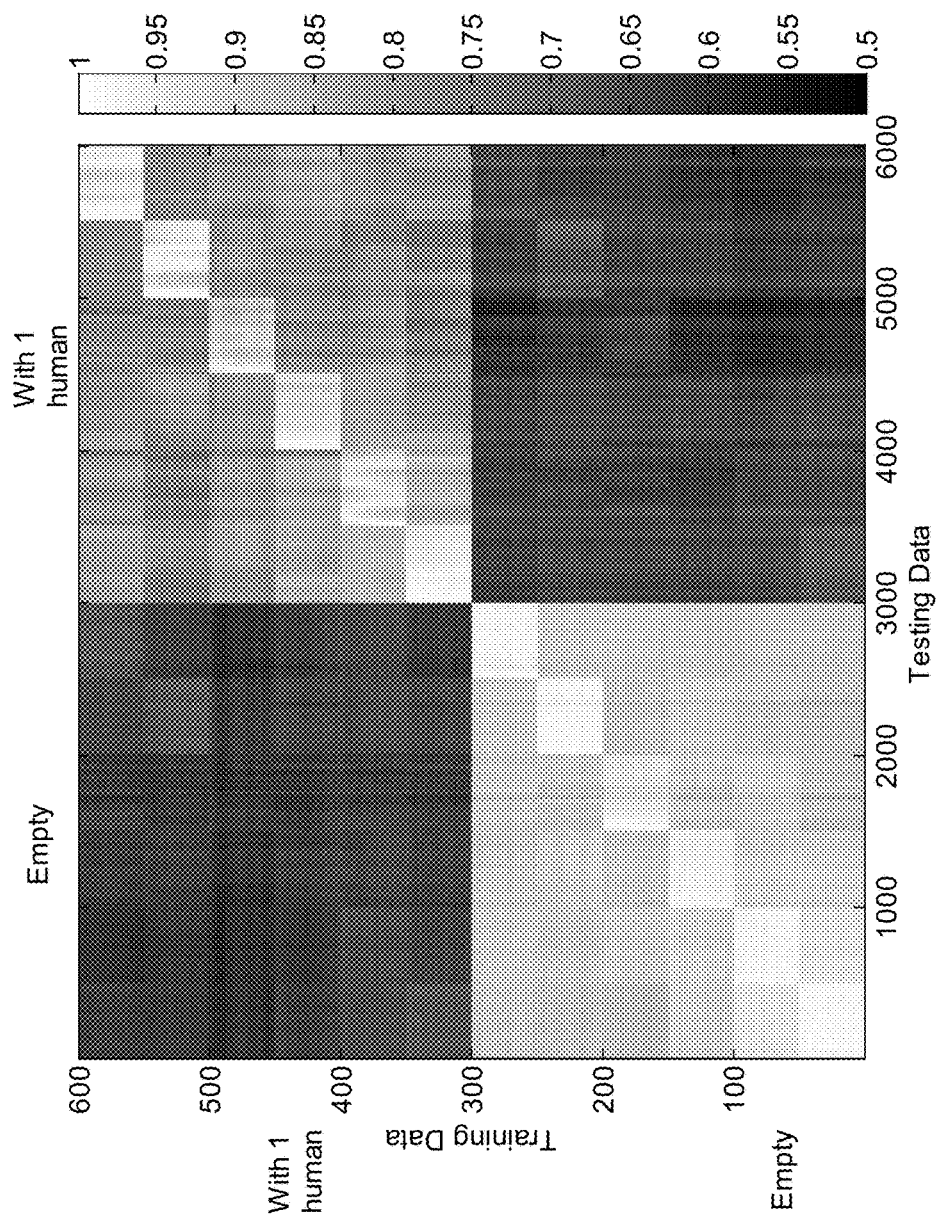
FIG. 9B shows an exemplary TRRS map on stationarity with training database updating, according to an embodiment of the present teaching.

The stationarity of human verification performance is discussed below. The CSI measurements are collected for both the empty room and with one individual inside twice a day for three consecutive days. The TRRS maps are demonstrated in FIG. 9A and FIG. 9B. FIG. 9A shows an exemplary TRRS map on stationarity with no training database updating, according to an embodiment of the present teaching. As shown in FIG. 9A, when only using the CSI from the first measurement as the training set, the TRRS within the same class gradually decreases. This leads to a 90.83% identification rate with the threshold $\mu=0.75$. However, if the training set is updated every time after measurement and identification, e.g. during the experiment on Day 2 morning, the training set includes the CSI from measurements on Day 1 morning and Day 1 afternoon, the identification rate can increase to 97.35%. FIG. 9B shows an exemplary TRRS map on stationarity with training database updating, according to an embodiment of the present teaching. Detail of the verification accuracy is listed in FIG. 22, which shows a performance matrix for a study of stationarity, according to an embodiment of the present teaching. Hence, to combat the variations over time, the training data set for both identification and verification should be updated regularly.

In another experiment, the impact of other types of variations such as wearing a coat, carrying a backpack/laptop on the accuracy of verification is evaluated. Six classes as listed in FIG. 23 are considered in the experiment. The detailed verification performance is shown in FIG. 24 where the relation of the threshold $\mu$ and the capability of differentiating between different variations are studied. Here, the training set contains the CSI from class #1. A low threshold $\mu$ may reduce the sensitivity of the disclosed system in verification. When the threshold $\mu$ increases, the system can distinguish between radio biometrics collected when a person is wearing nothing and radio biometrics collected when the person is wearing a coat and a backpack, i.e. distinguish between class #1 and class #3. As shown in FIG. 24, the result shows a 0 probability for class #3 to be misclassified as class #1. In case for the backpack with or without laptop inside, as they are shadowed by the human body, the introduced variations have relatively small impact on the accuracy of verification.

Impacts of Obstructions and Test Subject's Postures

Through the above experiments, the capability of the disclosed TR human identification system for identifying and verifying individuals through-the-wall has been proved. The performance of the disclosed system is further studied by comparing it with a RSSI-based identification system.

Figure 10:
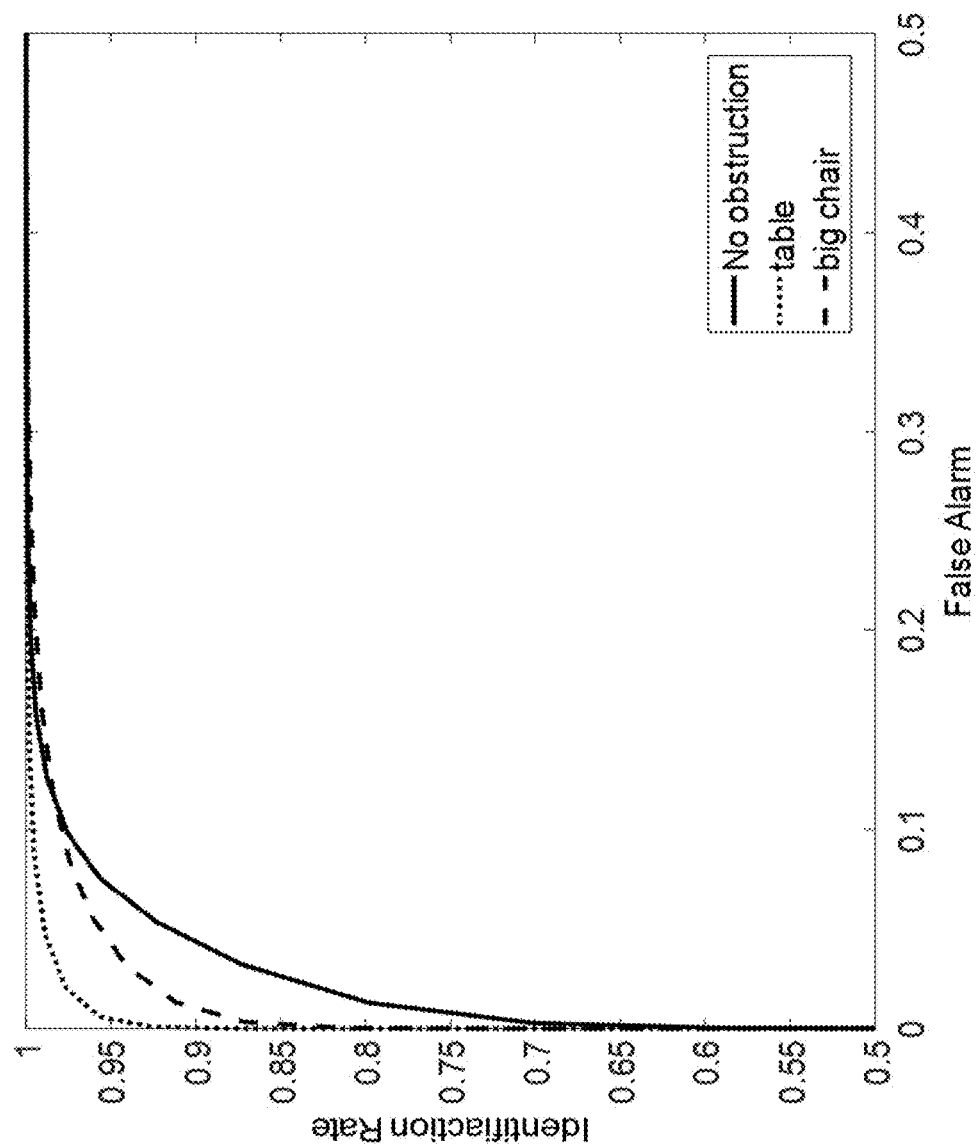
FIG. 10 shows ROC curves for human identification with different obstructions, according to an embodiment of the present teaching.

Experiments are conducted to evaluate and compare the identification accuracy when there is an obstruction in front of and in the same room with the test subject. FIG. 10 shows ROC curves for human identification with different obstructions, according to an embodiment of the present teaching. With a similar level of false alarm, the average identification rate for the no-obstruction scenario is 97.57% and the corresponding average false alarm rate is 9.85%. When there is a table in front of the subject against to the wall, the average identification rate can increase to 99.53% while the average false alarm rate is 8.82%. When a big chair is put in front of the test subject with a very short distance, the system has an average identification rate of 97.44% and an average false alarm rate of 8.43%. When there is an obstruction between the test subject and the transceiver, because of the reflections and penetrations, more copies of the transmitted signal are created, along with more multipath components. If the obstruction does not attenuate the signal much, most of the signals radiated from the obstruction will eventually encounter the test subject. Then more radio biometric information can be captured through the multipath propagation, which can help the identification performance. However, if the obstruction is thick in size and has a large vertical surface which attenuates and blocks most of the incoming signals, there will be fewer multipath components passing through the human body. As a result, less informative radio biometrics are obtained, compared with the no-obstruction case. Furthermore, as demonstrated in this experiment, the existence of furniture as the obstruction does not affect the system much.

However, the multipath profile changes when the obstruction changes, especially when an obstruction locates between the transmitter and the receiver link and in front of the test subject. The TR technique may be used to capture the difference in multipath profile, and to capture the difference introduced by obstruction changes in the meantime. Hence, if an individual is behind a large desk during the training phase and later stands behind a small desk for the testing, the disclosed system will notice this change in multipath profiles, leading to a mismatch in the training database.

Figure 11A:
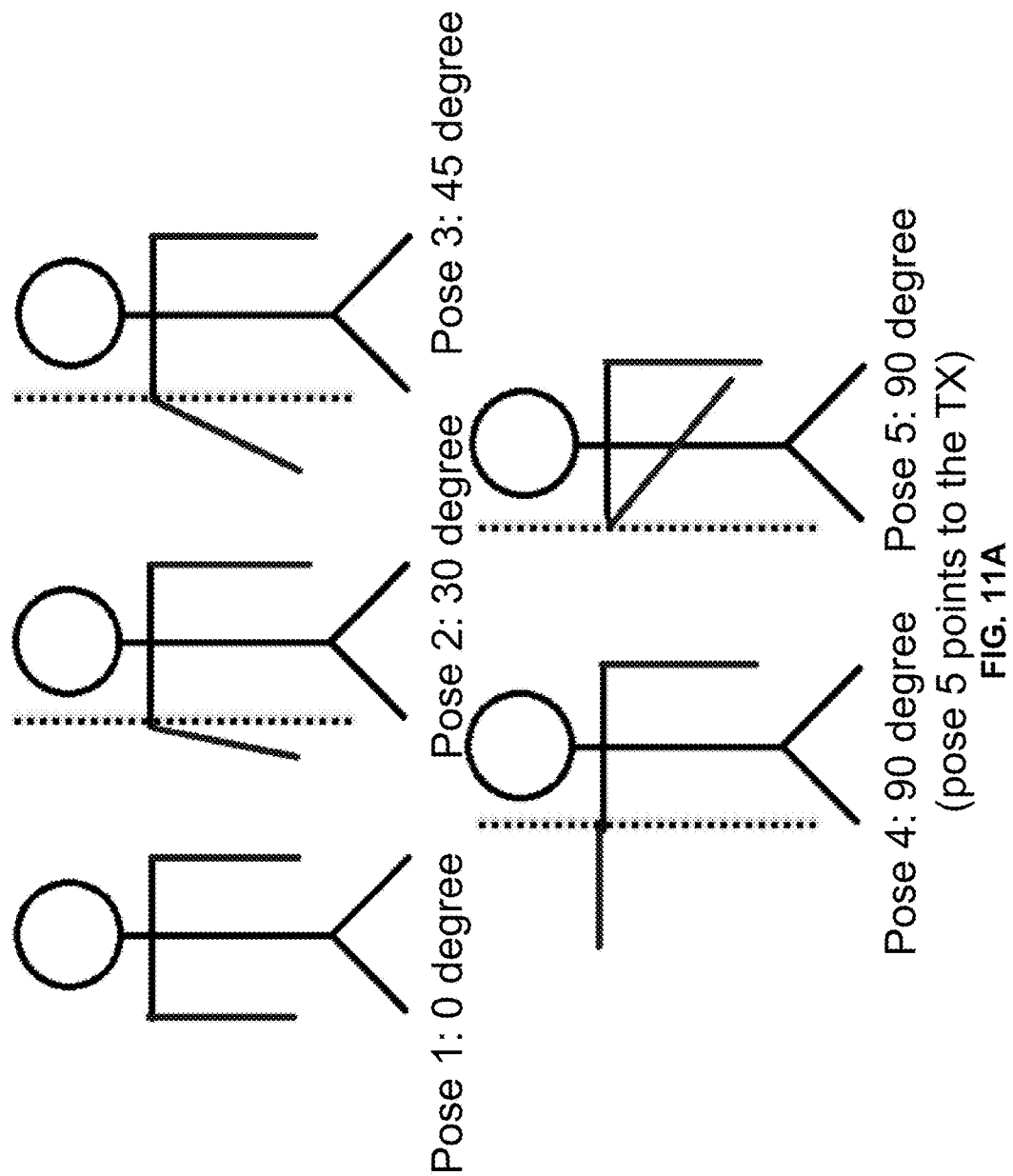
FIG. 11A shows exemplary test poses during a study on human pose effects, according to an embodiment of the present teaching.
Figure 11B:
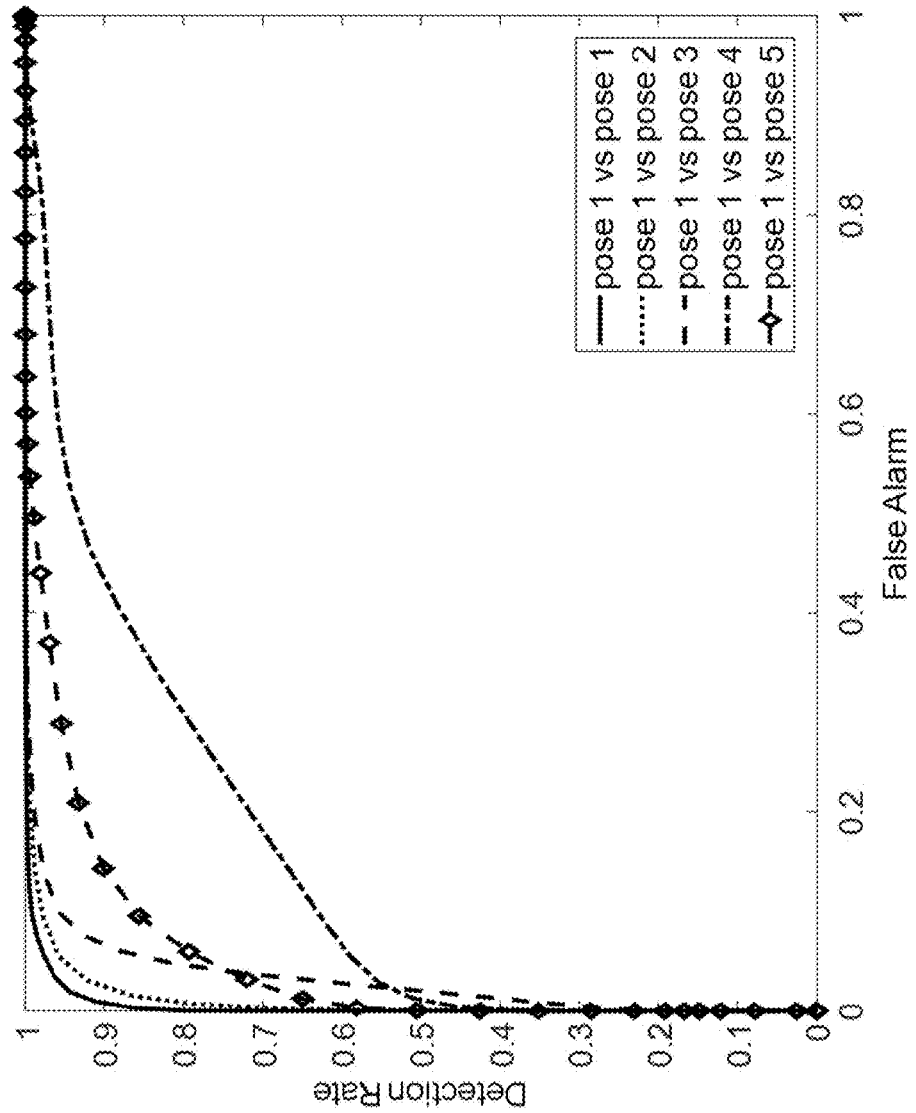
FIG. 11B shows ROC curves for human identification with different poses, according to an embodiment of the present teaching.

Experiments have been conducted to evaluate the effects introduced by human poses. Under a same setting as the experiment in FIG. 10, four participants were asked to stand at the same location and perform 5 different poses by lifting their arms with different degrees and directions, as shown in FIG. 11A. The corresponding ROC curves are shown in FIG. 11B. In the experiment, 50 samples were selected for each subject under Pose 1 as a training set. When the testing samples come from the same pose, the identification rate reaches 97.67% with a false alarm rate being 5.58%. However, as the participants change their poses from Pose 2 to Pose 5, the identification rate drops from 95.66% to 88.06%, 58.83% and 79.29% with a false alarm rate around 5.6%. The experimental results validate that pose changes may degrade the system performance. The system is robust to slight changes in posture, e.g., from Pose 1 to Pose 2. However, as shown by the ROC curve of testing over Pose 4 data with the Pose 1 training in FIG. 11B, when the pose alters the propagation environment a lot, the disclosed TR human identification system may fail to find a match in the training database. At Pose 4, the test subject is asked to lift the left arm with 90 degree and the direction being perpendicular to the link between the transmitter and the receiver. On the other hand, at Pose 5, test subjects lift the arm at the same height but the arm is parallel to the TX-RX link. Comparing the result of testing over Pose 5 with that over Pose 4, it is noticed that the identification accuracy drops more if the pose changes the silhouettes in a manner that is perpendicular to the TX-RX link.

Hence, when poses or standing locations change, the multipath profiles in the TR space for a test subjects might fall out of "proximity" (range of a high similarity) of himself or herself, which results in a reduce in the identification rate. Moreover, a worse situation is that the changed multipath profiles fall into the "proximity" of other test subjects which can lead to an increase in the false alarm rate.

Using standard Wi-Fi chipsets, one can obtain 7×1 RSS vectors besides the CSI in each measurement. The RSS vector contains 6 RSS values for 3 receiving antenna in each 20 MHz band and 1 overall RSS value. Here, one can treat each real-valued 7×1 vector as the feature and apply the k nearest neighbors (kNN) classifiers to the measurements.

Figure 13:
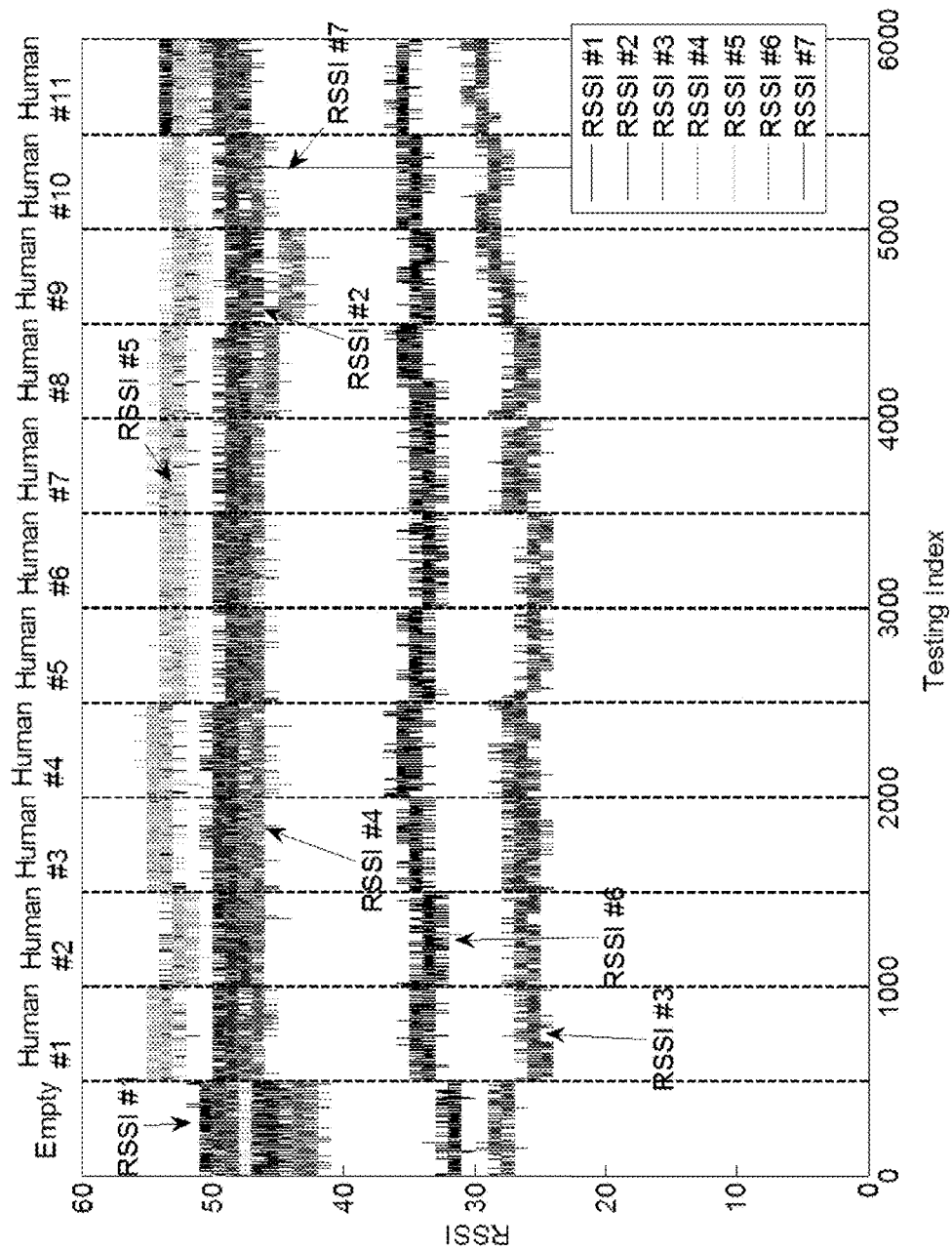
FIG. 13 shows exemplary received signal strength indicator (RSSI) value variation of 11 individuals, according to an embodiment of the present teaching.

The identification accuracy of the RSSI-based approach is tested on the dataset of 11 individuals. FIG. 13 shows exemplary TRRS value variation of 11 individuals, according to an embodiment of the present teaching. From the results in FIG. 13, the RSSI difference between different individuals is small. The false alarm rate is 68.07% and the identification rate is 31.93%, which is far inferior to the disclosed identification system.

Figure 14A:
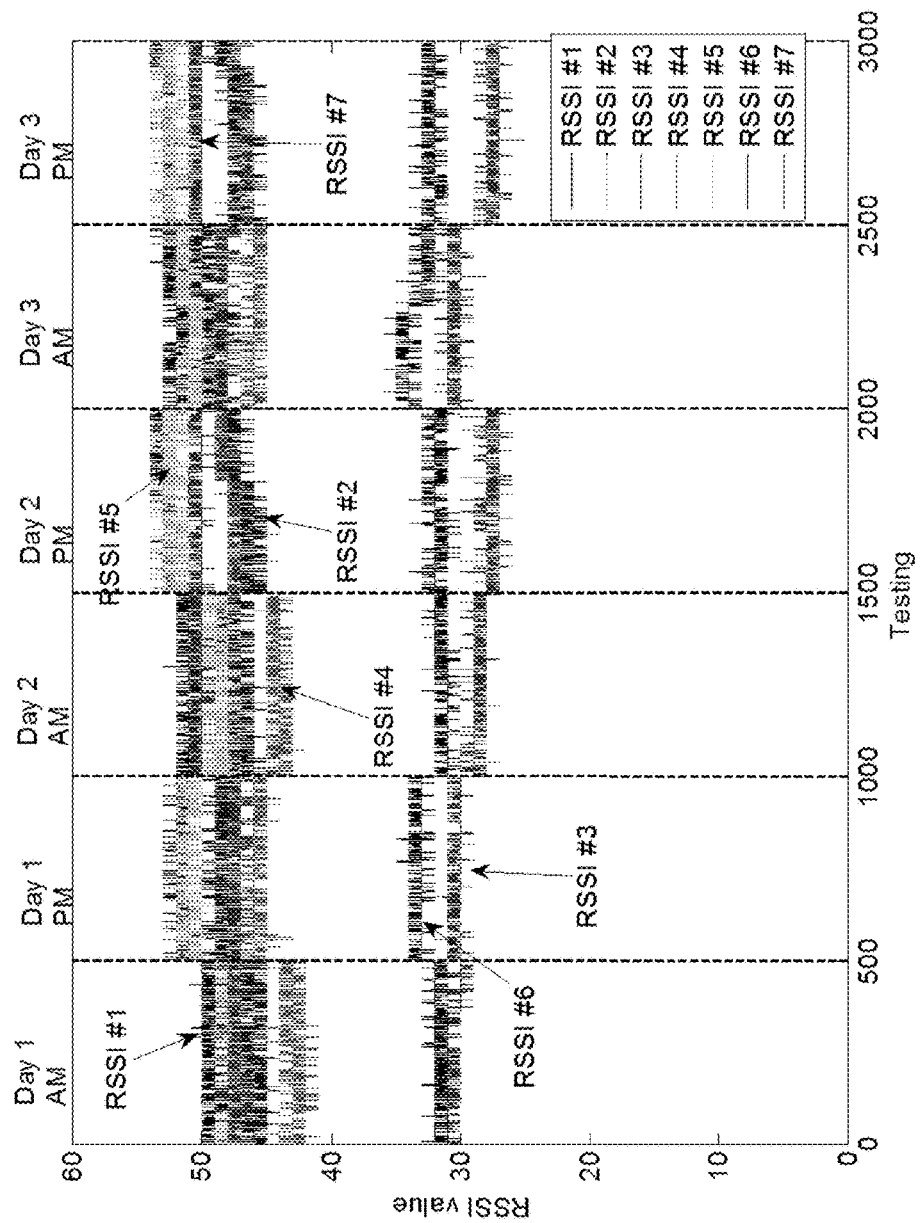
FIG. 14A shows an exemplary RSSI values tested in an empty room, according to an embodiment of the present teaching.
Figure 14B:
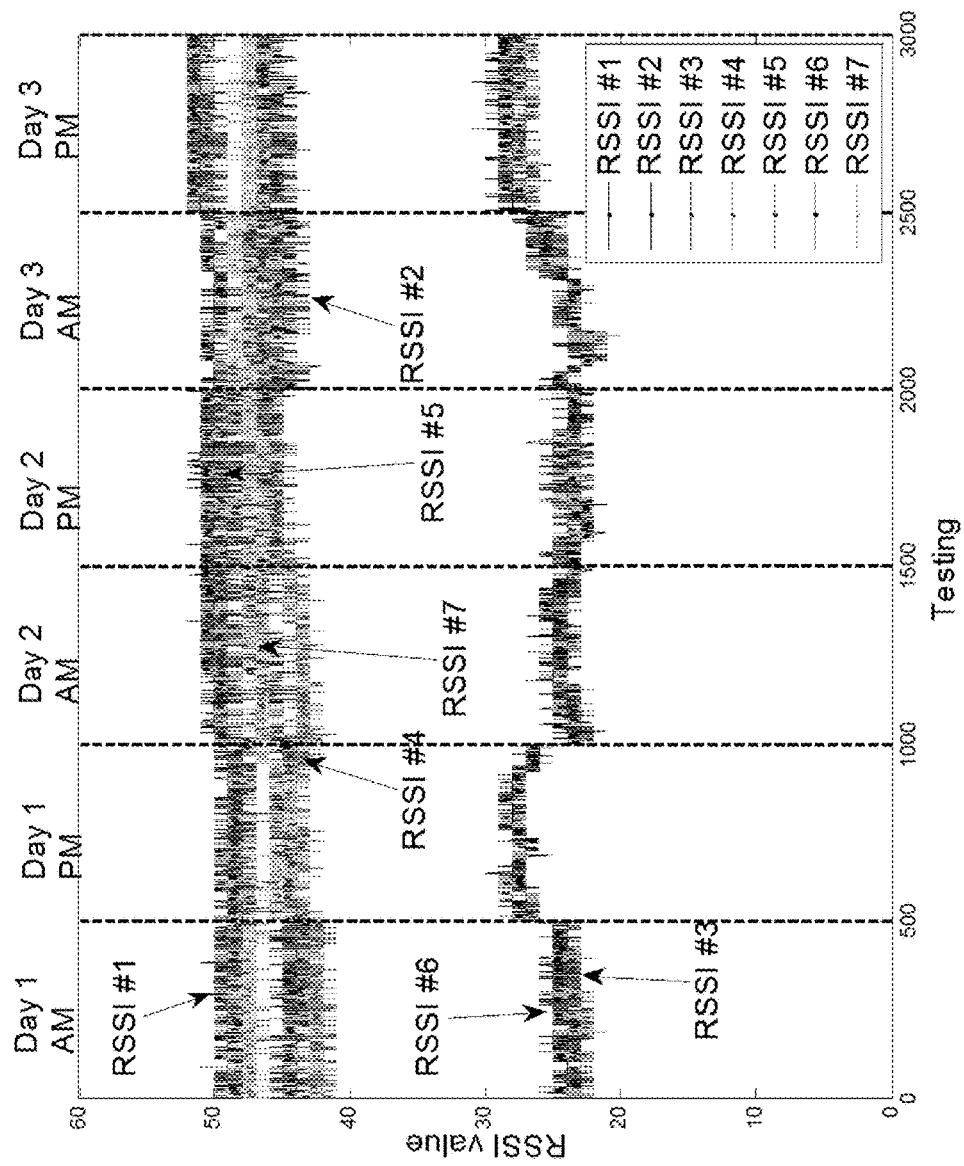
FIG. 14B shows an exemplary RSSI values tested with individuals present, according to an embodiment of the present teaching.

FIG. 14A shows an exemplary TRRS values tested in an empty room, according to an embodiment of the present teaching. FIG. 14B shows an exemplary TRRS values tested with individuals present, according to an embodiment of the present teaching. As shown in FIG. 14, the stationarity is evaluated and from the plot it is obvious that the RSS value is not stable over time. Without training database update, the identification rate for the individual is 89.67% with a 10.33% possibility that the individual is misclassified as an empty room. Even with the training database update, the identification rate does not improve due to the instability of the RSS values over time.

Figure 15:
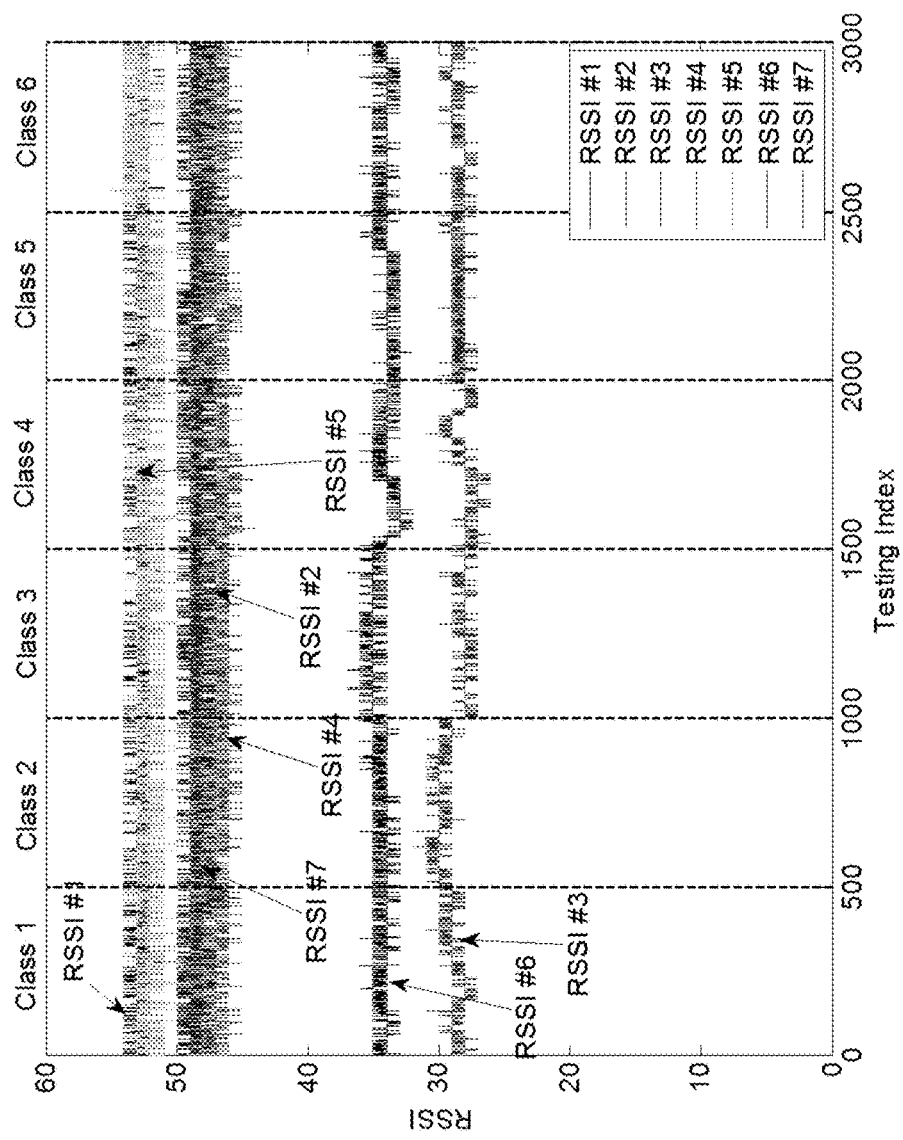
FIG. 15 shows exemplary RSSI values comparison on variations, according to an embodiment of the present teaching.

Furthermore, in terms of verifying individual with small variations as listed in the table in FIG. 23, the RSSI-based approach can hardly differentiate between different variations by only using the 7×1 RSS vector as shown in FIG. 15 and in the confusion matrix of individual verification in FIG. 25. The reason for its insensitivity to small variations is the same as that for its incapability in human identification. The 7×1 RSS vector feature only captures little human radio biometric information and loses the individual discrimination.

Hence, even though the RSSI-based approach is robust to the small variations on human body, it may not be put into practice for human identification and verification. Moreover, since RSSI is only a real-valued scaler which approximately represents the received signal power, it is less informative. It is susceptible to noise and has large intra-class variations which can degrade the identification accuracy a lot when the number of test subjects increases. Compared with the RSSI-based approach, the disclosed TR human identification system succeeds in capturing and extracting the human radio biometric information embedded in the CSI, and in distinguishing individuals with high accuracy through-the-wall.

The disclosed system can adopt a simple model for human radio biometrics embedded in the CSI as shown in equation (1). The obtained human radio biometrics $\delta h$ and the environment component $h_0$ may be correlated. In other words, the human radio biometrics $\delta h$ may be location-dependent, which may cause the system to run in an environment consistent over time. One can develop algorithms to separate the human radio biometrics and the outside environment.

Performance of the disclosed system can be improved by deploying more transceiver pairs to capture fine-grained human radio biometrics from different directions simultaneously.

Techniques that can record other biological features may be utilized to provide more details in human biological characteristics, such as the muscle mass index and the body temperature. With more detailed information regarding individual biological features besides the common information like height, weight, gender and clothing, the disclosed system make better use of radio biometrics in human identification and verification.

The disclosed system may be implemented in the environments that remain stationary most of the time. For example, it can be implemented for identity verification at places like bank vaults to allow the entry of authorized staff. It can also be used in home security systems, functioning as wireless electronic keys in vacation houses. Moreover, the location embedded radio biometrics are helpful in applications where it is needed to tell both who the test subject is and where the test subject is. Once the environment-independent radio biometric information is extracted, the disclosed system can identify individuals without being notified by test subjects and implement in applications where there is no direct contact with test subjects or where there are obstructions in-between the sensor and the subject.

Figure 16:
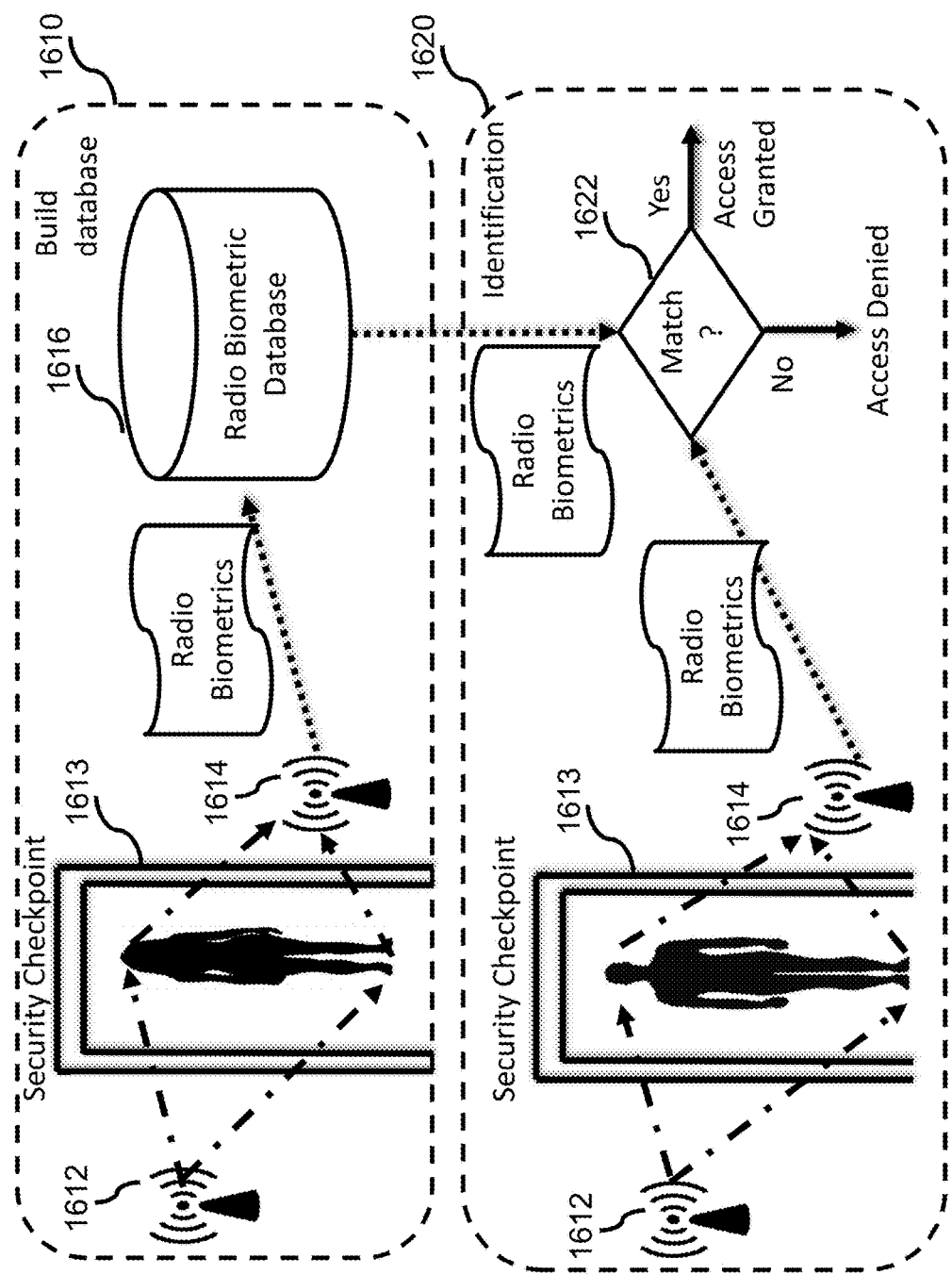
FIG. 16 illustrates an application for human identification, according to an embodiment of the present teaching.

FIG. 16 illustrates an application for human identification, according to an embodiment of the present teaching. As shown in FIG. 16, during the phase of building database 1610, the system may request each individual to stand at a security checkpoint 1613 for recording his/her human radio biometric information, e.g. at the airport or other places with security check, and transmit a wireless signal through a multipath embedding radio biometrics of the individual. The wireless signal may be transmitted from a transmitter 1612 to a receiver 1614. The receiver 1614 can detect human radio biometric information of the person because the multipath through which the wireless signal was transmitted was impacted by the person and embedded his/her human radio biometric information in it. The receiver 1614 may send the recorded human radio biometric information of the person to the radio biometric database 1616, which can store all human radio biometric information each corresponding to a recorded individual.

Then during the phase of human identification 1620, the system may request each candidate individual to stand at the security checkpoint 1613 for measuring his/her human radio biometric information and transmit a wireless signal through a multipath embedding radio biometrics of the candidate individual. The wireless signal may be again transmitted from the transmitter 1612 to the receiver 1614. The receiver 1614 can detect human radio biometric information of the candidate person because the multipath through which the wireless signal was transmitted was impacted by the candidate person and embedded his/her human radio biometric information in it. The receiver 1614 may then send the detected human radio biometric information of the candidate person for a matching operation at 1622. At 1622, the system can retrieve stored human radio biometric information each corresponding to a recorded individual, and compare the detected human radio biometric information with the retrieved human radio biometric information to determine whether there is a match. As discussed above, human radio biometric information can be different enough for different individuals to distinguish between people. In addition, human radio biometric information can be consistent enough for a same individual to identify the individual. As such, in case the system finds a match at 1622, the system can determine the identity of the candidate person based on information of the corresponding recorded individual having the matching human radio biometric information, and may grant an access to the candidate individual according to various applications. On the other hand, if the system does not find a match at 1622, the system can deny access of the candidate individual according to various applications. In one embodiment, the system may record the human radio biometric information of the unmatched person for future use. In can be understood that similar applications of the system may be used. For example, when police is trying to catch a fleeing felon, the system may provide a warning, instead of access grant, to the police when there is a match of human radio biometric information between the measured candidate and the recorded felon.

Figure 17A:
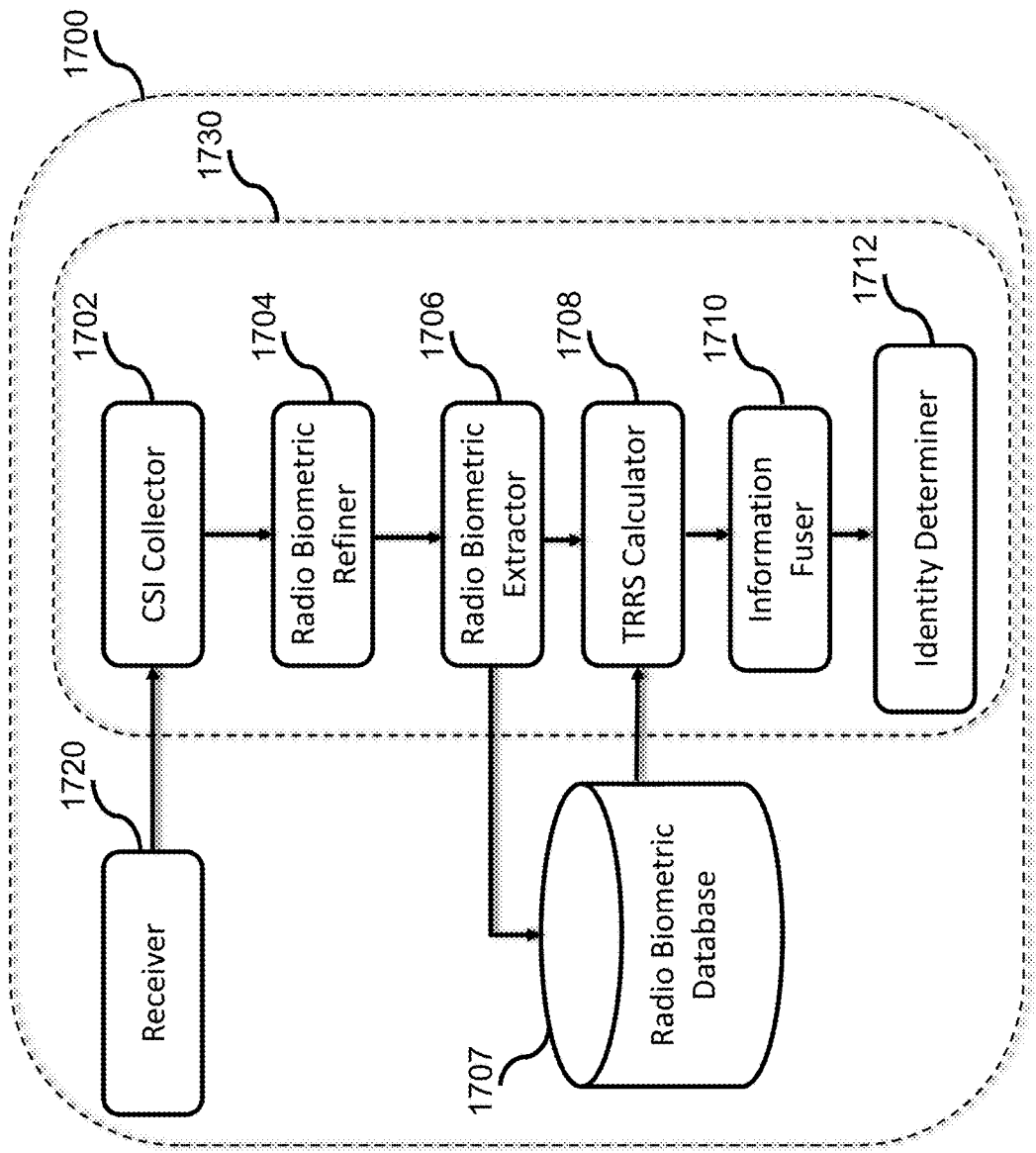
FIG. 17A shows an exemplary diagram showing general implementation of the human identification, according to an embodiment of the present teaching.
Figure 17B:
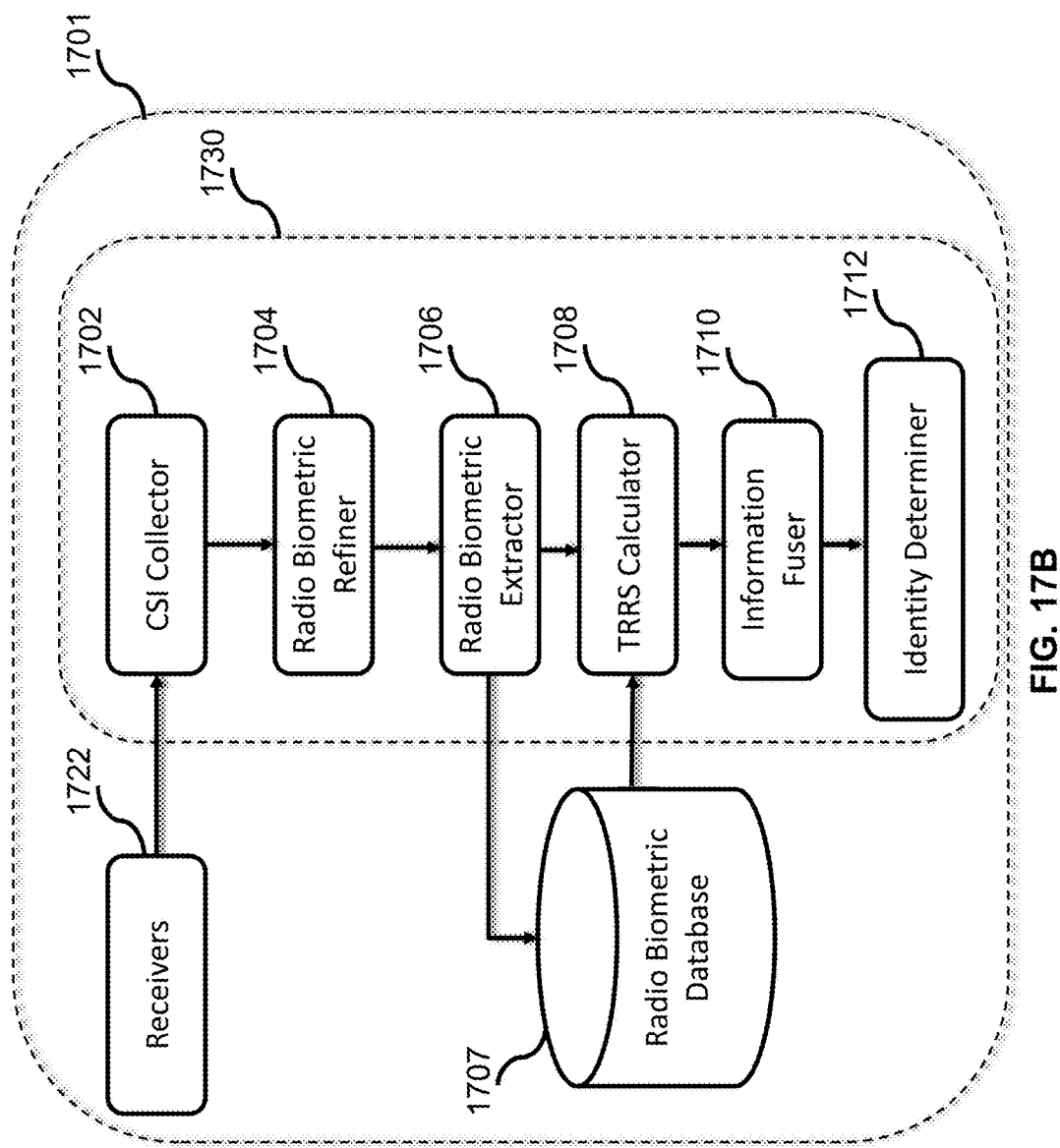
FIG. 17B shows another exemplary diagram showing general implementation of the human identification, according to an embodiment of the present teaching.

FIG. 17A shows an exemplary diagram showing general implementation of the human identification in an exemplary disclosed system 1700, according to an embodiment of the present teaching. As shown in FIG. 17A, the exemplary disclosed system includes a receiver 1720, a CSI collector 1702, a radio biometric refiner 1704, a radio biometric extractor 1706, a radio biometric database 1707, a TRRS calculator 1708, an information fuser 1710, an identity determiner 1712. In one embodiment, as shown in FIG. 17A, the CSI collector 1702, the radio biometric refiner 1704, the radio biometric extractor 1706, the TRRS calculator 1708, the information fuser 1710, and the identity determiner 1712 may all be implemented on a processor 1730. FIG. 17B shows another exemplary diagram showing general implementation of the human identification in an exemplary disclosed system 1701, according to an embodiment of the present teaching. As shown in FIG. 17B, the receiver 1720 may be replaced by a plurality of receivers 1722 to make use of technology of multiple antennas. CSIs from multiple antennas, e.g. from the plurality of receivers, can be combined or fused using various methods such as those disclosed in PCT/US2017/015909 and PCT/US2016/066015. In addition, each of the disclosed systems 1700, 1701 may include a memory communicatively coupled with the processor 1730.

The receiver 1720 in this example may receive at least one wireless signal from a multipath channel that is impacted by a person. The person may be a person to be recorded during a phase of database building, or a person to be tested during a phase of human identification. The CSI collector 1702 in this example may be configured for collecting CSI from the wireless signal. The CSI collector 1702 may estimate the multipath profile based on the received at least one wireless signal. As discussed above, the multipath profile may include radio biometric information of the person. The CSI collector 1702 can send the multipath profile to the radio biometric refiner 1704 for radio biometric refining.

The radio biometric refiner 1704 in this example may receive the multipath profile from the radio biometric refiner 1704 and compensate the phase distortion in the estimated multipath profile. In this manner, the radio biometric refiner 1704 can collect the compensated multipath profile of the person and send the compensated multipath profile of the person to the radio biometric extractor 1706 for radio biometric extractor.

The radio biometric extractor 1706 in this example may receive the compensated multipath profile of the person from the radio biometric refiner 1704 and obtain the background information. The radio biometric extractor 1706 may then extract the radio biometric information by subtracting the background information from the compensated multipath profile. During the phase of database building, the radio biometric extractor 1706 may store the refined radio biometrics of this person along with his/her identity in the radio biometric database 1707. During the phase of human identification, the radio biometric extractor 1706 may send the refined radio biometrics of this person to the TRRS calculator 1708 for TRRS calculation.

The TRRS calculator 1708 in this example may receive the test radio biometrics from the radio biometric extractor 1706 and retrieve stored radio biometrics from the radio biometric database 1707. Based on each pair of the test radio biometrics and a stored radio biometrics, the TRRS calculator 1708 can calculate the TRRS between the test radio biometrics and the stored radio biometrics. In one embodiment, the TRRS calculator 1708 may send the TRRS to the information fuser 1710 for information fusion.

The information fuser 1710 in this example may receive the calculated TRRS from the TRRS calculator 1708 and combine the TRRSs from all links to find the highest TRRS between the test radio biometrics and a stored radio biometrics, and an identity corresponding to the stored radio biometrics. The information fuser 1710 may send the highest TRRS and its corresponding identity to the identity determiner 1712 for identity determination.

The identity determiner 1712 in this example may receive the highest TRRS and its corresponding identity from the information fuser 1710, and compare highest TRRS with a confidence threshold. If the highest TRRS is larger than the confidence threshold, the identity determiner 1712 may output the corresponding identity as the identity of the tested person. Otherwise, if the highest TRRS is not larger than the confidence threshold, the identity determiner 1712 may determine that the identity of the tested person is unknown.

Figure 18:
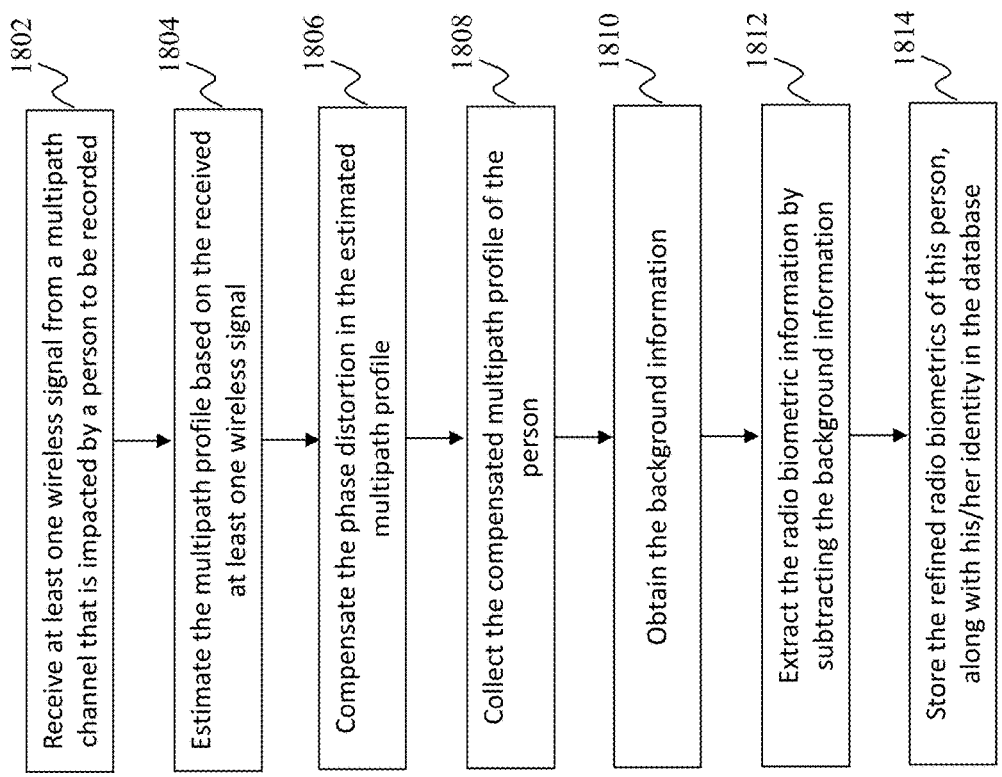
FIG. 18 is a flow chart showing a process of building database for human identification, according to an embodiment of the present teaching.

FIG. 18 is a flow chart showing a process of building database for human identification, according to an embodiment of the present teaching. The process in FIG. 18 may be performed by the system shown in FIG. 17A and FIG. 17B. At 1802, at least one wireless signal is received from a multipath channel that is impacted by a person to be recorded. The multipath profile is estimated at 1804 based on the received at least one wireless signal. The phase distortion in the estimated multipath profile is compensated at 1806. The compensated multipath profile of the person is then collected at 1808. Background information is obtained at 1810. The radio biometric information is extracted at 1812, e.g. by subtracting the background information. At 1814, the refined radio biometrics of this person, along with his/her identity, may be stored in a database for future use of human identification.

Figure 19:
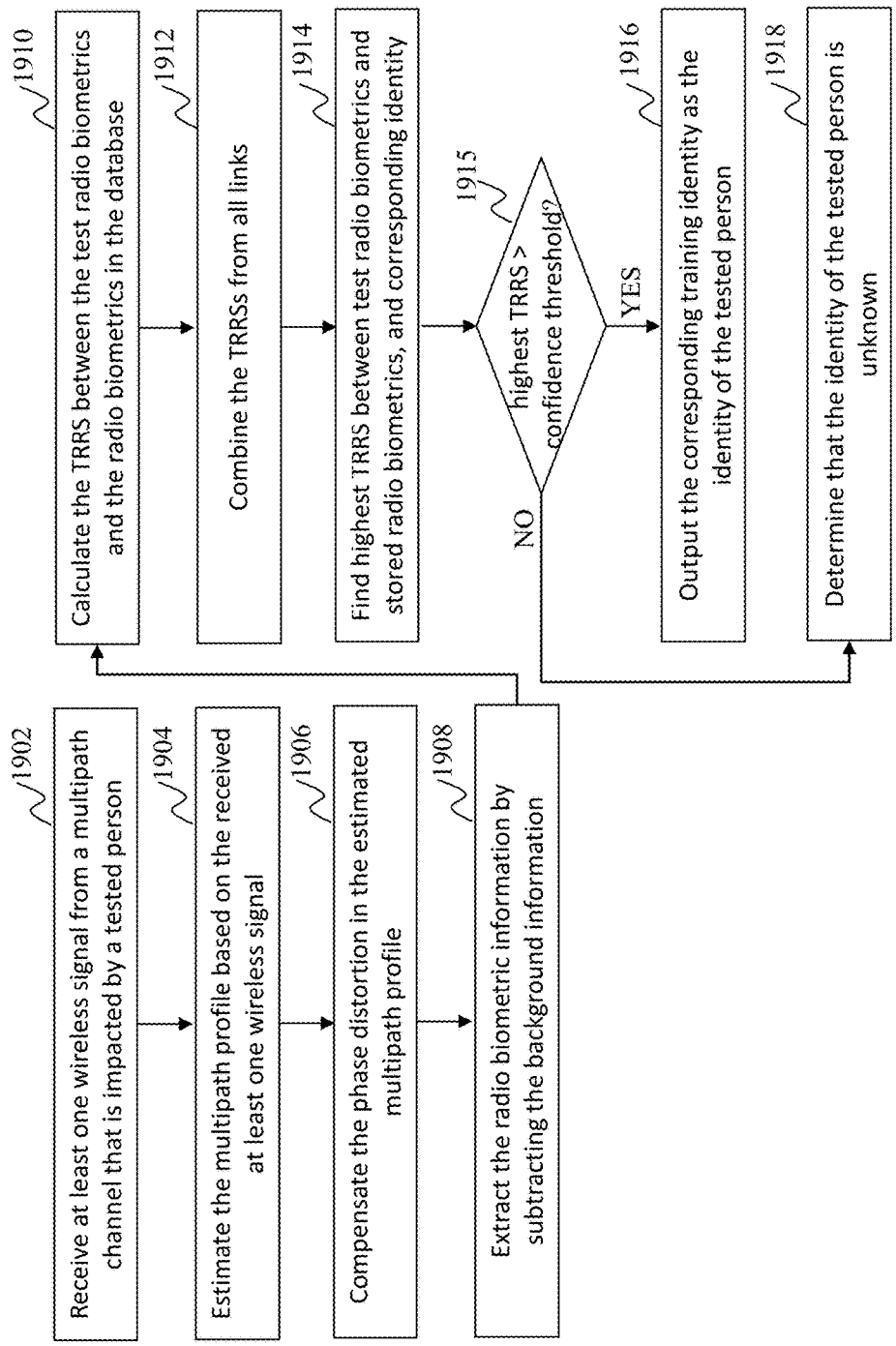
FIG. 19 is a flow chart showing a process of human identification, according to an embodiment of the present teaching.

FIG. 19 is a flow chart showing a process of human identification, according to an embodiment of the present teaching. The process in FIG. 18 may be performed by the system shown in FIG. 17A and FIG. 17B. At 1902, at least one wireless signal is received from a multipath channel that is impacted by a person to be tested. The multipath profile is estimated at 1904 based on the received at least one wireless signal. The phase distortion in the estimated multipath profile is compensated at 1906. The radio biometric information is extracted at 1908, e.g. by subtracting the background information.

The TRRS between the test radio biometrics and the radio biometrics in the database is calculated at 1910. TRRSs from all links are combined at 1912. The highest TRRS among all TRRSs between the test radio biometrics and all stored radio biometrics is found at 1914, together with a corresponding identity. At 1915, it is determined whether the highest TRRS is larger than a predetermined confidence threshold. If so, the process goes to 1916, where the corresponding identity is output as the identity of the tested person. Otherwise, the process goes to 1918, where it is determined that the identity of the tested person is unknown.

To implement various modules, units, and their functionalities described in the present disclosure, computer hardware platforms may be used as the hardware platform(s) for one or more of the elements described herein (e.g., the components of in the system described with respect to any of FIGS. 1-19). The hardware elements, operating systems and programming languages of such computers are conventional in nature, and it is presumed that those skilled in the art are adequately familiar therewith to adapt those technologies to explore human identification based on human radio biometric information as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

The disclosed system can be realized by a specialized system having a functional block diagram illustration of a hardware platform which includes user interface elements. The computer may be a general purpose computer or a special purpose computer. Both can be used to implement a specialized system for the present teaching. This computer may be used to implement any component of the techniques of human identification based on human radio biometric information, as described herein. For example, the system in FIG. 17A and FIG. 17B, etc., may be implemented on a computer, via its hardware, software program, firmware, or a combination thereof.

Hence, aspects of the methods of human identification based on human radio biometric information, as outlined above, may be embodied in programming Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

In some embodiments, as discussed above, the radio biometric information extracted from the CSI may be directly compared with other radio biometrics in the database with a similarity metric, e.g. TRRS. In other embodiments, however, the radio biometrics extracted from CSI between different humans can be quite similar. Then, one may develop a method or design applied to those CSI-produced radio biometrics to make them dissimilar, or farther away from each other. For example, waveforming design, as discussed below, can be used to further separate those radio biometrics of different individuals which are extracted from the CSI, and to make them more distinct during applications like human identification.

During waveforming design for TR recognition, the strength of the spatial-temporal resonance (TRRS) $\mathcal{TR}(h_1, g_2)$ between two CSI samples $h_1$ and $h_2$ in the time domain may be defined as a function between the CSI measurements $h_1$ and the waveforming vector $g_2$ of $h_2$ as:

$$\mathcal{TR}(h_1, h_2) = \mathcal{TR}_T(h_1, g_2) = \left( \frac{\max_i |(h_1 * g_2)[i]|}{\sqrt{\sum_{l=0}^{L-1} |h_1[l]|^2} \sqrt{\sum_{l=0}^{L-1} |h_2[l]|^2}} \right)^2, \quad (17)$$

where "*" denotes the convolution, 1 is the tap index, L is the number of taps, and $g_2$ is the waveforming vector of $h_2$. The basic TR waveforming vector $g_{TR}$ for h is defined as:

$$g_{TR}[k] = h^*[L-k-1], k=0,1,\ldots,L-1. \quad (18)$$

Basic TR waveforming vector may not lead to best performance in recognition. The waveforming vector $g_i$, $\forall i$, can be designed to suppress the inter-class TRRS $\mathcal{TR}_T(h_j, g_i)$, while maintaining a lower bound on the intra-class TRRS $\mathcal{TR}_T(h_j, g_j)$, for every j as:

$$\underset{g_1, \forall i}{\text{minmize}} \quad \underset{\forall j \neq i}{\max} \mathcal{TR}_T(h_j, g_i) \quad (19)$$

$$\text{subject to} \quad \mathcal{TR}_T(h_i, g_i) \geq \gamma_{th}, \forall i,$$

$$\|g_i\|_2 = 1, \forall i.$$

Here, $g_i$ is the waveforming vector for the $i^{th}$ class of the multipath profiles $h_i$. The purpose is to exaggerate the difference between different CSI samples.

Suppose all the CSI vectors are normalized, by substituting (17) into (19), one can obtain:

$$\underset{g_1, \forall i}{\text{minmize}} \quad \gamma \quad (20)$$

$$\text{subject to} \quad \underset{\forall j \neq i}{\max} \underset{k}{\max} |(h_j * g_i)[k]|^2 \leq \gamma \; \forall i,$$

$$\underset{k}{\max} |(h_i * g_i)[k]|^2 \geq \gamma_{th}, \forall i,$$

$$\|g_i\|_2 = 1, \forall i.$$

The problem in (20) is a joint optimization problem which is complicated and of a high dimension. One can decouple the problem into a bunch of optimization problems for each class i by introducing slack variable $\gamma_i$ with details shown below.

$$\underset{g_i}{\text{minmize}} \quad \gamma_i \quad (21)$$

$$\text{subject to} \quad \underset{k}{\max} |(h_j * g_i)[k]|^2 \leq \gamma_i, \quad \forall j \neq i,$$

$$\underset{k}{\max} |(h_i * g_i)[k]|^2 \geq \gamma_{th},$$

$$\|g_i\|_2 = 1.$$

Then the optimum for problem in (20) can be found through $$\gamma^* = \underset{i}{\max} \; \gamma_i.$$

In order to further simplify the problem and find an efficient algorithm to solve it, one can apply several relaxations to (21) and convert (21) to a SDP problem. One can bound the TRRS from bottom as:

$$\underset{k}{\max} |(h_i * g_i)[k]|^2 \geq |(h_i * g_i)[L]|^2 = |<T(h_i, L), \quad (22)$$

$$g_i>|^2 = (T(h_i, L))^T g_i g_i^H conj(T(h_i, L)).$$

Here, the superscript T denotes the transpose operator; the function conj(•) performs the element wise conjugate for a vector. The function $T(\cdot,\cdot): \mathbb{C}^L \times \mathbb{N} \cup \{0\} \to \mathbb{C}^L$ is the time-reversal function defined as:

$$T(h_i, m)[k] = h_i[m-k]. \quad (23)$$

Through this relaxation, the complex max operation can be addressed. Moreover, one can further relax the problem by reducing the number of constraints as $$\max_k |(h_j * g_i)[k]|^2 \leq \gamma_i, \Leftrightarrow |<T(h_j,k)g_i>|^2 \leq \gamma_i,$$
$$k=0,1,\ldots,2L-1,$$

$$\Leftrightarrow (T(h_j,k))^T g_i g_i^H \text{conj}(T(h_j,k)) \leq \gamma_i, k=0,1,\ldots,2L-1,$$

$$\Leftrightarrow (T(h_j,k))^T g_i g_i^H \text{conj}(T(h_j,k)) \leq \gamma_i, k=L-M, L-M+1,\ldots, L+M. \quad (24)$$

The last inequality in (24) means that the original 2L constraints are reduced to 2M+1 constraints, which correspond to the central 2M+1 points in the sequence $(T(h_j,k))^T g_i g_i^H \text{conj}(T(h_j,k))$, $k=0, 1, \ldots, 2L-1$. Then compared with the problem in (21), the optimization problem is much simpler in that the feasible space is much smaller and the max operation has been taken out. The new problem can be expressed as:

$$\underset{g_i}{\text{minimize}} \quad \gamma_i \quad (25)$$
$$\text{subject to} \quad (T(h_j, m))^T g_i g_i^H \text{conj}(T(h_j, m)) \leq \gamma_i,$$
$$m = L-M, \ldots, L+M, \forall j \neq i,$$
$$(T(h_i, L))^T g_i g_i^H \text{conj}(T(h_i, L)) \geq \gamma_{th},$$
$$\|g_i\|_2 = 1.$$

Last but not least, the SDP relaxation may be applied to the problem in (25) by replacing $g_i g_i^H$ with $G_i$ as:

$$\underset{G_i}{\text{minimize}} \quad \gamma_i \quad (26)$$
$$\text{subject to} \quad (T(h_j, m))^T G_i \text{conj}(T(h_j, m)) \leq \gamma_i,$$
$$m = L-M, \ldots, L+M, \forall j \neq i,$$
$$(T(h_i, L))^T G_i \text{conj}(T(h_i, L)) \geq \gamma_{th},$$
$$G_i \succeq 0,$$
$$\text{Trace}(G_i) = 1.$$

The above optimization is a typical convex optimization problem and can be solved efficiently using a standard convex optimization solver. Moreover, it is noticed that the Slater's condition holds for the problem in (26), which implies that the strong duality holds. Furthermore, the optimal variable $G^*_i$, $\forall i$ can be proven to have rank 1, i.e., $G^*_i = g^*_i g^{*H}_i$, $\forall i$. Hence, the problem in (26) and the problem in (25) are equivalent in that they share the same optimal variables and $\gamma^*_i$. Considering the original optimization in (19), the problem in (26) yields a near optimal solution.

At the receiver side, after each channel state sounding, one can collect a L×M raw CSI matrix for each individual as:

$$H_i = [h^{(1)}, h^{(2)}, \ldots, h^{(M)}], \forall i, \quad (27)$$

where M is the number of links between the transmitter and the receiver and L is the number of available subcarriers in a channel frequency response (CFR). CFR is the CSI measured in frequency domain.

The strength of TR spatial-temporal resonance $\mathcal{TR}(h_1, h_2)$ in frequency domain between two CSI samples $h_1$ and $h_2$ may be defined as $$\mathcal{TR}(h_1, h_2) = \mathcal{TR}_F(h_1, g_2) = \frac{\max_\phi \left| \sum_k h_1[k] g_2[k] e^{jk\phi} \right|^2}{\left( \sum_{l=0}^{L-1} |h_1[l]|^2 \right) \left( \sum_{l=0}^{L-1} |h_2[l]|^2 \right)}. \quad (28)$$

Here, L is the length of CSI vector, k is the subcarrier index, and $g_2$ is the waveforming vector of $h_2$. The well-known TR waveforming vector for a CSI measurement h in frequency domain is as:

$$g_{TR}[k] = h^*[k], k=0,1,\ldots,L-1. \quad (29)$$

The optimization problem in the frequency domain can be designed to suppress inter-class TRRS $\mathcal{TR}_F(h_j, g_i)$, while maintaining a lower bound on intra-class TRRS $\mathcal{TR}_F(h_i, g_i)$, for every j as:

$$\underset{g_i, \forall i}{\text{minimize}} \quad \max_{\forall j \neq i} \mathcal{TR}_F(h_j, g_i) \quad (30)$$
$$\text{subject to} \quad \mathcal{TR}_F(h_i, g_i) \geq \gamma_{th}, \forall i$$
$$\|g_i\|_2 = 1, \forall i.$$

Here, $g_i$ is the waveforming vector for the $i^{th}$ class of multipath profiles $h_i$.

Similarly the problem can be simply decomposed into a bunch of optimization problems for each class i by introducing slack variable $\gamma_i$ and written as below in (31) when CFRs are normalized.

$$\underset{g_i}{\text{minimize}} \quad \gamma_i \quad (31)$$
$$\text{subject to} \quad \max_{\forall j \neq i} \max_\phi \left| \sum_k h_j[k] g_i[k] e^{jk\phi} \right|^2 \leq \gamma_i,$$
$$\max_\phi \left| \sum_k h_i[k] g_i[k] e^{jk\phi} \right|^2 \leq \gamma_{th},$$
$$\|g_i\|_2 = 1.$$

Then the optimum for problem in (31) can be found through $$\gamma^* = \max_i \gamma_i. \text{ To}$$

solve the problem in (31) in a more efficient way, one can relax the problem in 2 steps.

First, one can relax the constrains in (31) by approximating $$\max_{\forall j \neq i} \max_\phi \left| \sum_k h_j[k] g_i[k] e^{jk\phi} \right|^2$$

with $|\Sigma_k h_j[k]g_i[k]|^2$, and replacing $\max_\phi |\Sigma_k h_i[k]g_i[k]e^{jk\phi}|^2$ with a lower bound as $|\Sigma_k h_i[k]g_i[k]|^2$. The new optimization problem can be shown as:

$$\underset{g_i}{\text{minimize}} \quad \gamma_i \qquad (32)$$

$$\text{subject to} \quad \left|\sum_k h_j[k]g_i[k]\right|^2 \le \gamma_i, \forall j \ne i,$$

$$\left|\sum_k h_i[k]g_i[k]\right|^2 \ge \gamma_{th},$$

$$\|g_i\|_2 = 1.$$

The lower bound comes from:

$$\max_\phi \left|\sum_k h_j[k]g_i[k]e^{jk\phi}\right|^2 \ge \left|\sum_k h_i[k]g_i[k]\right|^2. \qquad (33)$$

Through this step, the optimum $\gamma^*_i$ will be close to the optimum in (31). Moreover, a SDP relaxation can be applied to (32) to address the non-convexity of the optimization as:

$$\underset{g_i}{\text{minimize}} \quad \gamma_i \qquad (34)$$

$$\text{subject to} \quad h_j^T G_i conj(h_j) \le \gamma_i, \forall j \ne i,$$

$$h_i^T G_i conj(h_i) \ge \gamma_{th},$$

$$G_i \succcurlyeq 0,$$

$$\text{Trace}(G_i) = 1,$$

where $G_i = g_i g_i^H$.

The problem in (34) is a convex optimization problem. Moreover, the Slater's condition holds, implying the strong duality. It can be proved that the optimal variable $G^*_i$ is of rank 1 in (34), indicating $G^*_i = g^*_i g^{*H}_i$. The problem in (34) is a near optimal case to the original problem in (31).

The computational complexity of solving SDP in frequency domain optimization (34) is sensitive to the dimensions (number) of the variables, which may be extremely large in the frequency domain TR waveforming problem, since there are usually many subcarriers and the variable $G_i$ has a high dimension. The present teaching discloses an efficient solution by solving the dual problem of (34), by using the fact that the strong duality holds and $G^*_i = g^*_i g^{*H}_i$. Details of the disclosed fast algorithms are discussed below.

The Lagrange function of the optimization problem in (34) is defined as $$L(G_i, \gamma_i, \lambda, \mu, p) = \gamma_i + \Sigma_{j \ne i} \lambda_j (h_j^{T} G_i conj(h_j) - \gamma_i) + \lambda_i (\gamma_{th} - h_i^T G_i conj(h_i)) + \mu(\text{Trace}(G_i) - 1) - p\gamma_i, \qquad (35)$$

where $\lambda_i \ge 0$, $\forall i$, $\mu$, $p \ge 0$ are the Lagrange multipliers for the constraints in (34).

Then the dual function can be derived based on (35) as $$g(\lambda, p) = \lambda_i \gamma_{th} + \underset{\gamma_i}{\inf} \gamma_i \left(1 - \sum_{j \ne i} \lambda_j - p\right) + \qquad (36)$$

$$\underset{G_i \in X}{\inf} \text{Trace}\left(\left(\sum_{j \ne i} \lambda_j conj(h_j)h_j^T - \lambda_i conj(h_i)h_i^T\right)G_i\right),$$

where X={G: Trace(G)=1, G≥0}. By applying strong duality and $G^*_i = g^*_i g^{*H}_i$, one can have:

$$g(\lambda^*, p^*) = \max_{\lambda, p > 0} g(\lambda, p), \qquad (37)$$

$$g(\lambda, p) = \lambda_i \gamma_{th} + \underset{\|g\|_2 = 1}{\inf} g^H \left(\sum_{j \ne i} \lambda_j conj(h_j)h_j^T - \lambda_i conj(h_i)h_i^T\right)g. \qquad (38)$$

Then, the dual optimization problem becomes $$\underset{\lambda, t}{\text{minimize}} \quad \lambda_i \gamma_{th} + t \qquad (39)$$

$$\text{subject to} \quad \sum_{j \ne i} \lambda_j \le 1,$$

$$\Lambda_{min}\left(\sum_{j \ne i} \lambda_j conj(h_j)h_j^T - \lambda_i conj(h_i)h_i^T\right) = t,$$

$$\lambda_i \ge 0, \forall i.$$

Here, $g^*_i$ for the problem in (34) is the eigenvector corresponding to $\Lambda_{min}(\Sigma_{j \ne i} \lambda^*_j conj(h_j)h_i^T - \lambda^*_i conj(h_i)h_i^T)$. The computational complexity has been greatly reduced, which is linear to the number of CFR classes.

Figure 12:
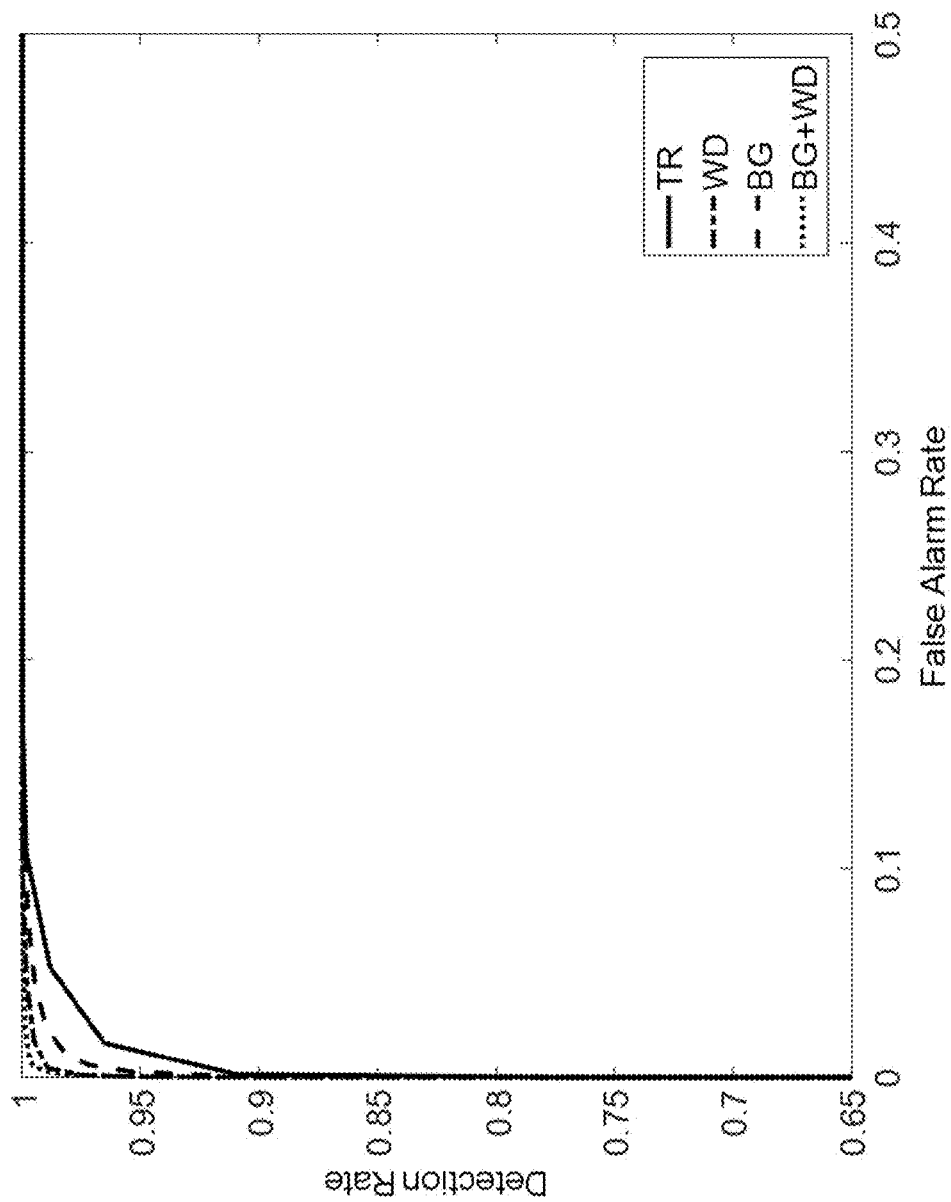
FIG. 12 shows an exemplary performance comparison of human identification with and without waveforming design, according to an embodiment of the present teaching.

The performance of waveforming in different recognition tasks is evaluated with both the time domain wireless sensing system and the frequency domain wireless sensing system. The improvement of performance introduced by optimal waveforming is validated through experiments to identify different individuals through the wall. The experimental setting is shown in the floorplan in FIG. 4. In the experiment, there are 12 individuals to be recognized, the $\gamma_{th}$ is set to 0.9. The performance of identification is evaluated by means of ROC curves, as shown in FIG. 12. In FIG. 12, 'BG' stands for results when using the algorithm to extract and refine the human radio biometrics, 'TR' stands for results when using basic TR waveforming, 'WD' stands for results when using the waveforming design disclosed in the present teaching, 'B+TR' stands for results when using basic TR waveforming and the algorithm to extract and refine the human radio biometrics, and 'BG+WD' stands for results when using the waveforming design disclosed in the present teaching and the algorithm to extract and refine the human radio biometrics. Among the strategies shown in FIG. 12, the best strategy is to apply both optimal waveforming and radio biometric refinement to the application of human identification. With the same false alarm rate, the detection rate can be increased by 9%, if using the disclosed waveforming algorithms as well as the radio biometrics refinement.

The disclosed system may be a radio shot system used in various applications. In one embodiment, the disclosed system can be used as an intelligent electronic key system that requires no touch or connection to sensors and identifies and grants access to authorized users, e.g. entry control for commercial offices and homes. In another embodiment, the disclosed system can be used as an alternative for current electronic key system when users want sensors to be invisible or unreachable to test subjects for the sake of protecting sensors from intentional destroy. In another embodiment, the disclosed system can be used as an alternative for current electronic key system when users can not touch any sensors or keys for opening a door, for example for offices of disease control that requires free of contamination and only authorized entry. In yet another embodiment, the disclosed system can be used as an easy and efficient electronic key system for every home, offices and other places, compared with systems based on fingerprints, iris or retina scans, due to ubiquitousness of Wi-Fi routers in the current world. In another embodiment, the disclosed system can be used as an intelligent parent control system installed on TVs, desktops or other electronic entertainment devices that can identify parents or authorized users through radio shot.

Since human radio biometrics are affected by physical and biological features, an analytic model might be built which can infer basic physical characteristics like weight and height of a test subject according to the radio biometric captured during radio shot. Once the environment-independent radio biometric information is extracted from current radio biometrics captured by radio shot, a large database can be built to store radio biometrics of almost every individual in the world, to be used in the area of forensics, anthropology, statistics, etc., just like the DNA library. If more refined radio biometrics are available for further improving the identification accuracy, a radio shot system can be deployed as an identification tool for customs and security check at airports.

A user can use the CSI (e.g. in the user's office) as the user's signature for secure transaction. One big problem in secure transaction is the authentication of the user. Existing authentication methods may include password, fingerprint, smart card, iris, etc. The disclosed system can be used to capture the CSI when the user is in office and use the captured CSI to authenticate that the user is indeed in his/her office. It can be useful for commercial applications, when people always do certain things (e.g. conference calls) in a certain room. Since a basic idea of human radio biometrics is to distinguish tiny and subtle difference between different individuals, if there is subtle difference in an object, the device in the present teaching can also detect the difference. For example, one can use the device to detect defects in piping. The CSI statistics/feature may be obtained from channel probing when there is no defect. If there is a crack in a pipe, then some observable multipath patterns different from those without defects can be distinguished.

In biomedical applications, a receiver may be put in a location close to a patient. If the patient swallows a Wi-Fi-enabled robotic pill (the Bot) which transmits Wi-Fi probing signal while going through the patient's body, the disclosed system can obtain some useful information of the patient's body. In another example, the disclosed system can be used for checking a person's respiratory. Because a person's nose has two nostrils, after inserting the Bot into the right nostril and putting the origin in the left nostril, the Wi-Fi signal may go into the lung and come out. In this way, the disclosed system can help to scan the lung, while the set up can be easily done if a patient is put on oxygen. Similar operations can be done for scanning human ears.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the human identification based on human radio biometric information as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An apparatus (1700) for human identification, comprising:
   a receiver (1720) configured for receiving at least one wireless signal from a multipath channel that is impacted by a person to be identified;
   a processor (1730); and
   a memory communicatively coupled with the processor;
   wherein the processor is configured for:
   extracting channel state information (CSI) from the at least one wireless signal, wherein the CSI represents channel properties of the multipath channel itself,
   obtaining radio biometric information based on the CSI, wherein the radio biometric information represents how the at least one wireless signal was impacted by at least part of a body of the person, and
   determining an identity of the person based on the radio biometric information.

2. The apparatus of claim 1, wherein:
   the receiver is further configured for receiving a plurality of wireless signals from the multipath channel, wherein each of the plurality of wireless signals was impacted by a different person with a known identity; and
   the processor is further configured for:
   extracting CSI from each of the plurality of wireless signals,
   obtaining radio biometric information based on each CSI, wherein each radio biometric information represents how a corresponding wireless signal was impacted by at least part of a body of a different person with a corresponding known identity, and
   storing each radio biometric information in association with the corresponding known identity into a database.

3. The apparatus of claim 2, wherein determining the identity of the person comprises:
   retrieving each stored radio biometric information together with its associated identity from the database;
   calculating a degree of similarity between the radio biometric info I anon and each stored radio biometric information;
   determining a highest degree of similarity among the degrees of similarity between the radio biometric information and all of the stored radio biometric information;
   determining a corresponding identity associated with the stored radio biometric information that gives the highest degree of similarity; and
   determining the identity of the person based on the highest degree of similarity and the corresponding identity.

4. The apparatus of claim 3, wherein determining e identity of the person further comprises:
   comparing the highest degree of similarity with a confidence threshold;
   determining the identity of the person to be the corresponding identity when the highest degree of similarity is greater than the confidence threshold; and determining that the identity of the person is unknown when the highest degree of similarity is not greater than the confidence threshold.

5. The apparatus of claim 3, wherein the degree of similarity is calculated based on at least one of: a time-reversal resonance strength (TRRS), a cross-correlation, an inner product of two vectors, a similarity score, a distance score, a phase correction, a timing correction, a timing compensation, and a phase offset compensation, of the radio biometric information and each stored radio biometric information.

6. The apparatus of claim 1, wherein at least one of: (a) obtaining radio biometric information based on each CSI comprises:
compensating a phase distortion in the CSI,
obtaining common human radio biometric information and static environment information, and
subtracting the common human radio biometric information and the static environment information from the compensated CSI to obtain the radio biometric information; and
(b) the person to be identified is not within a line-of-sight of the receiver, such that no light can directly pass through a straight path between the person and the receiver.

7. The apparatus of claim 1, wherein:
the at least one wireless signal is received through a network that is at least one of: Internet, an Internet-protocol network, and another multiple access network; and
the receiver is associated with a physical layer of at least one of: a wireless PAN, IEEE 802.15.1 (Bluetooth), a wireless LAN, IEEE 802.11 (Wi-Fi), a wireless MAN, IEEE 802.16 (WiMax), WiBro, HiperMAN, mobile WAN, GSM, GPRS, EDGE, HSCSD, iDEN, D-MPS, IS-95, PDC, CSD, PHS, WiDEN, CDMA2000, UMTS, 3GSM, CDMA, TDMA, FDMA, W-CDMA, HSDPA, W-CDMA, FOMA, 1xEV-DO, IS-856, TD-SCDMA, GAN, UMA, HSUPA, LTE, 2.5G, 3G, 3.5G, 3.9G, 4G, 5G, 6G, 7G and beyond, another wireless system and another mobile system.

8. The apparatus of claim 2, wherein obtaining radio biometric information based on each CSI comprises:
estimating a multipath profile based on the CSI extracted from each of the plurality of wireless signals; and
mapping different multipath profiles into a space based on a design of waveforms in a manner such that a similarity between different multipath profiles is minimized and a distance between different multipath profiles in the space is maximized.

9. The apparatus of claim 8, wherein obtaining radio biometric information based on each CSI further comprises:
designing waveforms for CSI obtained in at least one of time domain and frequency domain;
converting a problem of similarity minimization between different multipath profiles into a dual problem with a simple solution; and
obtaining radio biometric information based on the different multipath profiles after the similarity of the different multipath profiles is minimized.

10. A method, implemented on a machine including at least a receiver, a processor and a memory communicatively coupled with the processor for human identification, comprising:
receiving at least one wireless signal from a multipath channel that is impacted by a person to be identified;
extracting CSI from the at least one wireless signal, wherein the CSI represents channel properties of the multipath channel itself;
obtaining radio biometric information based on the CSI, wherein the radio biometric information represents how the at least one wireless signal was impacted by at least part of a body of the person; and
determining an identity of the person based on the radio biometric information.

11. The method of claim 10, further comprising:
receiving a plurality of wireless signals from the multi path channel, wherein each of the plurality of wireless signals was impacted by a different person with a known identity;
extracting CSI from each of the plurality of wireless signals;
obtaining radio biometric information based on each CSI, wherein each radio biometric information represents how a corresponding wireless signal was impacted by at least part of a body of a different person with a corresponding known identity; and
storing each radio biometric information in association with the corresponding known identity into a database.

12. The method of claim 11, wherein determining the identity of the person comprises:
retrieving each stored radio biometric information together with its associated identity from the database;
calculating a degree of similarity between the radio biometric information and each stored radio biometric information;
determining a highest degree of similarity among the degrees of similarity between the radio biometric information and all of the stored radio biometric information;
determining a corresponding identity associated with the stored radio biometric information that gives the highest degree of similarity; and
determining the identity of the person based on the highest degree of similarity and the corresponding identity.

13. The method of claim 12, wherein determining the identity of the person further comprises:
comparing the highest degree of similarity with a confidence threshold;
determining the identity of the person to be the corresponding identity when the highest degree of similarity is greater than the confidence threshold; and
determining that the identity of the person is unknown when the highest degree of similarity is not greater than the confidence threshold.

14. The method of claim 12, wherein the degree of similarity is calculated based on at least one of: a TRRS, a cross-correlation, an inner product of two vectors, a similarity score, a distance score, a phase correction, a timing correction, a timing compensation, and a phase offset compensation, of the radio biometric information and each stored radio biometric information.

15. The method of claim 10, wherein obtaining radio biometric information based on each CSI comprises:
compensating a phase distortion in the CSI;
obtaining common human radio biometric information and static environment nation; and subtracting the common human radio biometric information and the static environment information from the compensated CSI to obtain the radio biometric information.

16. The method of claim 10, wherein the person to be identified is not within a line-of-sight of the receiver, such that no light can directly pass through a straight path between the person and the receiver.

17. The method of claim 10, wherein:
the at least one wireless signal is received through a network that is at least one of: Internet, an Internet-protocol network, and another multiple access network; and
the receiver is associated with a physical layer of at least one of: a wireless PAN, IEEE 802.15,1 (Bluetooth), a wireless LAN, IEEE 802.11 (Wi-Fi), a wireless MAN, IEEE 802.16 (WiMax), WiBro, HiperMAN, mobile WAN, GSM, GPRS, EDGE, HSCSD, iDEN, D-AMPS, IS-95, PDC, CSD, PHS, WiDEN, CDMA2000, UMTS, 3GSM, CDMA, TDMA, FDMA, W-CDMA, HSDPA, W-CDMA, FOMA, 1×EV-DO, IS-856, TD-SCDMA, GAN, UMA, HSUPA, LTE, 2.5G, 3G, 3,5G, 3.9G, 4G, 5G, 6G, 7G and beyond, another wireless system and another mobile system.

18. The method of claim 11, wherein obtaining radio biometric information based on each CSI comprises:
estimating a multipath profile based on the CSI extracted from each of the plurality of wireless signals; and
mapping different multipath profiles into a space based on a design of wavefoinis in a manner such that a similarity between different multipath profiles is minimized and a distance between different multipath profiles in the space is maximized.

19. The method of claim 18, wherein obtaining radio biometric information based on each CSI further comprises:
designing waveforms for CSI obtained in at least one of time domain and frequency domain;
converting a problem of similarity minimization between different multipath profiles into a dual problem with a simple solution; and
obtaining radio biometric information based on the diffe ltipath profiles after the similarity of the different multipath profiles is minimized.

20. An apparatus (1701) for human identification, comprising:
a plurality of receivers (1722) each of which is configured for receiving at least one wireless signal from a multipath channel that is impacted by a person to be identified;
a processor (1730); and
a memory communicatively coupled with the processor, wherein the processor is configured for:
extracting, regarding each of the plurality of receivers, CSI from the at least one wireless signal, wherein the CSI represents channel properties of the multipath channel itself,
obtaining, from each of the plurality of receivers, radio biometric information based on the CSI, wherein the radio biometric information represents how the at least one wireless signal was impacted by at least part of a body of the person,
combining the radio biometric information obtained from the plurality of receivers to generate combined radio biometric information, and
determining an identity of the person based on the combined radio biometric information.

* * * * *